(12) United States Patent
Szente et al.

(10) Patent No.: US 11,066,854 B2
(45) Date of Patent: Jul. 20, 2021

(54) ACTUATED MECHANISM FOR ACTIVE PEDESTRIAN SAFETY LATCH WITH MESHED GEARS

(71) Applicant: MAGNA CLOSURES INC., Newmarket (CA)

(72) Inventors: Csaba Szente, Newmarket (CA); John Distefano, Richmond Hill (CA); Ioan Dorin Ilea, Vaughan (CA)

(73) Assignee: MAGNA CLOSURES INC., Newmarket (CA)

( * ) Notice: Subject to any disclaimer, the term of this patent is extended or adjusted under 35 U.S.C. 154(b) by 0 days.

(21) Appl. No.: 16/751,862

(22) Filed: Jan. 24, 2020

(65) Prior Publication Data

US 2020/0157859 A1     May 21, 2020

Related U.S. Application Data

(63) Continuation-in-part of application No. 16/404,237, filed on May 6, 2019, which is a continuation-in-part of application No. 16/261,039, filed on Jan. 29, 2019.

(60) Provisional application No. 62/796,161, filed on Jan. 24, 2019, provisional application No. 62/667,172, filed on May 4, 2018, provisional application No. 62/623,126, filed on Jan. 29, 2018.

(51) Int. Cl.
| | |
|---|---|
| *E05B 77/08* | (2014.01) |
| *E05B 83/24* | (2014.01) |
| *B60R 21/38* | (2011.01) |
| *E05B 51/02* | (2006.01) |

(52) U.S. Cl.
CPC .............. *E05B 83/24* (2013.01); *B60R 21/38* (2013.01); *E05B 51/023* (2013.01); *E05B 77/08* (2013.01)

(58) Field of Classification Search
CPC .......... B60R 21/38; E05B 83/24; E05B 77/08
See application file for complete search history.

(56) References Cited

U.S. PATENT DOCUMENTS

| | | | | |
|---|---|---|---|---|
| 3,659,466 A | * | 5/1972 | Pickles ................. | E05F 11/382 74/89.18 |
| 4,635,454 A | * | 1/1987 | Brown ..................... | E05C 3/24 292/210 |
| 5,273,325 A | | 12/1993 | Zimmermann | |

(Continued)

FOREIGN PATENT DOCUMENTS

| | | |
|---|---|---|
| CN | 102416983 A | 4/2012 |
| CN | 102806946 A | 12/2012 |

(Continued)

*Primary Examiner* — Ruth Ilan
*Assistant Examiner* — Daniel M. Keck

(57) ABSTRACT

A latch travel mechanism for a closure panel of a vehicle, the mechanism comprising: a mounting plate for mounting a latch, the latch for retaining the closure panel; a support plate coupled to the mounting plate by a pair of linkages, the support plate for connecting to a body of the vehicle, the pair of linkages including a pair of arms and a pair of meshed gears coupled to one another; and an actuation mechanism for mounting on at least one of the support plate or the body for extending the pair of linkages in order to move the mounting plate relative to the support plate from a home position to an extended position; wherein the mounting plate is moved from the home position to the extended position during operation of the actuation mechanism.

10 Claims, 54 Drawing Sheets

(56) References Cited

U.S. PATENT DOCUMENTS

| | | | |
|---|---|---|---|
| 5,603,534 A * | 2/1997 | Fuller | E05B 55/00 292/2 |
| 6,364,402 B1 | 4/2002 | Sasaki | |
| 8,235,428 B2 | 8/2012 | Hunt et al. | |
| 8,573,658 B2 | 11/2013 | Kim | |
| 9,120,461 B2 | 9/2015 | Farooq et al. | |
| 9,145,716 B2 | 9/2015 | Jayasuriya et al. | |
| 9,187,936 B2 | 11/2015 | Kim et al. | |
| 9,255,429 B2 | 2/2016 | Kim et al. | |
| 9,382,731 B2 | 7/2016 | Kim et al. | |
| 9,476,233 B2 | 10/2016 | Uyanik et al. | |
| 9,512,650 B2 | 12/2016 | Faruque et al. | |
| 9,637,082 B2 | 5/2017 | Ferri et al. | |
| 9,863,170 B2 | 1/2018 | Park et al. | |
| 2010/0244484 A1 | 9/2010 | Nakaura et al. | |
| 2013/0033069 A1 | 2/2013 | Hwang | |
| 2013/0087401 A1 | 4/2013 | Masih | |
| 2016/0177600 A1 | 6/2016 | Kugler et al. | |
| 2016/0245003 A1 | 8/2016 | McIntyre et al. | |
| 2016/0340941 A1 | 11/2016 | Taurasi | |
| 2017/0036642 A1 | 2/2017 | Nomura | |
| 2018/0030763 A1 | 2/2018 | Distefano et al. | |
| 2019/0218833 A1 | 7/2019 | Nelsen et al. | |
| 2019/0232915 A1 | 8/2019 | Szente et al. | |
| 2019/0338567 A1 | 11/2019 | Szente et al. | |

FOREIGN PATENT DOCUMENTS

| | | | | |
|---|---|---|---|---|
| CN | 104125898 A | | 10/2014 | |
| CN | 104594739 A | | 5/2015 | |
| CN | 105228883 A | | 1/2016 | |
| CN | 105421909 A | | 3/2016 | |
| CN | 106246015 A | | 12/2016 | |
| CN | 107489322 A | | 12/2017 | |
| CN | 108482300 A | | 9/2018 | |
| DE | 3602718 A1 * | | 8/1987 | E05D 3/06 |
| DE | 10108880 A1 | | 9/2002 | |
| DE | 10204422 A1 | | 8/2003 | |
| DE | 10343106 B4 | | 10/2004 | |
| DE | 10331081 A1 | | 2/2005 | |
| DE | 102004023729 A1 | | 12/2005 | |
| DE | 102005060750 A1 | | 6/2007 | |
| DE | 102007012175 A1 | | 2/2008 | |
| DE | 102007021840 A1 | | 11/2008 | |
| DE | 10354163 B4 | | 8/2013 | |
| DE | 102013203801 A1 | | 4/2014 | |
| DE | 102007021840 B4 | | 8/2014 | |
| DE | 102013202207 A1 | | 8/2014 | |
| DE | 102013003956 A1 | | 9/2014 | |
| DE | 102004023729 B4 | | 10/2014 | |
| DE | 102013114414 A1 | | 3/2015 | |
| DE | 102013114106 A1 | | 4/2015 | |
| DE | 102014110146 A1 | | 6/2015 | |
| DE | 102014110146 A1 * | | 6/2015 | E05D 11/00 |
| DE | 10343106 B4 | | 8/2015 | |
| DE | 102015100627 A1 | | 8/2015 | |
| DE | 102015115665 A1 | | 3/2017 | |
| EP | 1172507 A2 | | 1/2002 | |
| EP | 1737709 | | 4/2005 | |
| EP | 1528201 A1 | | 5/2005 | |
| EP | 1541432 A1 | | 6/2005 | |
| EP | 1528201 B1 | | 8/2006 | |
| EP | 1737709 B1 | | 11/2007 | |
| EP | 1541432 B1 | | 7/2008 | |
| EP | 2317038 A2 | | 5/2011 | |
| EP | 2341204 A2 | | 7/2011 | |
| EP | 2481645 A1 | | 8/2012 | |
| EP | 2615012 A1 | | 7/2013 | |
| EP | 2907731 A1 | | 8/2015 | |
| EP | 3036390 A1 | | 6/2016 | |
| EP | 3071768 A1 | | 6/2016 | |
| GB | 783576 A | | 9/1957 | |
| GB | 786493 A | | 11/1957 | |
| GB | 2480798 A | | 12/2011 | |
| JP | 2002019641 A | | 1/2002 | |
| JP | 2002206363 A | | 7/2002 | |
| JP | 4349157 B2 | | 10/2009 | |
| JP | 2012153208 A | | 8/2012 | |
| JP | 201323148 A | | 2/2013 | |
| KR | 20060053612 A | | 5/2006 | |
| KR | 20080038892 A | | 5/2008 | |
| KR | 20130018058 A | | 2/2013 | |
| KR | 20130049922 A | | 5/2013 | |
| KR | 1459937 B1 | | 11/2014 | |
| WO | 2008003402 A1 | | 1/2008 | |
| WO | 2014186872 A1 | | 11/2014 | |
| WO | 2018057833 A1 | | 3/2018 | |

* cited by examiner

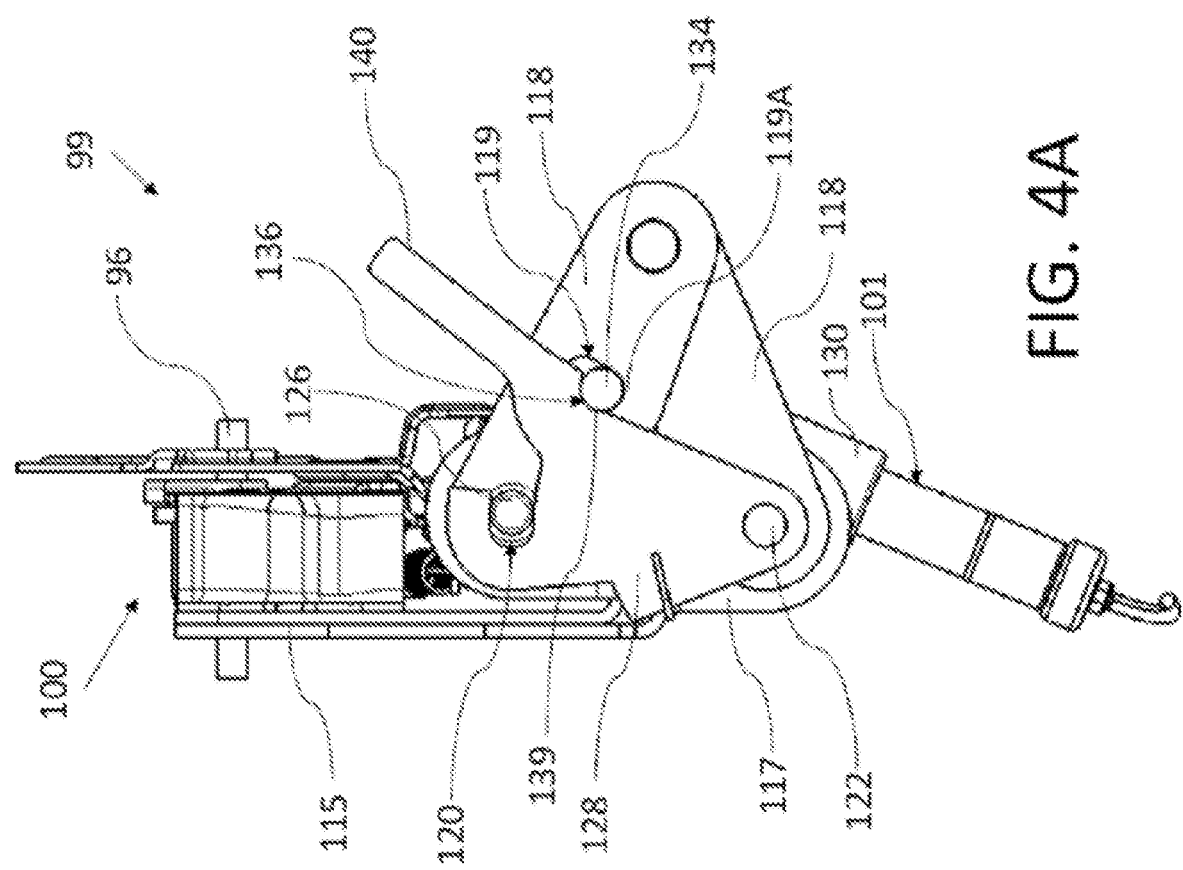

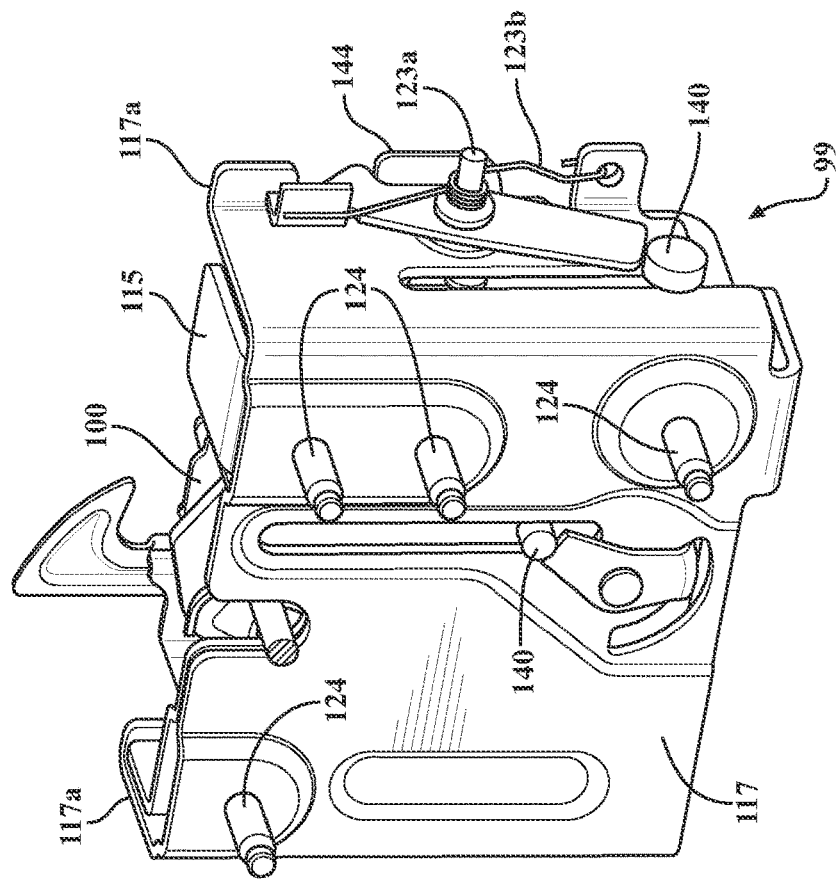
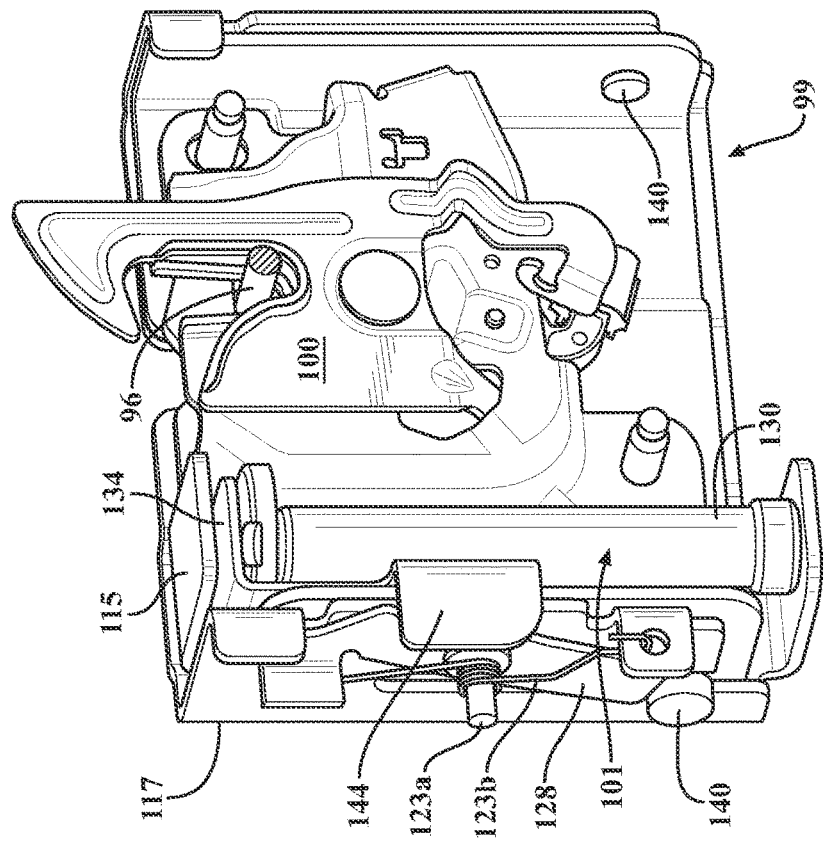
FIG. 8A
FIG. 8B

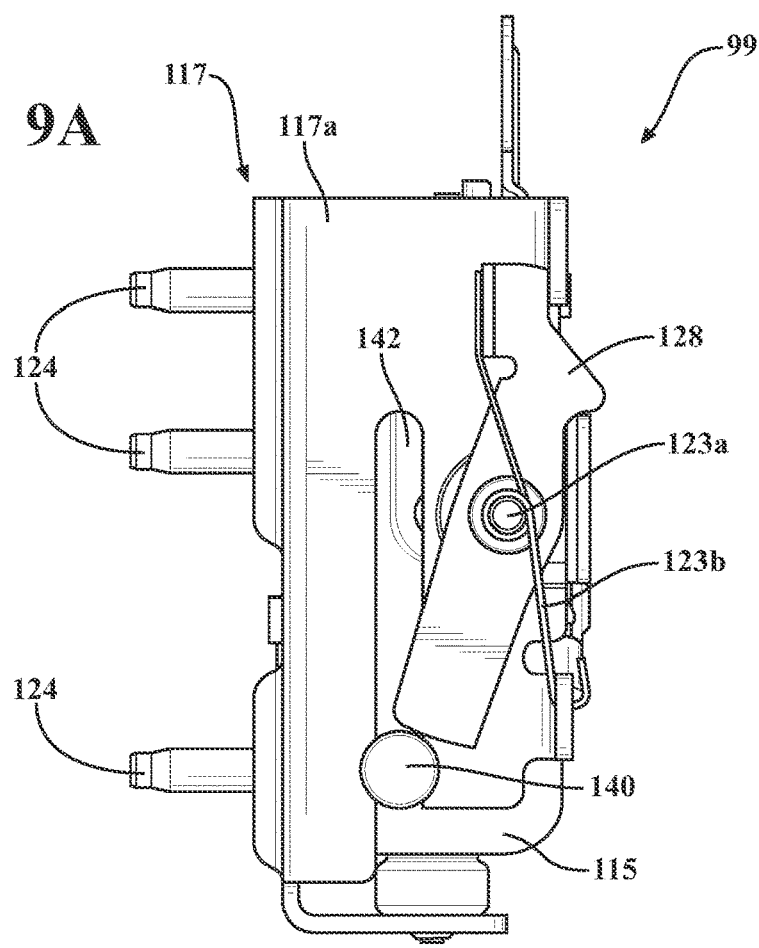
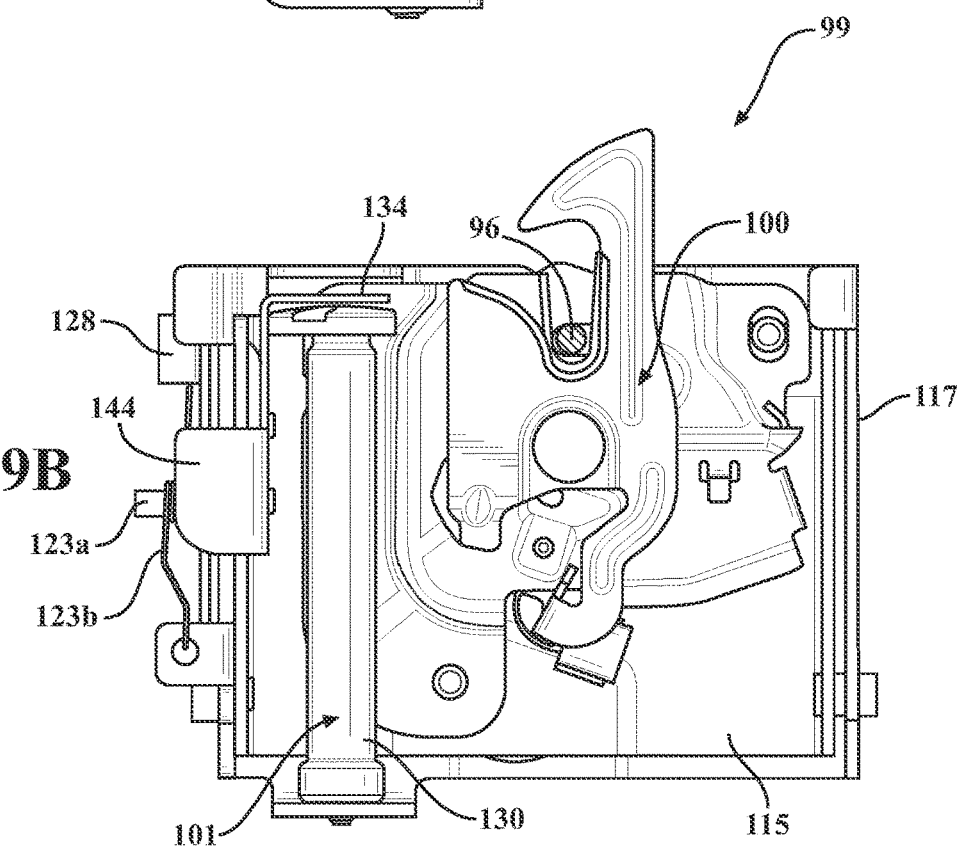

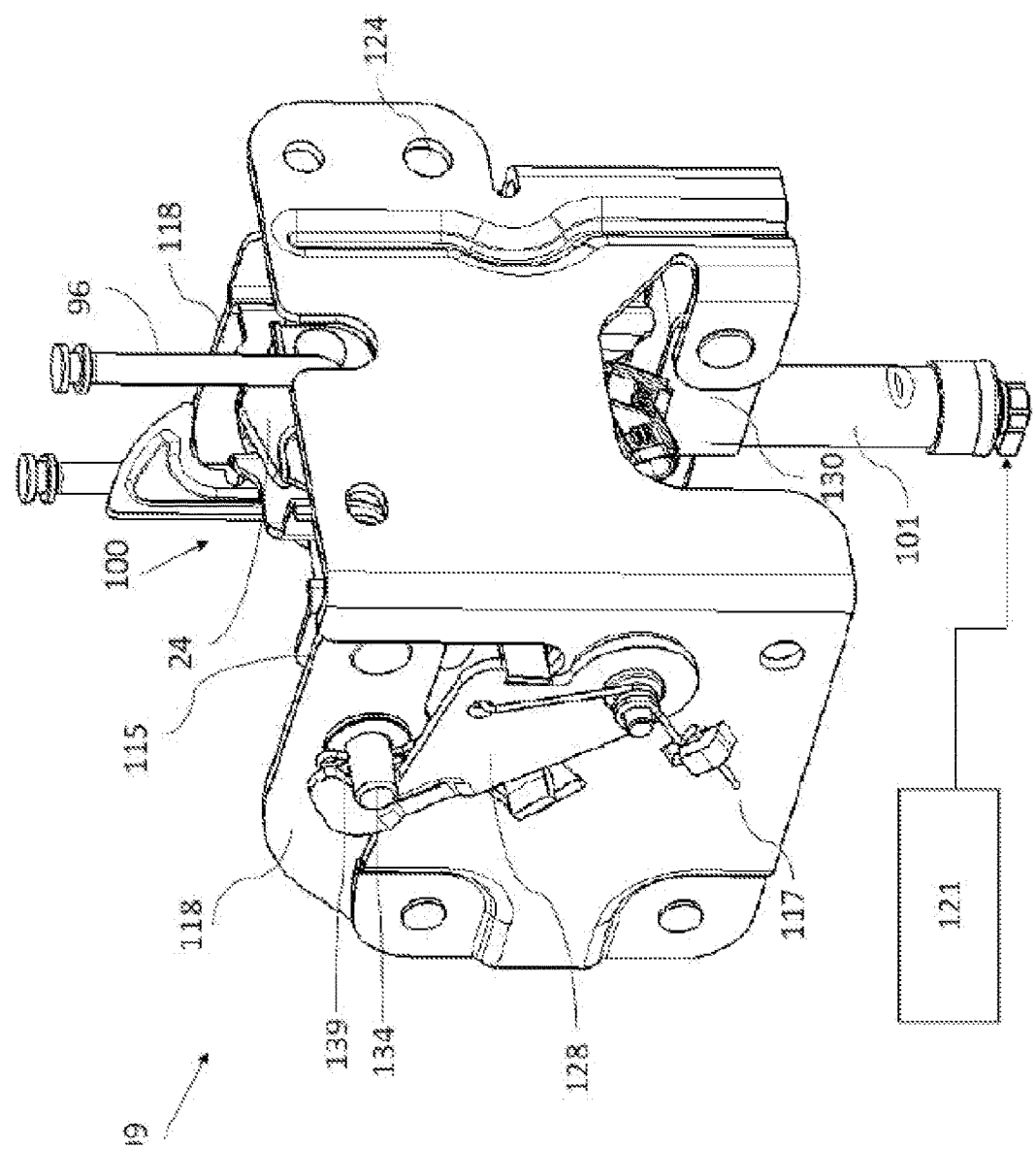

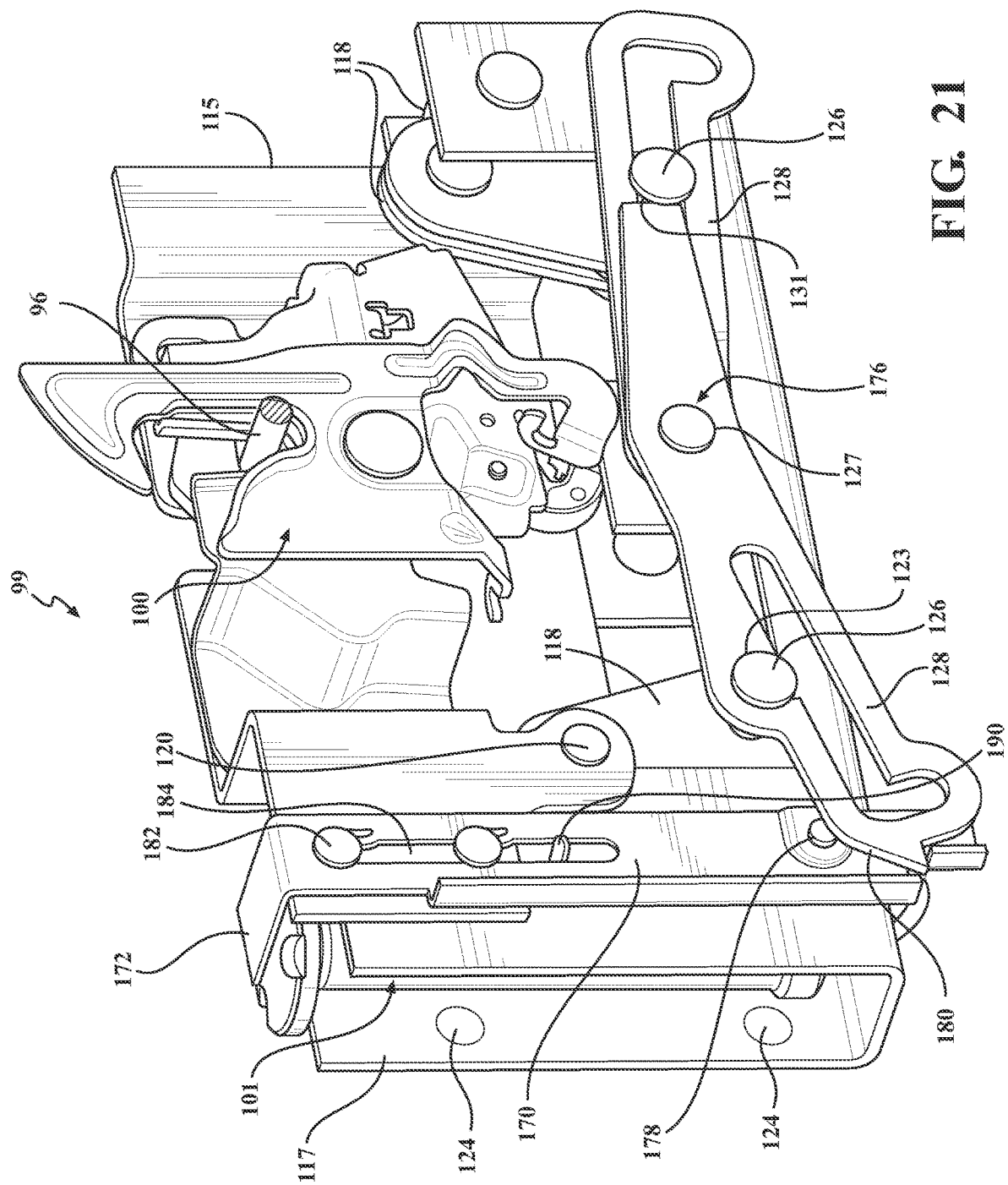

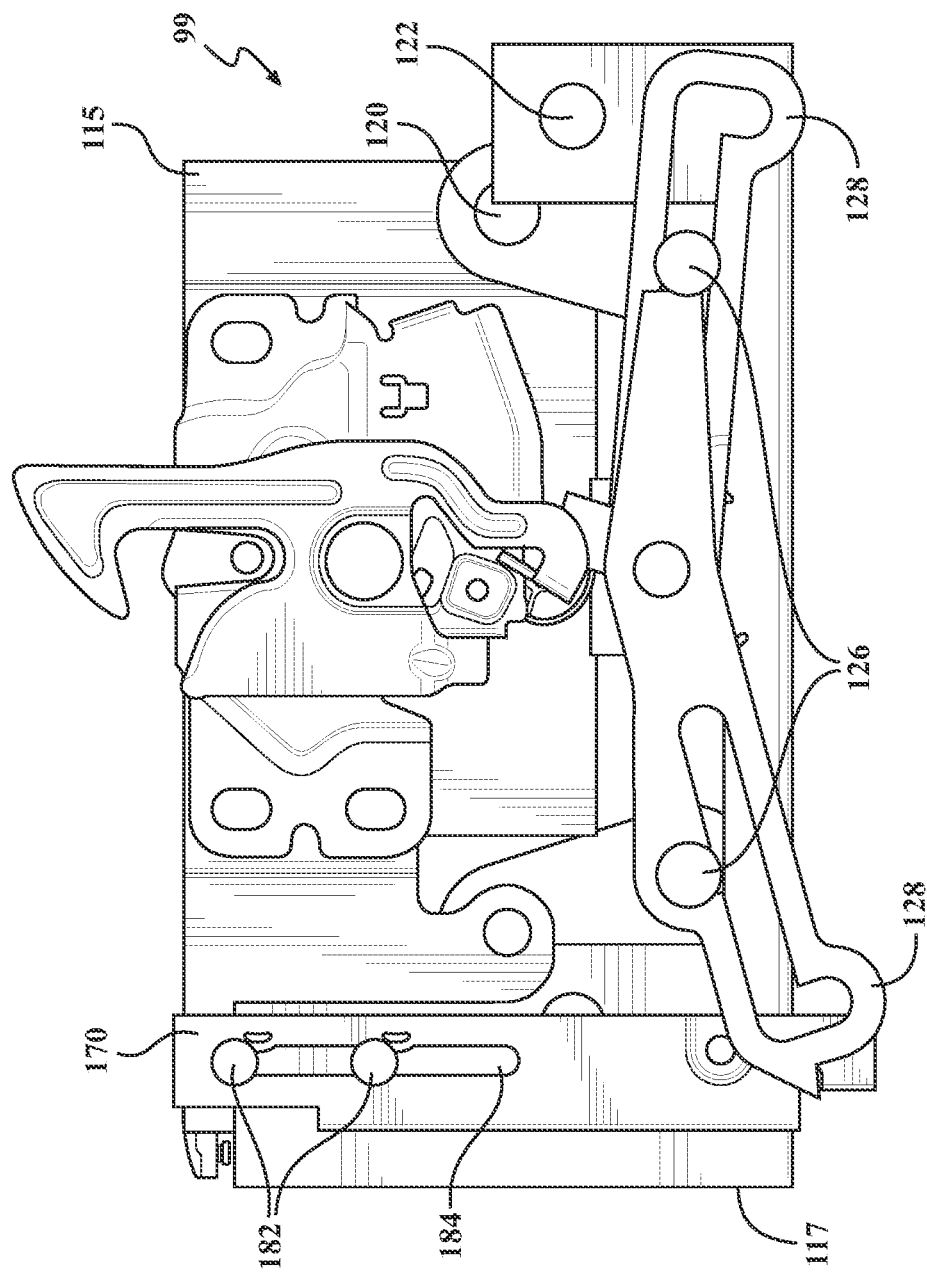
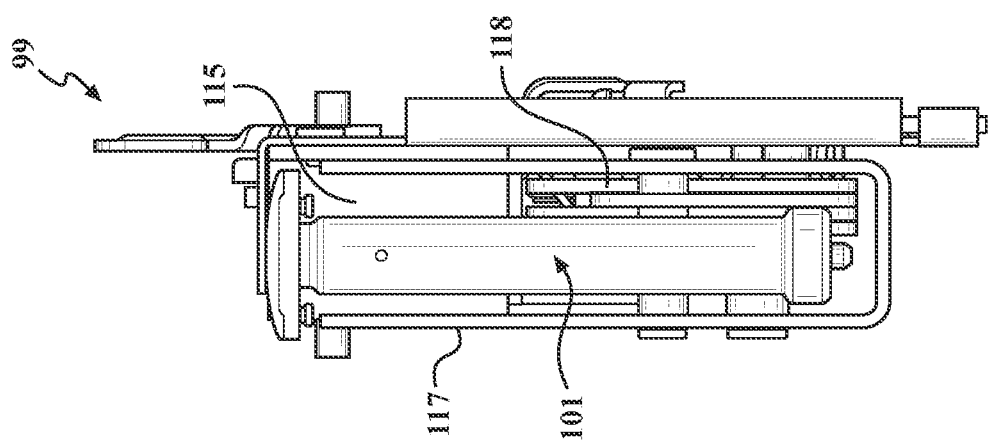
FIG. 22B
FIG. 22A

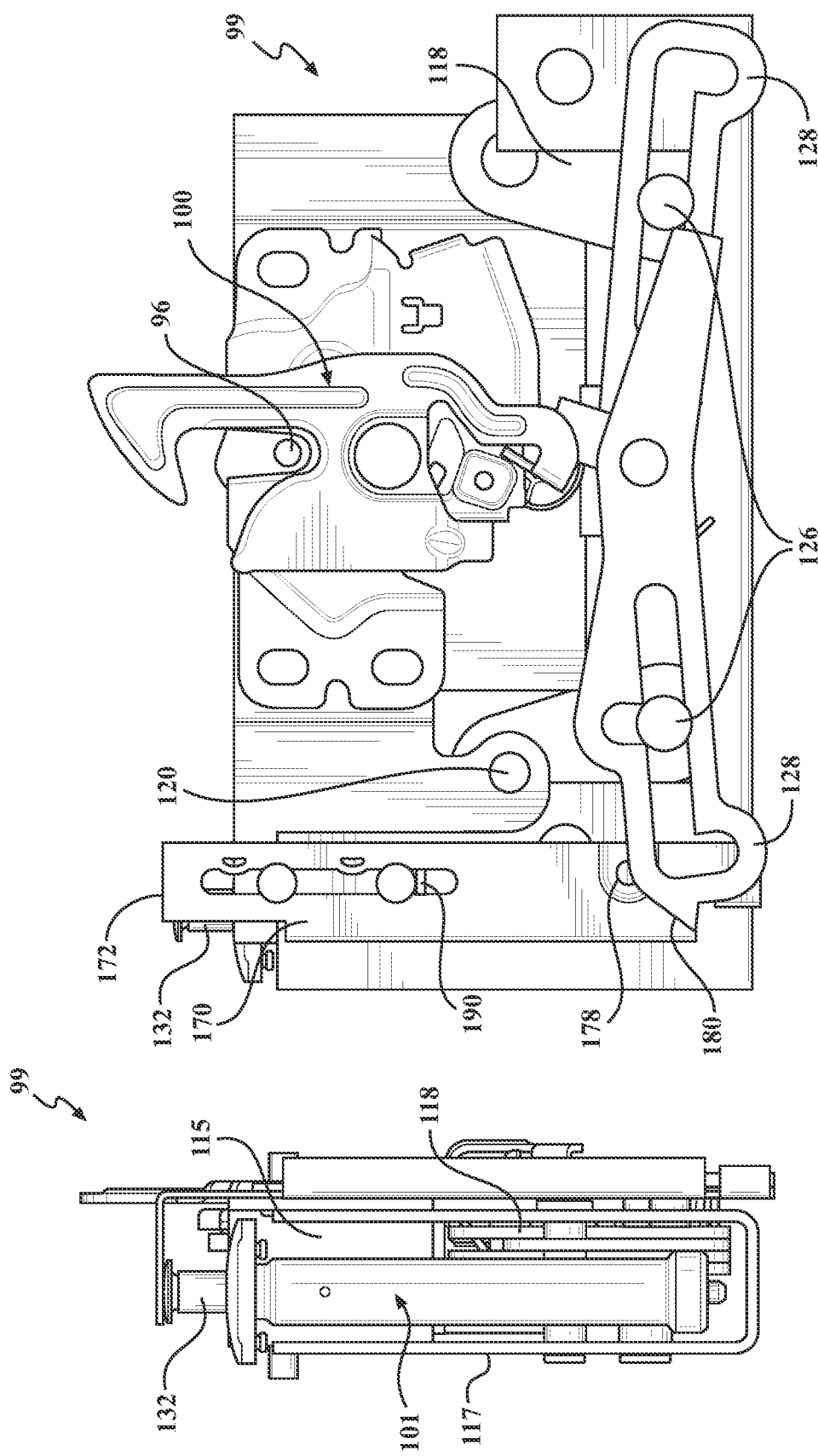

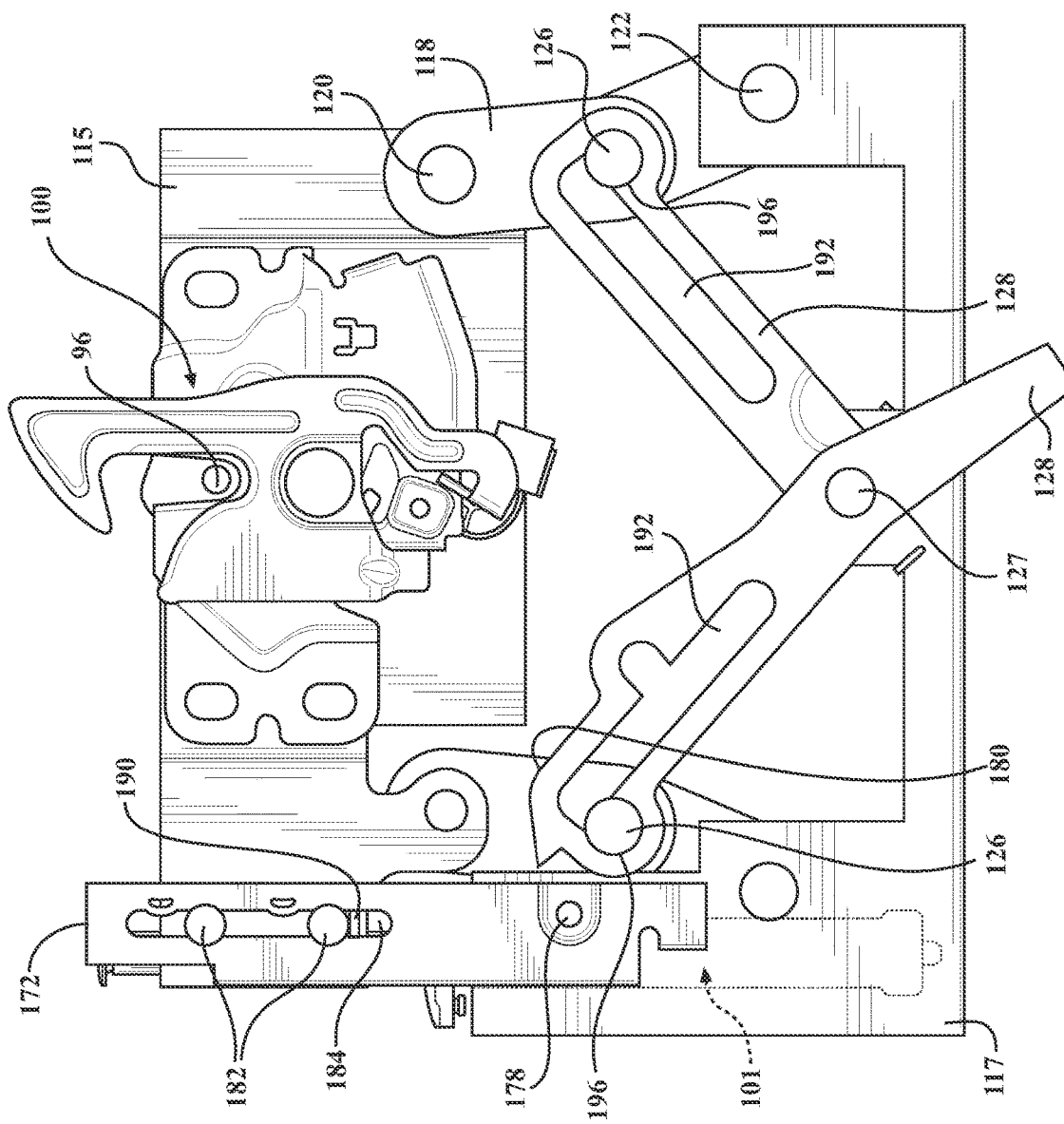
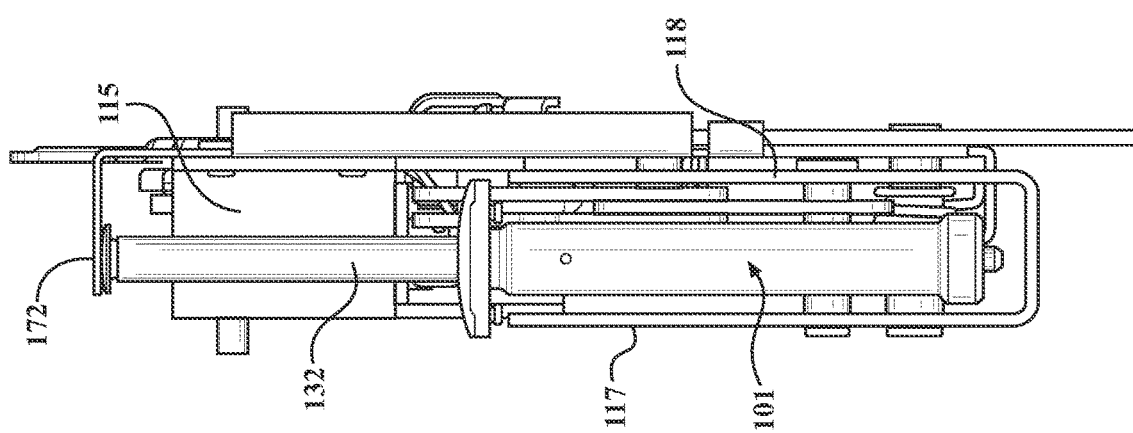
FIG. 24B
FIG. 24A

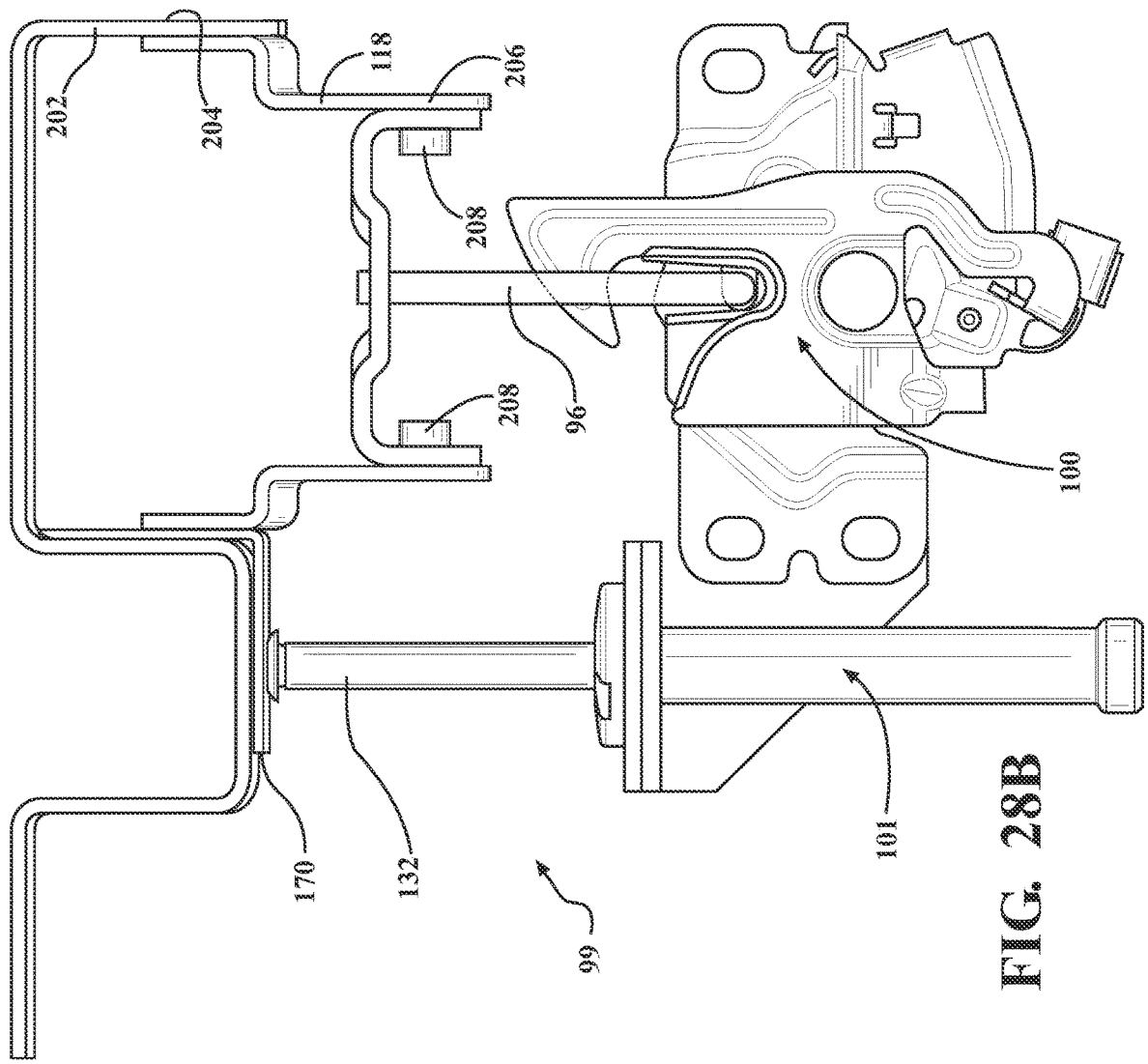
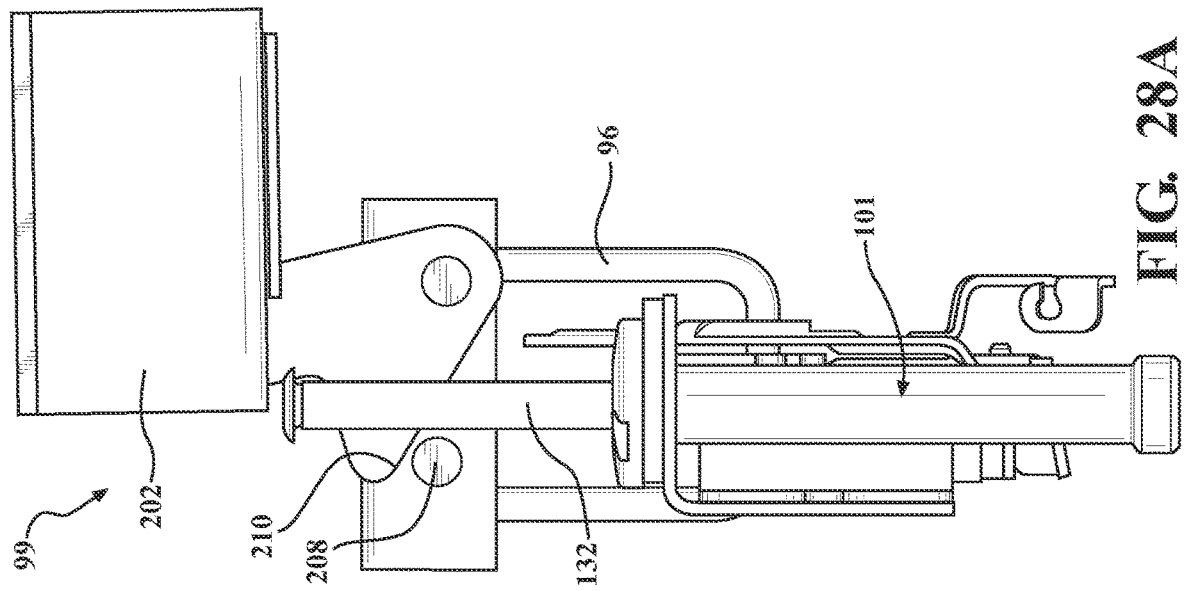

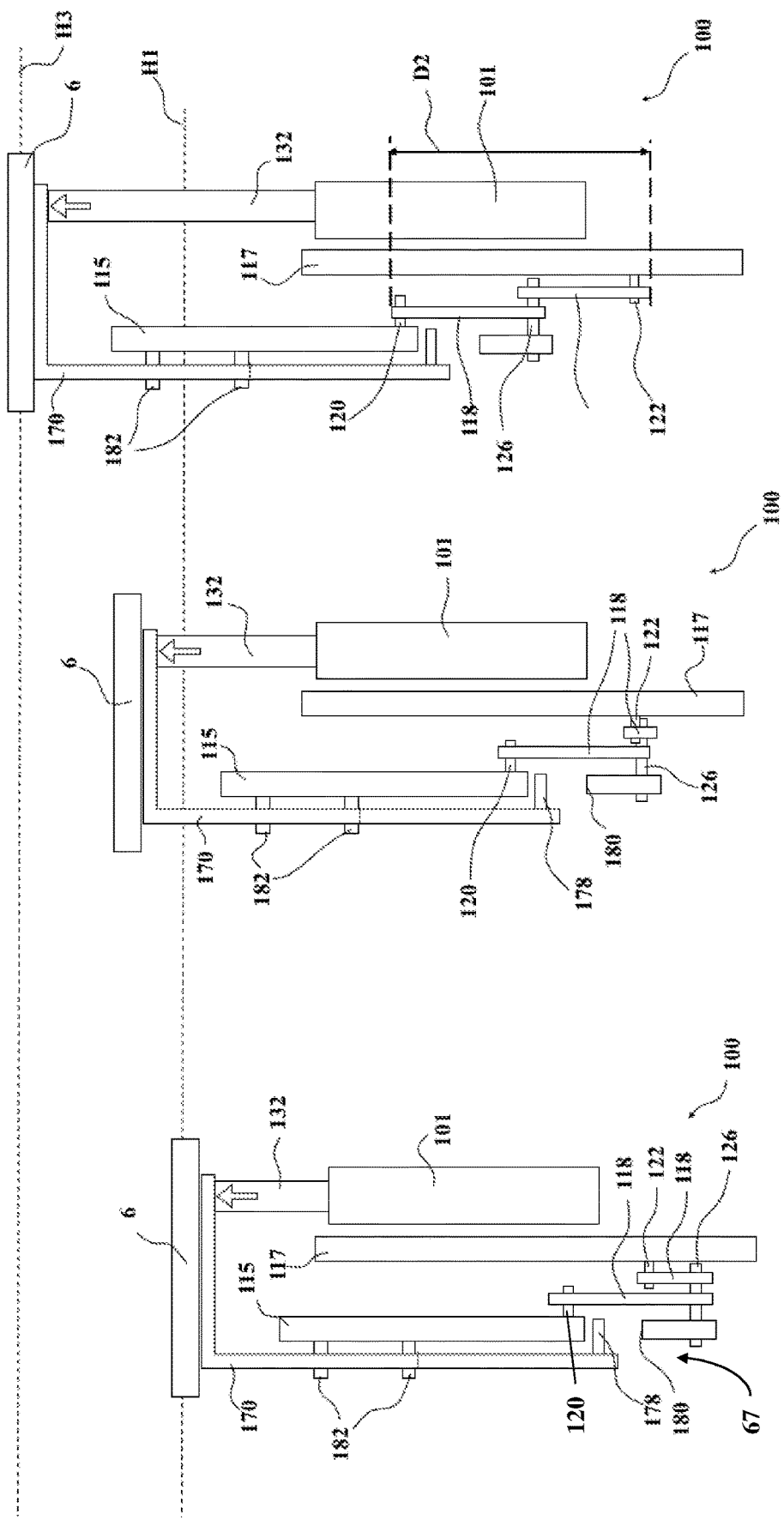

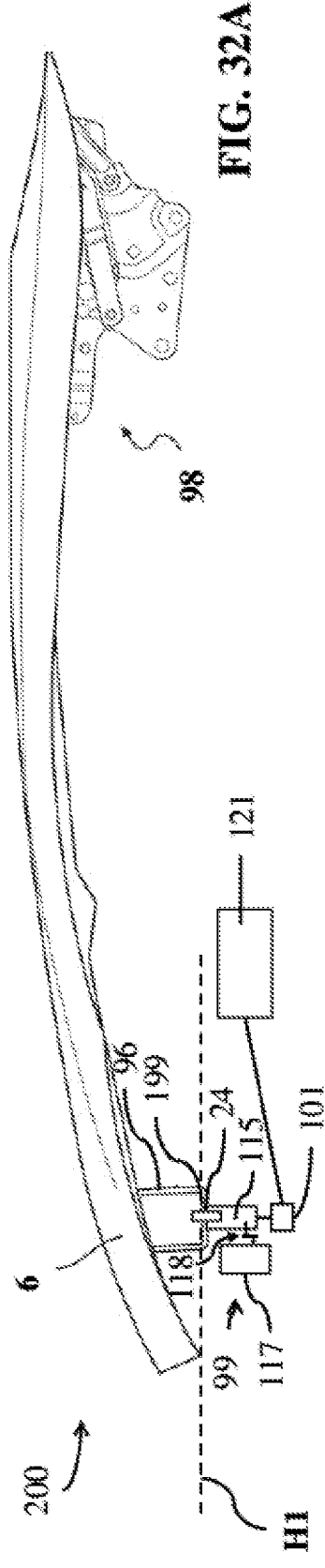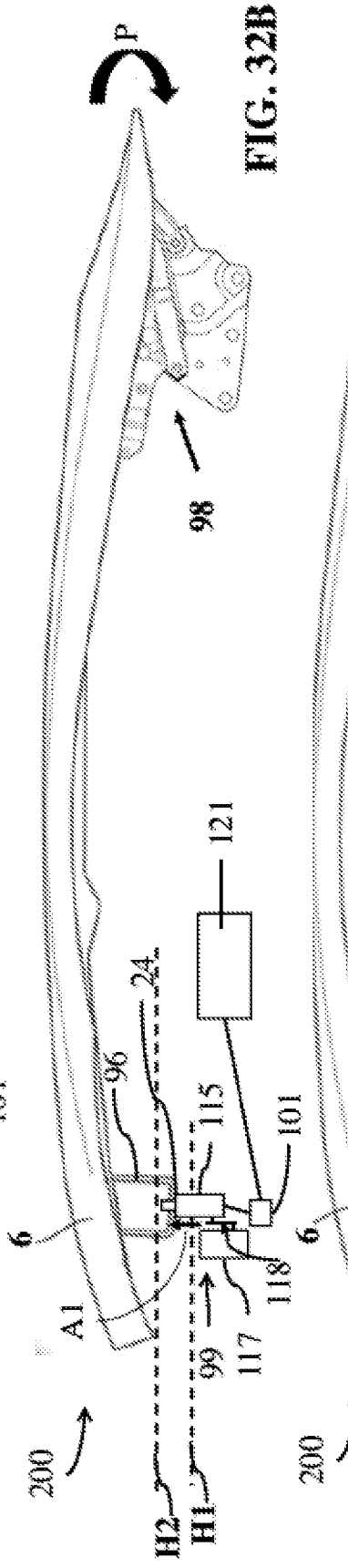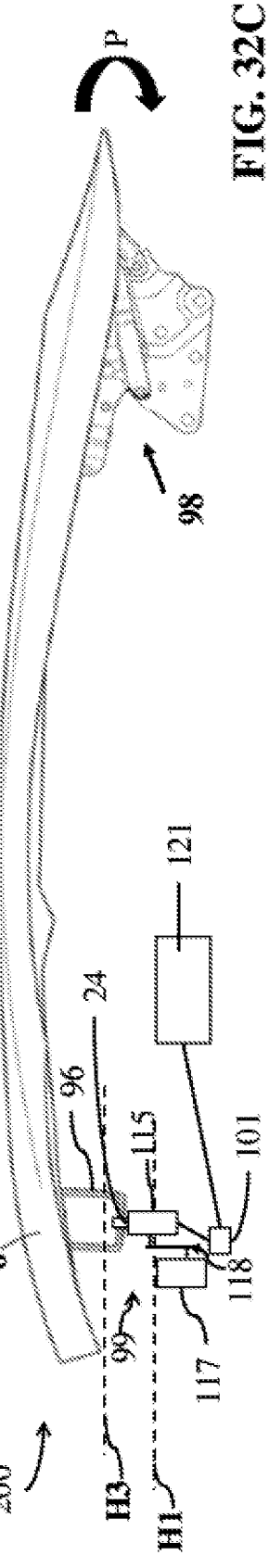

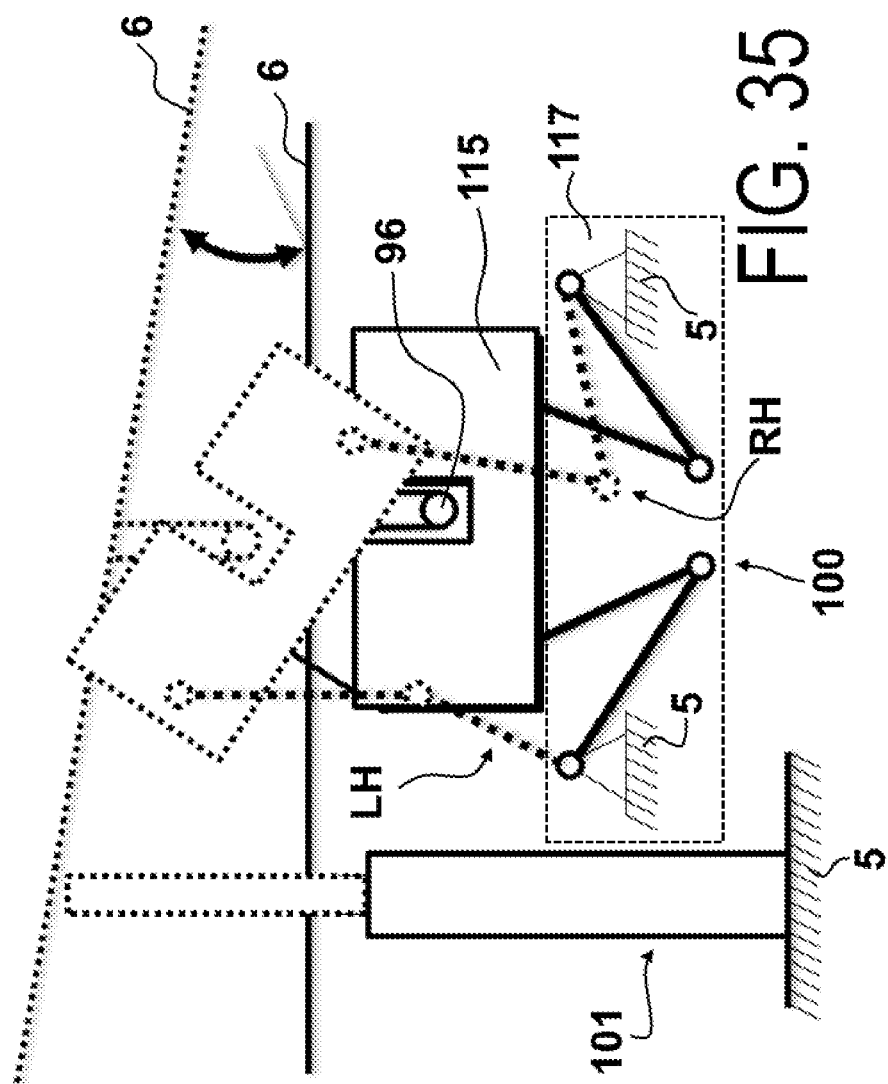

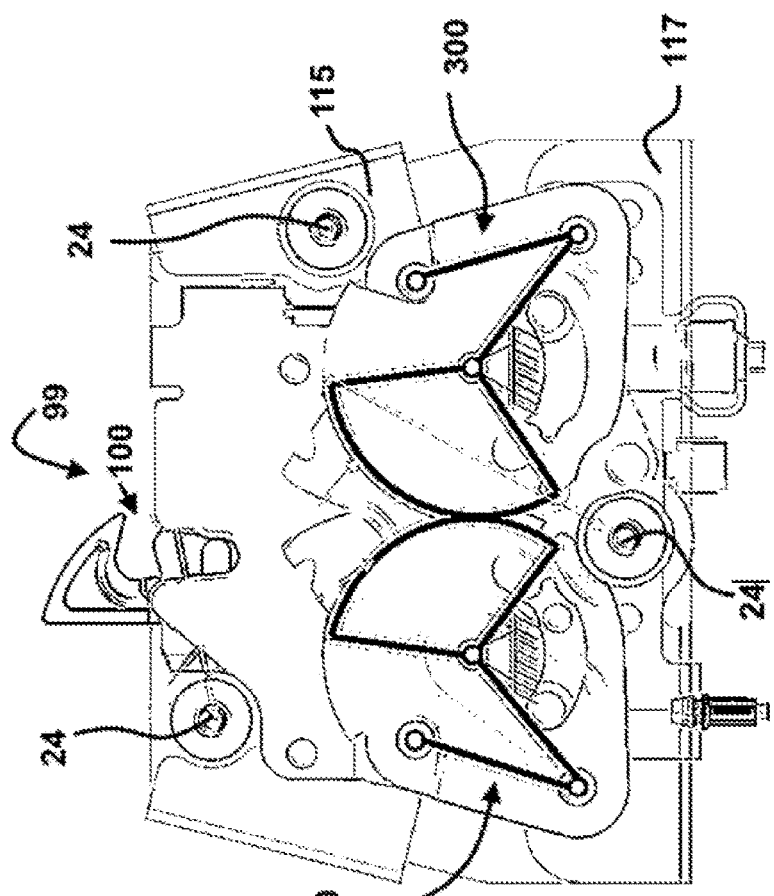
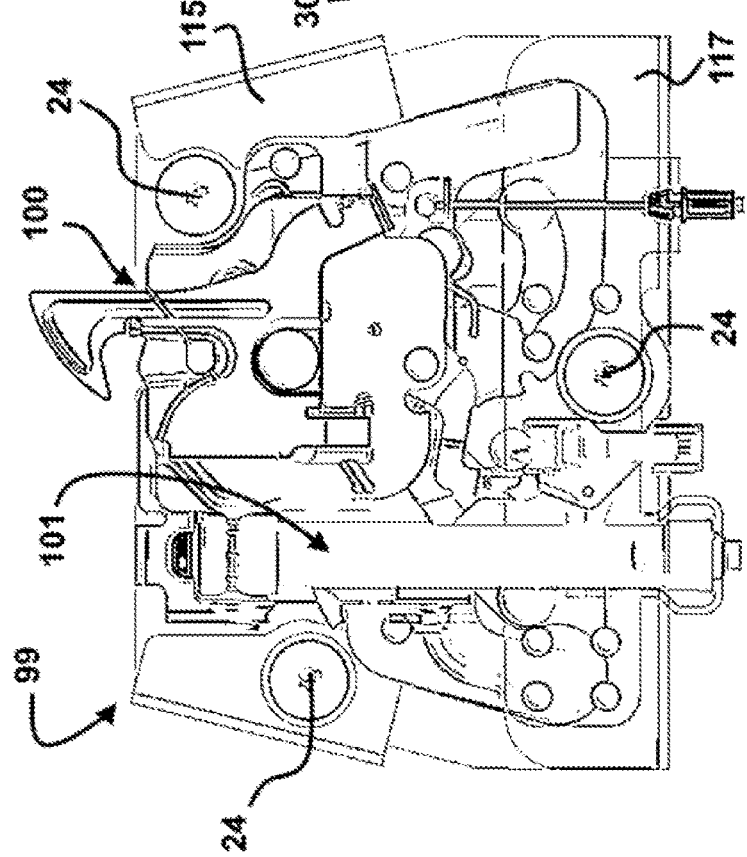

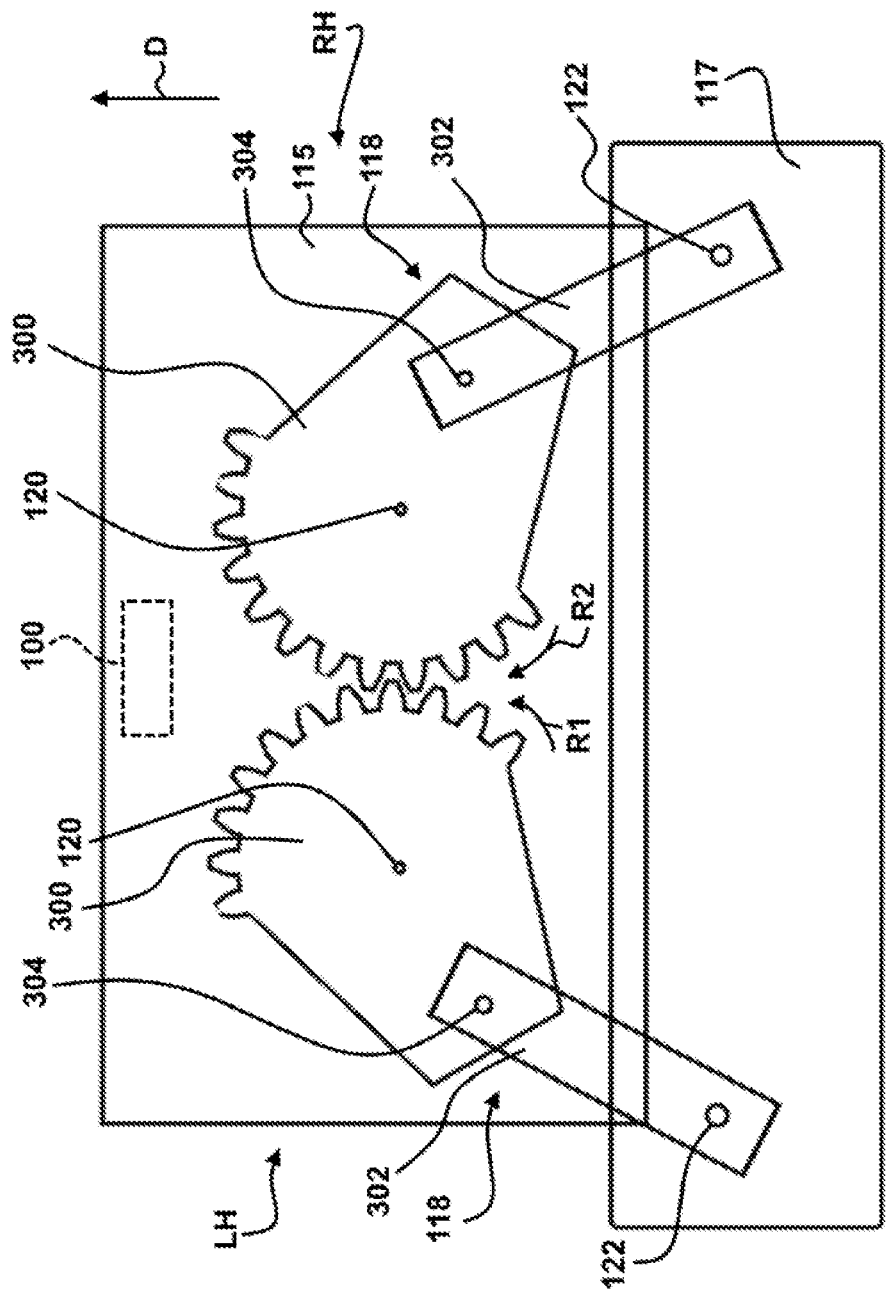

ACTUATED MECHANISM FOR ACTIVE PEDESTRIAN SAFETY LATCH WITH MESHED GEARS

CROSS-REFERENCE TO RELATED APPLICATIONS

This application claims priority from U.S. Provisional Patent Application No. 62/796,161 filed on Jan. 24, 2019, and this application is a continuation-in-part of U.S. patent application Ser. No. 16/404,237 filed on May 6, 2019 which claims benefit of U.S. Provisional Patent Application No. 62/667,172 filed on May 4, 2018, and this application is a continuation-in-part of U.S. Ser. No. 16/261,039 filed on Jan. 29, 2019 which claims benefit of U.S. Provisional Patent Application No. 62/623,126 filed on Jan. 29, 2018 and U.S. Provisional Patent Application No. 62/667,172 filed on May 4, 2018; the entire contents of which are hereby incorporated by reference.

FIELD

This disclosure relates to vehicle safety systems.

BACKGROUND

The automotive industry is attempting to better protect pedestrians from head on collisions with vehicles. When a car hits a pedestrian in a front end collision, the pedestrian can be thrown up and land on the front hood of the vehicle and/or the windshield. In an effort to ameliorate the harshness of the impact, and in particular to prevent the person's head from hitting the engine block or other hard point located directly underneath the front hood, it is desired to actively space the front hood from the engine block whenever a front end collision is detected. In particular, when a front end collision is detected by crash sensors, it is desired to move the front hood in a very short period of time (e.g., in milliseconds) from a first aerodynamic position where the front hood is normally located very close to the engine block to a second position where the front hood is actively moved few centimeters further away from the engine block. This activity could provide the pedestrian's head and/or torso with sufficient time and/or space to decelerate when the pedestrian impacts the front hood and thus prevent fatal injury.

Other problems in industry related to safety systems is actuation speed and/or actuation distance of safety devices (e.g. device response time) tempered with actuation power requirements. A further problem in industry is the need for a smaller packaging size of safety systems. A further problem in industry is the need for reduced cost of safety systems, including module components to facilitate replacement a reduction in replacement costs.

SUMMARY

It is an object to the present invention to provide a latch travel mechanism to obviate or mitigate at least one of the above-mentioned problems.

A first aspect provided is a latch travel mechanism for a closure panel of a vehicle, the mechanism comprising: a mounting plate for mounting a latch, the latch for retaining the closure panel; a support plate coupled to the mounting plate by a pair of linkages, the support plate for connecting to a body of the vehicle, the pair of linkages including a pair of arms and a pair of meshed gears coupled to one another; and an actuation mechanism for mounting on at least one of the support plate or the body for extending the pair of linkages in order to move the mounting plate relative to the support plate from a home position to an extended position; wherein the mounting plate is moved from the home position to the extended position during operation of the actuation mechanism.

A second aspect provided is a method for operating a latch travel mechanism coupled to a closure panel of a vehicle, the method comprising the steps of: maintaining a pair of linkages provided between a mounting plate and a support plate in a collapsed state, the mounting plate having a latch mounted thereon for retaining the closure panel in a closed position with respect to a body of the vehicle, the support plate connected to the body of the vehicle; operating an actuation system in order to move the mounting plate relative to the support plate from the home position to an extended position; and expanding the pair of linkages to a deployed state in response to moving the mounting plate relative to the support plate from the home position to an extended position, such that the pair of linkages includes a pair of arms and a pair of meshed gears; wherein the latch is also moved from the home position to the extended position as mounted on the mounting plate.

In accordance with another aspect, there is provided an active pedestrian system including a closure panel of a vehicle comprising a striker, a latch travel mechanism for the closure panel, the mechanism including a mounting plate for mounting a latch, the latch comprising a ratchet for retaining the striker, the latch for retaining the closure panel in a closed position with respect to a body of the vehicle, a support plate coupled to the mounting plate, the support plate for connecting to a body of the vehicle, one or more linkages connected to the support plate at one end and connected to the mounting plate at another end, the one or more linkages providing said coupled to the mounting plate, one or more linkages expandable, and an actuation system coupled to at least one of the support plate, the mounting plate and the linkages for extending the linkages in order to move the mounting plate relative to the support plate from a home position to an extended position, wherein the latch is also moved from the home position to the extended position when mounted on the mounting plate, wherein the striker moves relative to the ratchet when the latch is moved.

BRIEF DESCRIPTION OF THE DRAWINGS

The foregoing and other aspects will be more readily appreciated having reference to the drawings, wherein:

FIGS. 4a and 4b show respectively a side and front view of the latch of FIG. 1 as retained in the home position;

FIG. 8a is a front perspective view of a further embodiment of the actuation system shown in FIG. 3;

FIG. 8b is a rear perspective view of a further embodiment of the actuation system shown in FIG. 3;

FIG. 9a is a side view of the actuation system shown in FIG. 8a in a locked state;

FIG. 9b is a front view of the actuation system shown in FIG. 8a in a locked state;

FIG. 12b is a rear perspective view of a still further embodiment of the actuation system shown in FIG. 3;

FIGS. 21, 22a, 22b, 23a, 23b, 24a, and 24b show a still further embodiment of the actuation system shown in FIG. 3;

FIGS. 25, 26a, 26b, 27a, 27b, 28a and 28b show a still further embodiment of the actuation system shown in FIG. 1A;

FIGS. 30A to 30F are a series of sequential views of a mating latch component being moved by the latch of FIG. 21 from an initial position to an active pop-up position.

FIGS. 32A to 32C are a series of sequential views of the actuation system corresponding to FIGS. 31A to 31F, illustrating a linkage transitioning between a collapsed state to an expanded state;

FIG. 35 shows an example operation of the hood latch incorporating the travel latch mechanism of FIGS. 3 to 34b;

FIGS. 36a, 36b show an alternative embodiment of the travel latch mechanism of FIG. 35 including kinematic illustration;

FIGS. 38a, 38b, 38c, 38d show various deployment positions of the travel latch mechanism of FIGS. 36a, 36b;

DESCRIPTION OF THE PREFERRED EMBODIMENTS

Figure 1A:
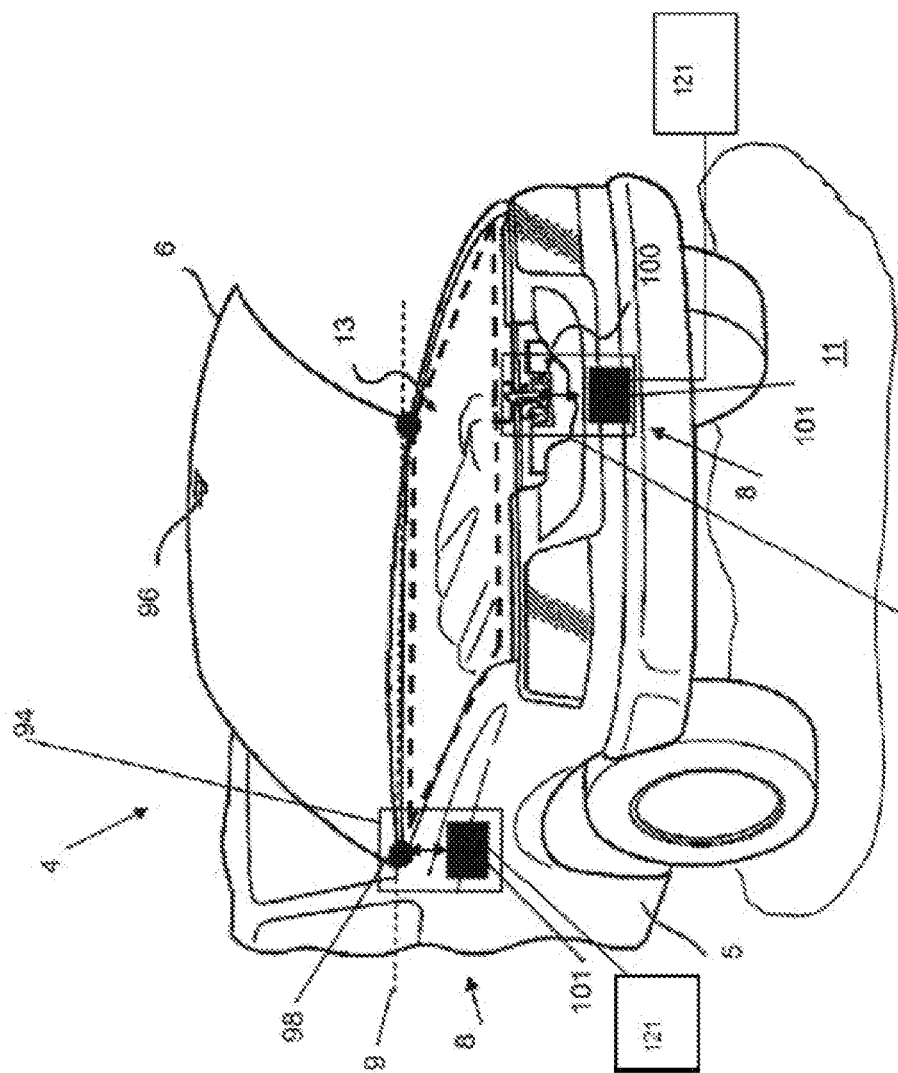
FIG. 1A is a perspective view of an example vehicle using a safety actuation system.

Referring to FIG. 1A, shown is a vehicle 4 with a vehicle body 5 having one or more closure panels 6. The closure panel 6 is connected to the vehicle body 5 via one or more panel operation components 8, for example such as but not limited to a hinge 98 and/or a latch 100 (e.g. for retaining the closure panel 6 in a closed position once closed or for retaining the closure panel 6 in an open position once opened). It is also recognized that the hinge 98 can be configured as a biased hinge that can be configured to bias the closure panel 6 towards the open position and/or towards the closed position. Further, the panel operation component 8 can be configured as a lift assist system including one or more struts, not shown, for example used in tail lift gate systems. The closure panel 6 can have a mating latch component 96 (e.g. striker) mounted thereon for coupling with a respective panel operation component 8 (e.g. latch) mounted on the vehicle body 5. Alternatively, the panel operation component 8 can be mounted on the closure panel 6 and the mating latch component 96 mounted on the body 5 (not shown). In further alternative, the panel operation component 8 can be used to operatively couple the closure panel 6 to the body 5, such as the case for the hinge 98.

The panel operation components 8 provide for movement of the closure panel 6 between a closed panel position (shown in dashed outline) and an open panel position (shown in solid outline), such that the operation component (s) 8 can be involved during the movement of the closure panel 6 between the open panel position and the closed panel position (e.g. for a hinge 98), can be involved in driving the movement of the closure panel 6 towards the open panel position (e.g. for an opening latch 100), or can be involved in driving the movement of the closure panel 6 towards the closed panel position (e.g. for a retaining latch 100). In the embodiment shown, the closure panel 6 pivots between the open panel position and the closed panel position about a pivot axis 9 (e.g. of the hinge 98), which can be configured as horizontal or otherwise parallel to a support surface 11 of the vehicle 4. In other embodiments, the pivot axis 9 may have some other orientation such as vertical or otherwise extending at an angle outwards from the support surface 11 of the vehicle 4. In still other embodiments, the closure panel 6 may move in a manner other than pivoting, for example, the closure panel 6 may translate along a predefined track or may undergo a combination of translation and rotation between the open and closed panel positions, such that the hinge 98 includes both pivot and translational components (not shown). As can be appreciated, the closure panel 6 can be embodied, for example, as a hood, passenger door or lift gate (otherwise referred to as a hatch) of the vehicle 4. Also provided is an actuation mechanism 101 coupled to one or more of the panel operation components 8, such that the actuation mechanism 101 is configured for actuating the operation or otherwise bypassing the operation of the one or more panel operation components 8, as further described below. In this manner, the actuation mechanism 101 can be used to forcefully provide, during deployment, some form of force assisted open operation (e.g. full open, partial open, etc.) of the closure panel 6. The actuation mechanism 101 can be deployed by any accelerated reaction time methods suitable, e.g. pyrotechnic, hydraulic, mechanical, and electrical, as desired.

For vehicles 4, the closure panel 6 can be referred to as a partition or door, typically hinged, but sometimes attached by other mechanisms such as tracks, in front of an opening 13 which is used for entering and exiting the vehicle 4 interior by people and/or cargo. It is also recognized that the closure panel 6 can be used as an access panel for vehicle 4 systems such as engine compartments and also for traditional trunk compartments of automotive type vehicles 4. The closure panel 6 can be opened to provide access to the opening 13, or closed to secure or otherwise restrict access to the opening 13. It is also recognized that there can be one or more intermediate open positions (e.g. unlatched position) of the closure panel 6 between a fully open panel position (e.g. unlatched position) and fully closed panel position (e.g. latched position), as provided at least in part by the panel operation component(s) 8. For example, the panel operation component(s) 8 can be used to provide an opening force (or torque) and/or a closing force (or torque) for the closure panel 6.

Movement of the closure panel 6 (e.g. between the open and closed panel positions) can be electronically and/or manually operated, where power assisted closure panels 6 can be found on minivans, high-end cars, or sport utility vehicles (SUVs) and the like. As such, it is recognized that movement of the closure panel 6 can be manual or power assisted during operation of the closure panel 6 at, for example: between fully closed (e.g. locked or latched) and fully open (e.g. unlocked or unlatched); between locked/latched and partially open (e.g. unlocked or unlatched); and/or between partially open (e.g. unlocked or unlatched) and fully open (e.g. unlocked or unlatched). It is recognized that the partially open configuration of the closure panel 6 can also include a secondary lock (e.g. closure panel 6 has a primary lock configuration at fully closed and a secondary lock configuration at partially open—for example for latches 100 associated with vehicle hoods).

In terms of vehicles 4, the closure panel 6 may be a hood, a lift gate, or it may be some other kind of closure panel 6, such as an upward-swinging vehicle door (i.e. what is sometimes referred to as a gull-wing door) or a conventional type of door that is hinged at a front-facing or back-facing edge of the door, and so allows the door to swing (or slide) away from (or towards) the opening 13 in the body 5 of the vehicle 4. Also contemplated are sliding door embodiments of the closure panel 6 and canopy door embodiments of the closure panel 6, such that sliding doors can be a type of door that open by sliding horizontally or vertically, whereby the door is either mounted on, or suspended from a track that provides for a larger opening 13 for equipment to be loaded and unloaded through the opening 13 without obstructing access. Canopy doors are a type of door that sits on top of the vehicle 4 and lifts up in some way, to provide access for vehicle passengers via the opening 13 (e.g. car canopy, aircraft canopy, etc.). Canopy doors can be connected (e.g. hinged at a defined pivot axis and/or connected for travel along a track) to the body 5 of the vehicle at the front, side or back of the door, as the application permits. It is recognized that the body 5 can be represented as a body panel of the vehicle 4, a frame of the vehicle 4, and/or a combination frame and body panel assembly, as desired.

Referring again to FIG. 1, the closure panel 6 can be configured as a hood panel of the vehicle 4, such that each hinge 98 and respective actuation mechanism 101 is configured as a hinge assembly 94, and the latch 100 and actuation mechanism 101 is configured as a latch assembly 10. It is recognized that the actuation mechanism 101 of the hinge assembly 84 can be optional, as desired.

Figure 2:
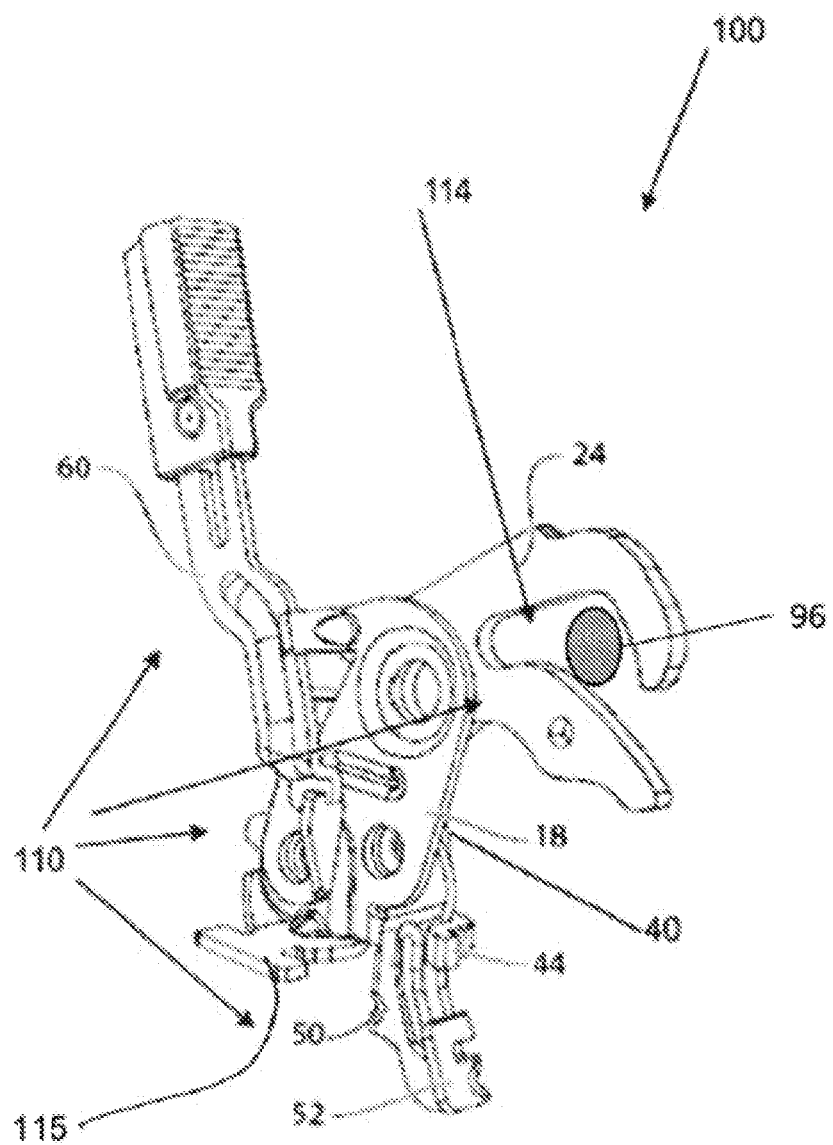
FIG. 2 is a front elevation view of the hood latch of FIG. 1A shown in isolation.

Referring to FIG. 2, one embodiment of the latch 100 includes a mounting plate 115 that can be contoured to facilitate attachment of the latch 100 to a frame (e.g. body 5) of the motor vehicle 4 (see FIG. 1A). The mounting plate 115 can be contoured to define a generally planar mounting surface and a plurality of apertures for attaching various components of the latch 100 thereto. Preferably, mounting plate 115 is a stamped metal component. A mating latch component 96 (e.g. striker) is secured to the closure panel 6 (e.g. hood 6) and extends outwardly therefrom. The mating latch component 96 can be a generally U-shaped bar that is engaged by the latch 100 to latch the closure panel 6 in the closed position. The latch 100 can be secured to the body 5 by mounting plate and positioned so that the mating latch component 96 will engage the latch 100 upon the closure panel 6 reaching the closed position. It is appreciated that, alternatively, the latch 100 may be secured to the closure panel 6 and the mating latch component 96 may be secured to the body 5 of the vehicle 4. Positioned on the mounting plate 115 can be a fishmouth or slot 114 for receiving the mating latch component 96 therein, in other words the slot 114 of the latch 100 is configured for receiving a keeper of the mating latch component 96. The slot 114 has an open top end and a closed bottom end. The latch 100 can also include a cover plate (not shown). The mounting plate 115 and cover plate can be interconnected by first and second rivets (not shown) that each have respective integral shafts extending beyond the cover plate. The mounting plate 115, cover plate and interconnecting rivets can provide a housing for the latch 100. Those skilled in the art will appreciate that a wide variety of alternative configurations may be deployed to provide the latch housing.

The latch 100 includes a number of latch elements 110 (e.g. a ratchet 24 and a pawl 40) that are configured to couple to the mating latch component 96 in order to retain the mating latch component 96 within the slot 114 when the closure panel 6 is in the closed position (e.g. locked). Alternatively, the latch elements 110, both of which are pivotally secured to the frame plate. The ratchet 24 includes an arm and arm spaced apart to define the generally u-shaped slot 114 there between (e.g. a hook of arm and a lip of arm that extends laterally beyond the hook. The ratchet 24 can also include a primary shoulder stop and a pointed secondary shoulder stop. Note that in FIG. 2 the ratchet 24 is shown in a fully closed position (e.g. facilitating the retention of the mating latch component 96 in the slot 114) which may also be referred to as the primary closed position.

The ratchet 24 can be biased to an open position by a substantial torsion spring that is mounted pivotally on the rivet shaft and connected between the cover plate and the plate. The torsion spring is an example of a ratchet biasing member, which biases the ratchet 24 towards the open position. The ratchet 24 moves between a unlatched position for releasing the mating latch component 96 and a latched position, such that the mating latch component 96 is received in the slot 114 and cooperates with the receiving slot 114 of the mounting plate. The ratchet 24 is biased to the unlatched position via a biasing member. The pawl 40 has can have a shoulder (or detent) that interacts or otherwise engages with primary and secondary shoulder stops of the ratchet 24, in order to releasably retain the ratchet 24 in the latched position. The pawl 40 can also feature a primary release tab 44 and/or a secondary release tab.

The pawl 40 is biased to a locking position (e.g. latched position) where the ratchet 24 is shown in a primary closed position by a torsion spring. The torsion spring 48 is an example of a pawl biasing member. Accordingly, the pawl 40 can be biased to disengage with the ratchet 24 via the pawl biasing member.

A release lever 50 can also pivotally mounted between the frame plate 12 and the cover plate 18. The primary release lever 50 can include a tab 52 for connection to a release cable (not shown) that is connected to a release handle (not shown) located in the vehicle 4 compartment for initiating by a driver for opening of the latch 100. The end result of operation of the release lever 50 is that the pawl 40 is disengaged with the ratchet 24, under action of the pawl biasing member, thus allowing the ratchet biasing member to assist in pivoting the ratchet 24 from the closed (or latched position to the open or unlatched position (not shown). The primary release lever 50 can interact with the pawl 40 via its primary release tab 44 and can thus also be biased by pawl biasing member into the non-engaged position.

Figure 6A:
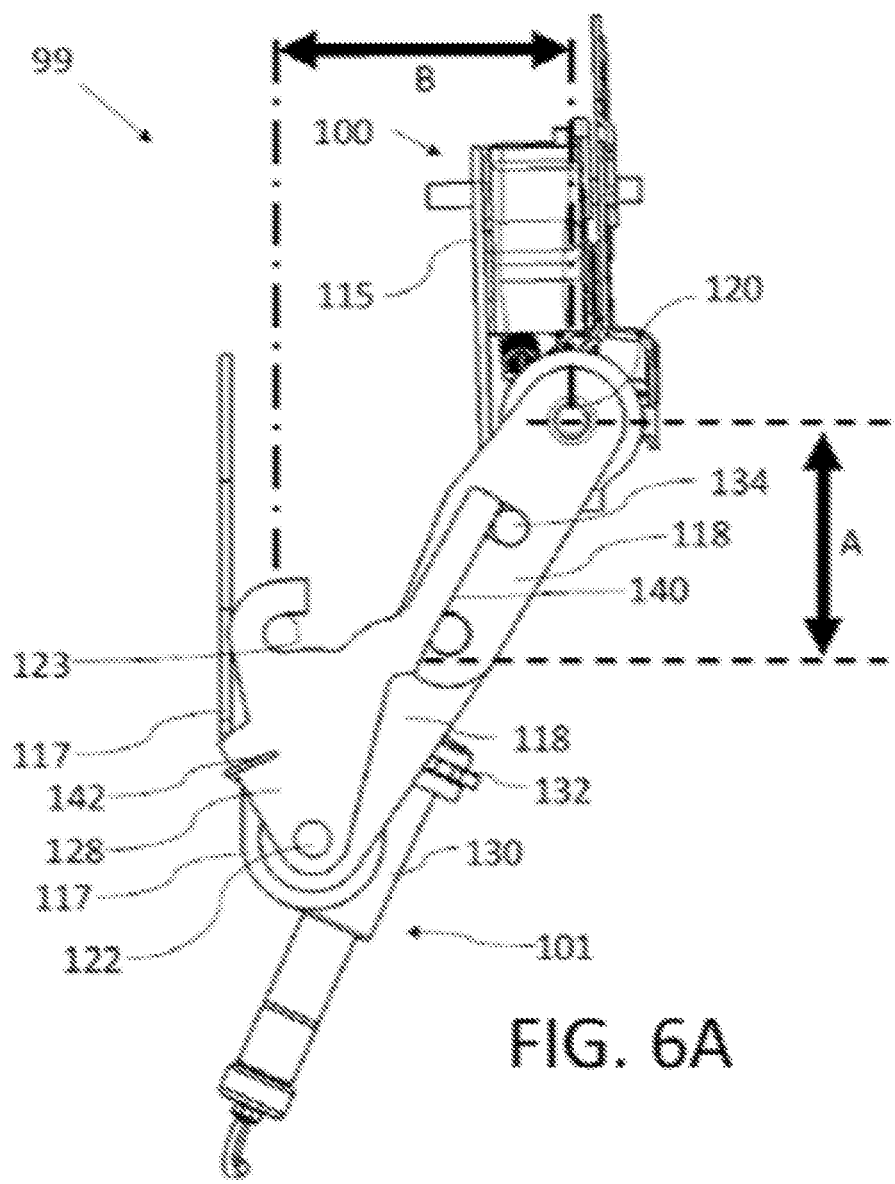
FIGS. 6a and 6b show respectively a side and front view of the latch of FIG. 1 as released and in an extended position.
Figure 6B:
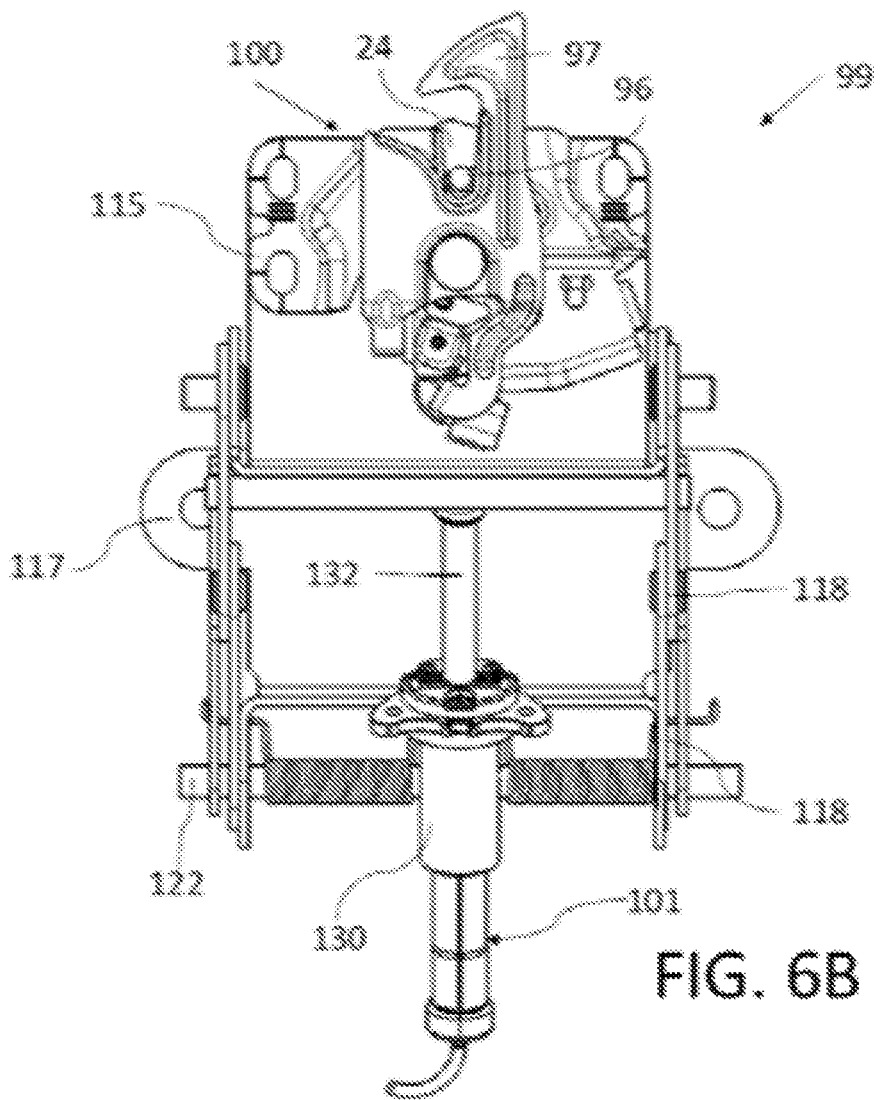
Figure 7:
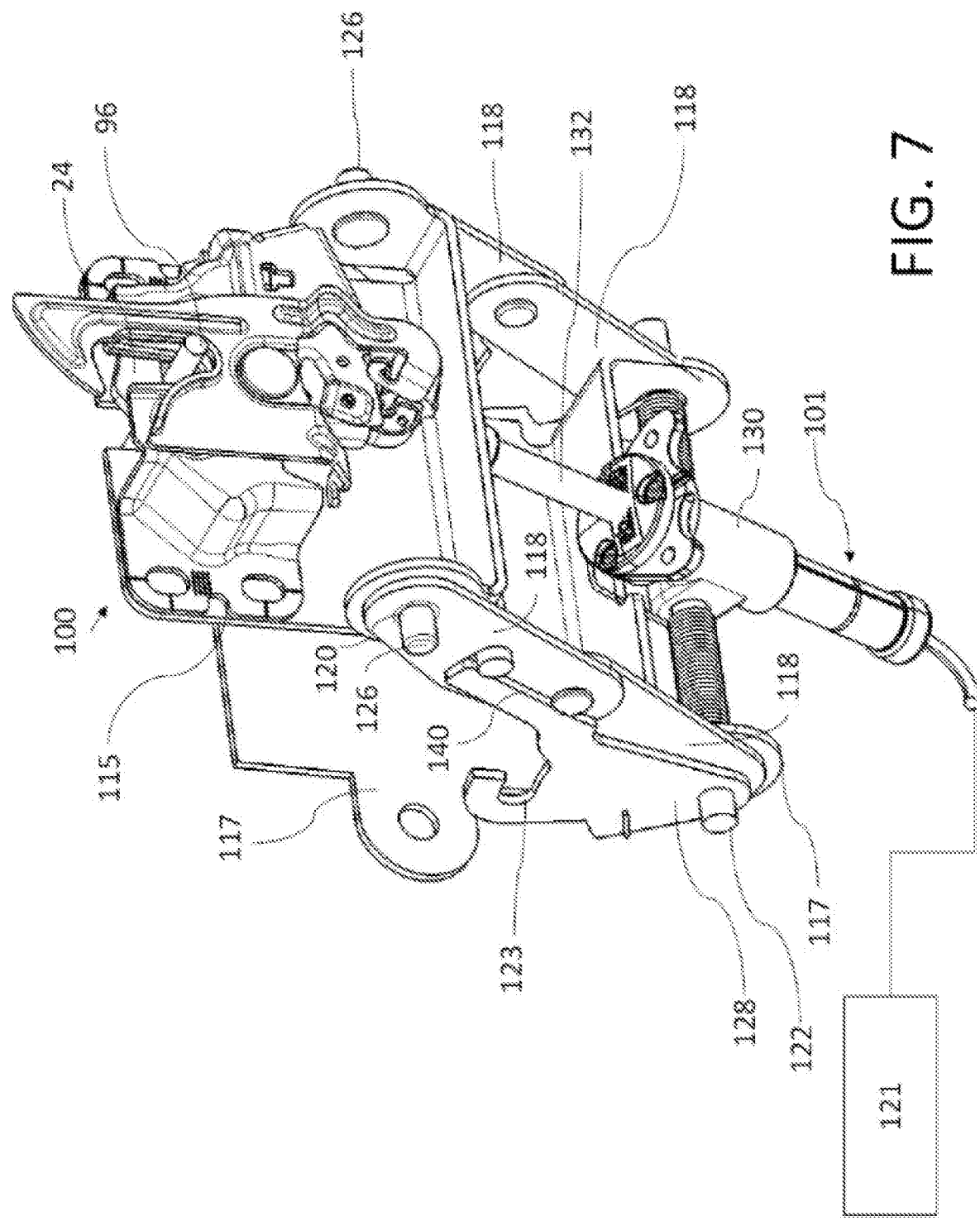
FIG. 7 shows perspective front view of the latch of FIG. 1 as released and in the extended position.
Figure 34B:
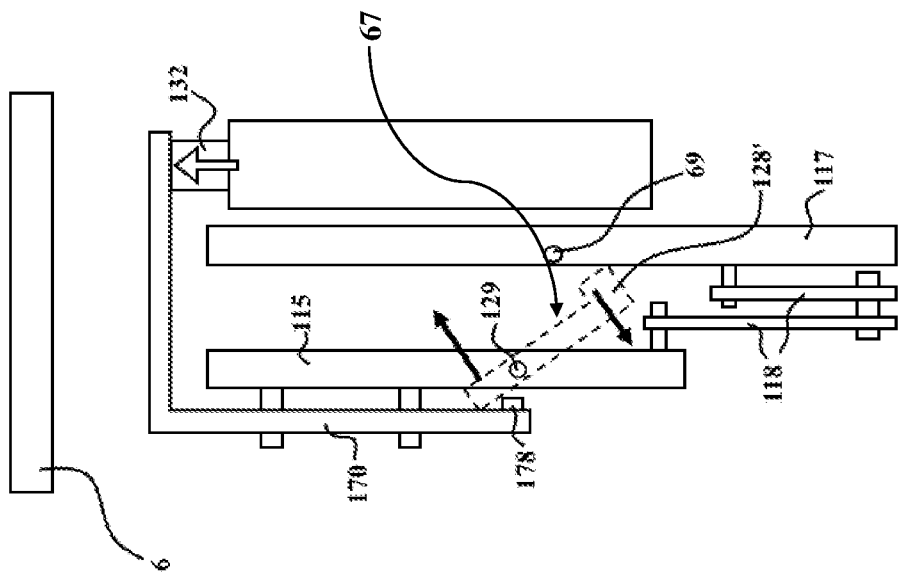
FIG. 34B is a side view of actuation system of FIG. 21 having a locking assembly in an unlocked state, in accordance with an illustrative embodiment.
Figure 34A:
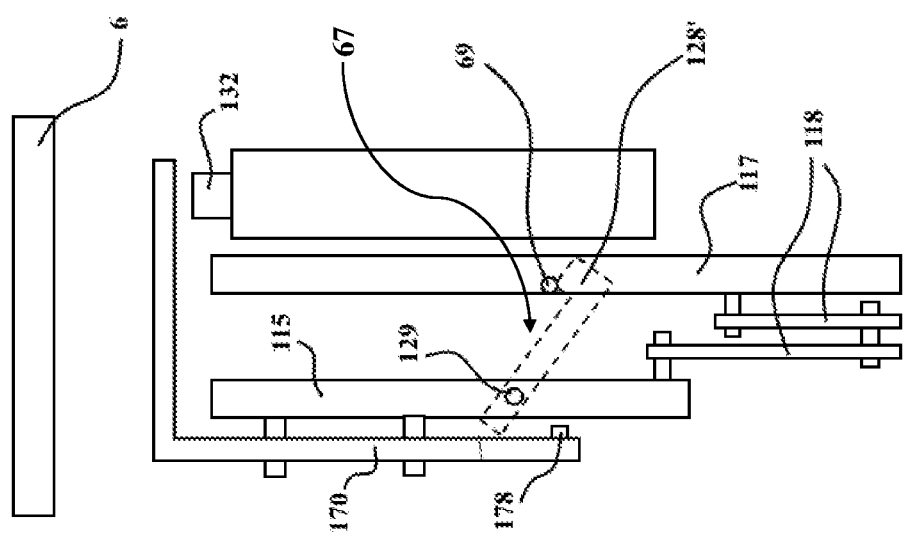
FIG. 34A is a side view of actuation system of FIG. 21 having a locking assembly in a locked state, in accordance with an illustrative embodiment.

As noted above, however, the latch 100 can be coupled to actuation mechanism 101, shown in FIGS. 1a and FIGS. 3-7. The actuation mechanism 101 can include the support plate 117 that can connect to the mounting plate 115 of the latch 100 and thereby can form part of the latch housing (not shown), as desired. The mounting plate 115, the support plate 117 and the actuation mechanism 101 can be collectively referred to as a latch travel mechanism 99 or with inclusion with the latch as a latch travel assembly 99, as desired. It is recognized that in the embodiments of the latch 100 shown in FIGS. 3-7, the mounting plate 115 is connected to the support plate 117 via linkages 118, such that the linkages 118 are connected by a hinge or pivot 120 at one end to the mounting plate 115 and at the other end via a hinge or pivot 122 to the support plate 117. The support plate 117 can be connected to the body (see FIG. 1A) via mounting holes 124. Pivot 120 can have a pin 126 (see FIG. 7) for coupling with a locking member (e.g. locking hook) 128 when the latch 100 is in a home (or non-extended) position (see FIG. 3), such that when the pin 126 is retained by the locking member 128 (e.g. in notch as shown by example) the latch 100 is inhibited from extending (as shown in FIGS. 6 and 7 in the extended position). The locking member 128 can be configured to pivot about a pivot point (e.g. pivot 122), such that the locking member is biased about the pivot point by a biasing member (e.g. spring—not shown) into contact with the pin 126 for retaining the latch 100 in the home or non-extended position (e.g. receiving of the pin 126 in notch 123 of the locking member 128). It is recognized that operations other than pivoting (e.g. linear extension and retraction—not shown) of the locking member 128 with respect to the pin 126 can be envisioned as desired. Locking member 128 is an example of component of a locking assembly 67, for locking or unlocking the relative movement between the mounting plate 115 and the support plate 117. In accordance with another example of a locking assembly 67, and with reference to FIGS. 34A and 34B, Locking member 128' is provided to engage directly between the support plate and the mounting plate 115, for example locking member 128' is shown as a lever pivotally mounted to mounting plate 115 for rotation about pivot point 129 provided on the mounting plate 115. Locking member 128' may be biased about pivot point 129 such that locking member 128' is biased towards a locking state or position. In a locking state locking member 128' may engage with support plate 117 to prevent relative movement between the support plate 117 and the mounting plate 115. For example locking member 128' is shown as engage a locking feature 69, such as a lug or pin or catch or the like provided on supporting plate 117. Alternatively, locking feature 69 may be a hole or aperture provided in supporting plate 117. When decoupling plate 170 is initially moved by actuating mechanism 101, engagement of abutment 178 on abutment surface 180' of the locking member 128 acts to pivot locking member 128' out of locking engagement with locking feature 69 to allow movement between mounting plate 115 and supporting plate 117, as illustratively shown in FIG. 34B.

Referring again to FIG. 3, the actuation mechanism 101 can be mounted on the body 5 or on the support plate 117 itself, such that operation of the actuation mechanism 101 can be used to decouple the pin 126 from the locking member 128, thus facilitating movement of the latch 100 from the home position (see FIG. 3) to the extended position (see FIGS. 6 and 7). It is noted that pin 126 is not shown in FIG. 3 for visual clarity purposes only. The actuator mechanism 101 can have a housing 130 with actuation means (e.g. [pyrotechnic] for extending and retracting a piston 132 (see FIGS. 6 and 7) for facilitating movement of the latch 100 (as well as mounting plate 115) between the home and extended positions.

Figure 3:
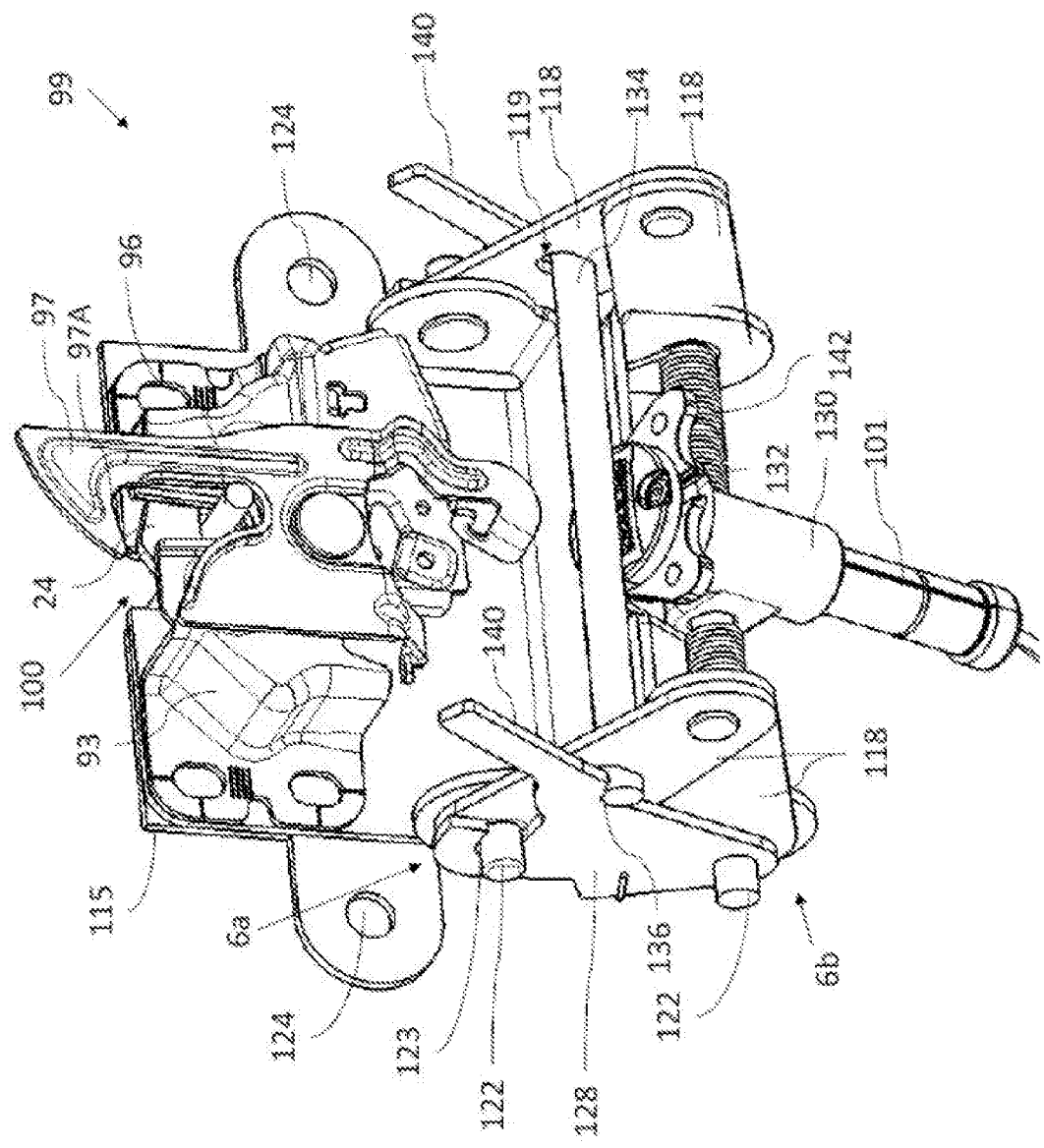
FIG. 3 is a front perspective view of the hood latch of FIG. 1A shown in a primary home position.
Figure 3A:
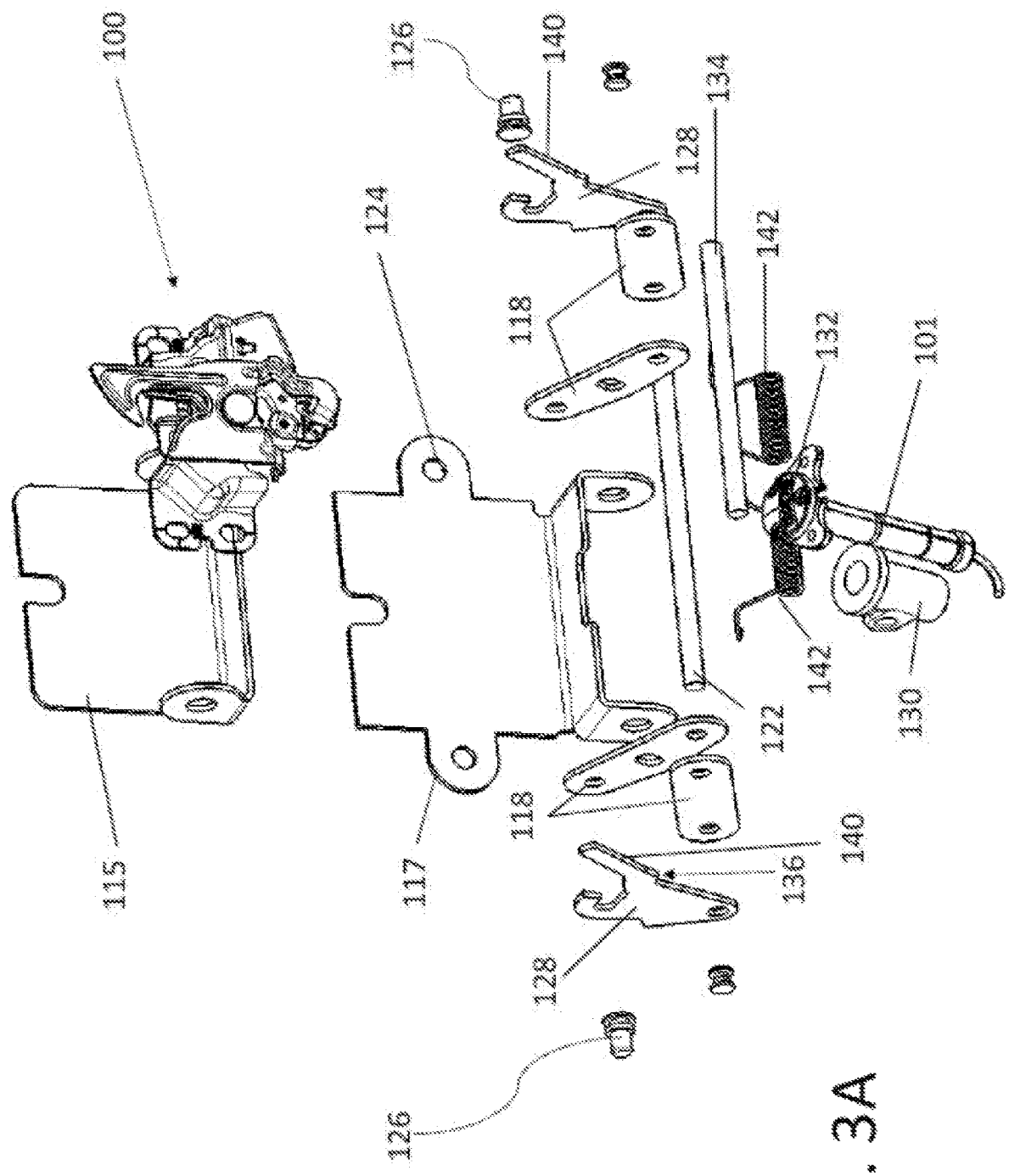
FIG. 3A is a front perspective exploded view of the hood latch of FIG. 3.

One example of the interaction of the piston 132 with the latch 100 is shown in FIG. 3, such that an actuator link 134 is connected to the linkages 118, such that a force of the piston 132 on the actuator link 134 causes the linkages 118 to extend and thus move the latch 100 from the home position to the extended position. A pretravel slot 119 is provided on each of the linkages 118 which allow the actuator link 134 to move between a first slot end 119A to a second slot end 119B without influencing motion on the linkage 118. When the actuator link 134 reaches the second slot end 119-B (from an initial resting or home position at the first slot end 119A) the actuator link 134 will enter into abutting contact therewith to be able to therefore urge the linkage 118 into an upward motion as guided by the motion of the piston 132 during an additional travel of the actuator link 134. During its transition between the first slot end 119A and the second slot end 119B, the actuator link 134 will impart the movement of the locking member 128 out of coupling with the pin 126, (and without imparting motion of the linkage 118 until the locking member 128 has been disengaged with the pin 126), through the engagement of the actuator link 134 with a cam surface 139 of the notch 136. However, it is recognized that the actuator link 134 can be positioned on the latch 100, itself and/or the mounting plate 115 (for example) in order to provide for extension of the latch 100 when acted upon by the piston 132 (as driven by the actuator mechanism 101).

Referring again to FIG. 3 as one embodiment of coupling of the actuator link 134 to the latch 100/mounting plate 115, in this case via the linkages 118 themselves, the actuator link 134 can be received in a notch 136 in the locking member 128 when the locking member 128 is engaged with the pin 126 (when the latch 100 is in and retained in the home position). The locking member 128 can also have a travel surface 141 extending from the notch 136 in order to guide travel of the actuator link 134 as the latch 100 translates from the home to the extended position.

Figure 4B:
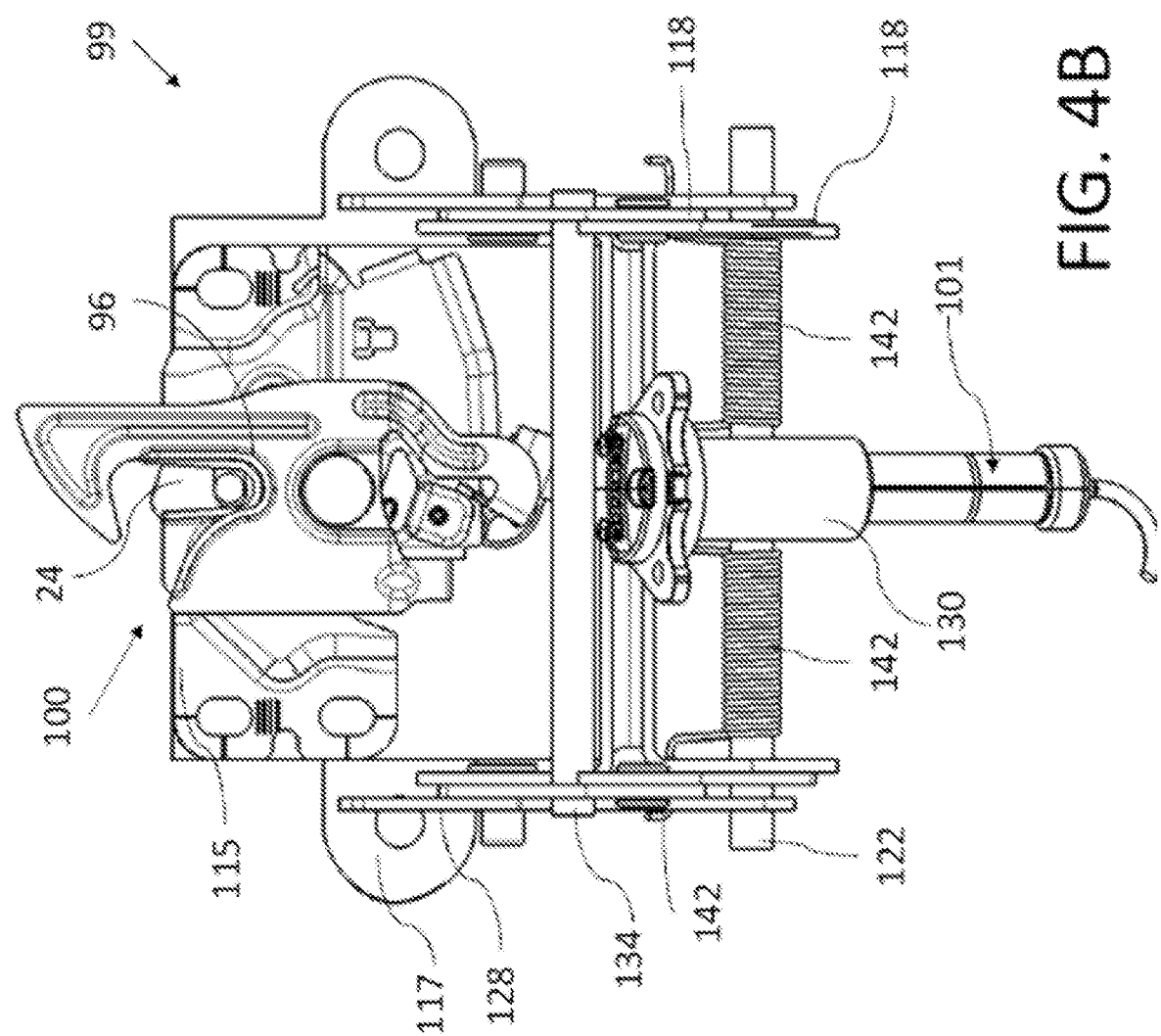
Figure 5B:
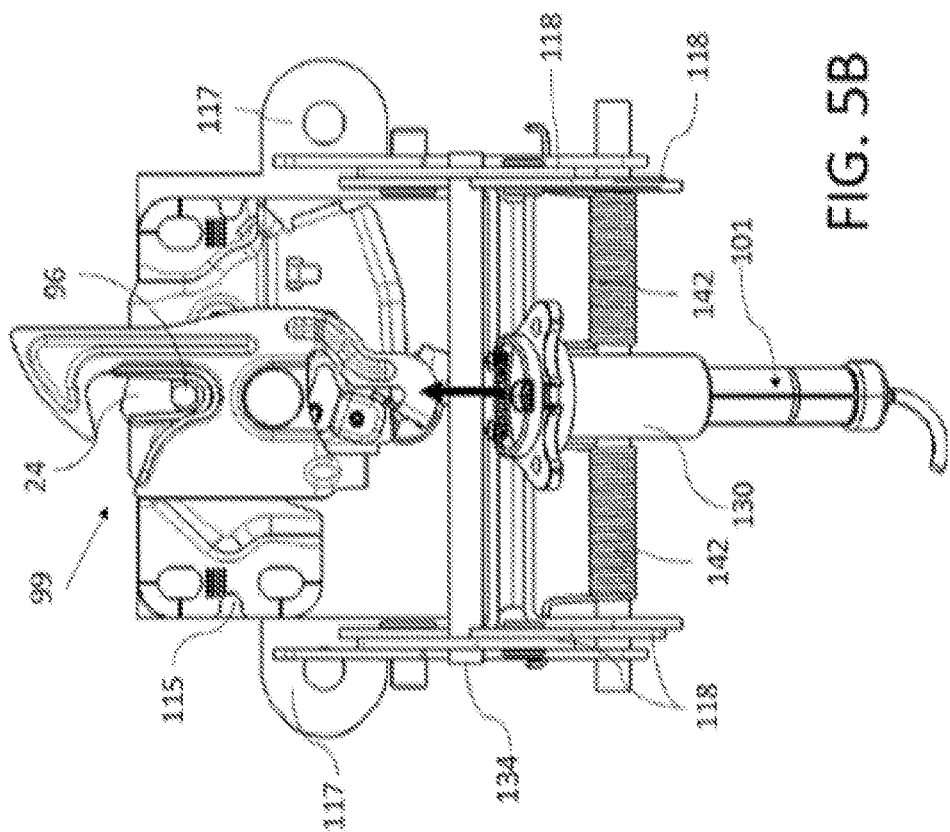
FIGS. 5a and 5b show respectively a side and front view of the latch of FIG. 1 as released while yet in the home position.
Figure 5A:
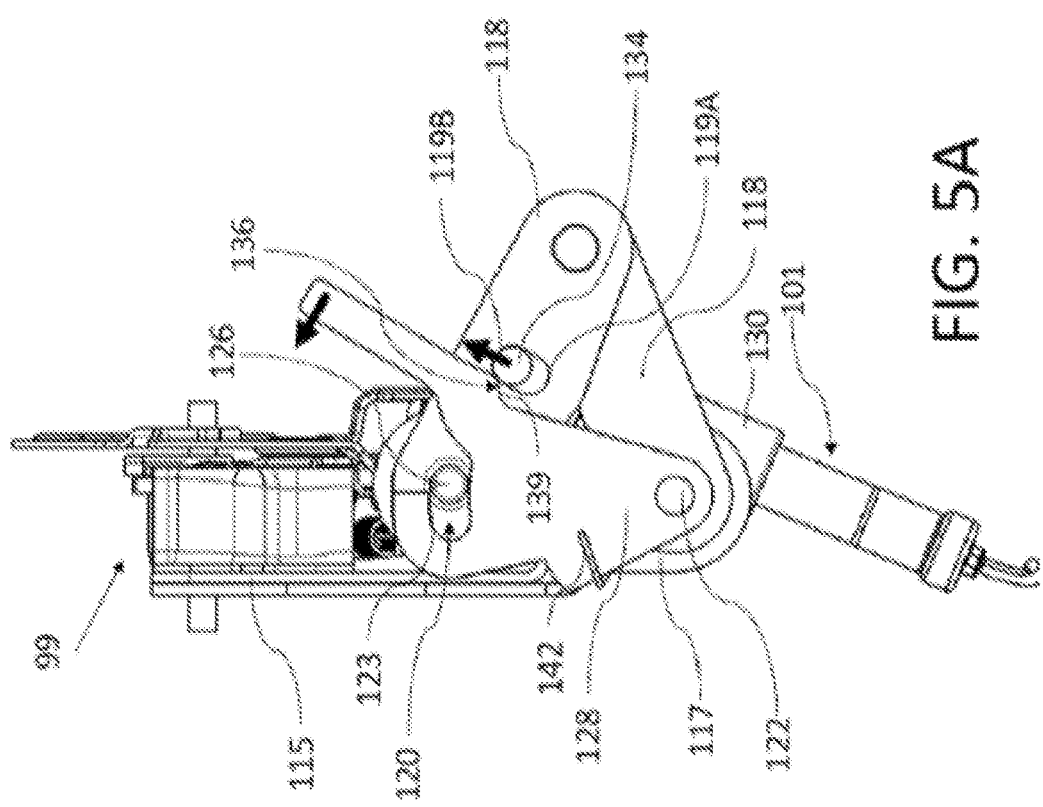
Figure 5D:
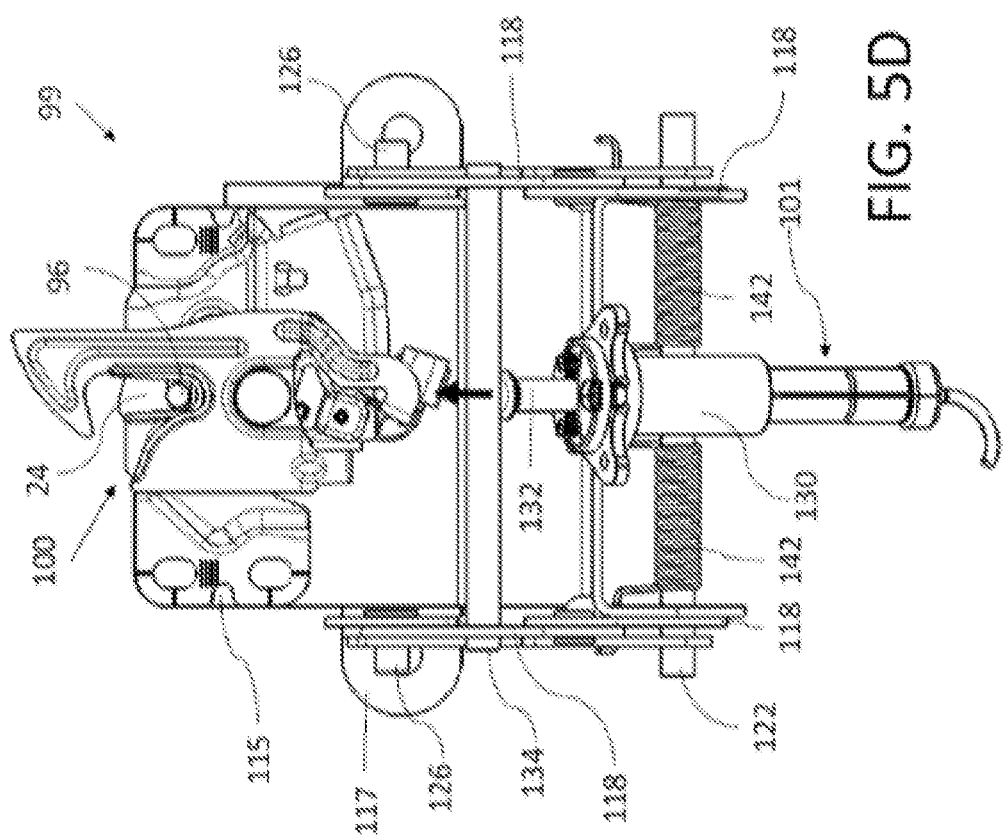
FIGS. 5c and 5d show respectively a side and front view of the latch of FIG. 1 as released and in a partially deployed position.
Figure 5C:
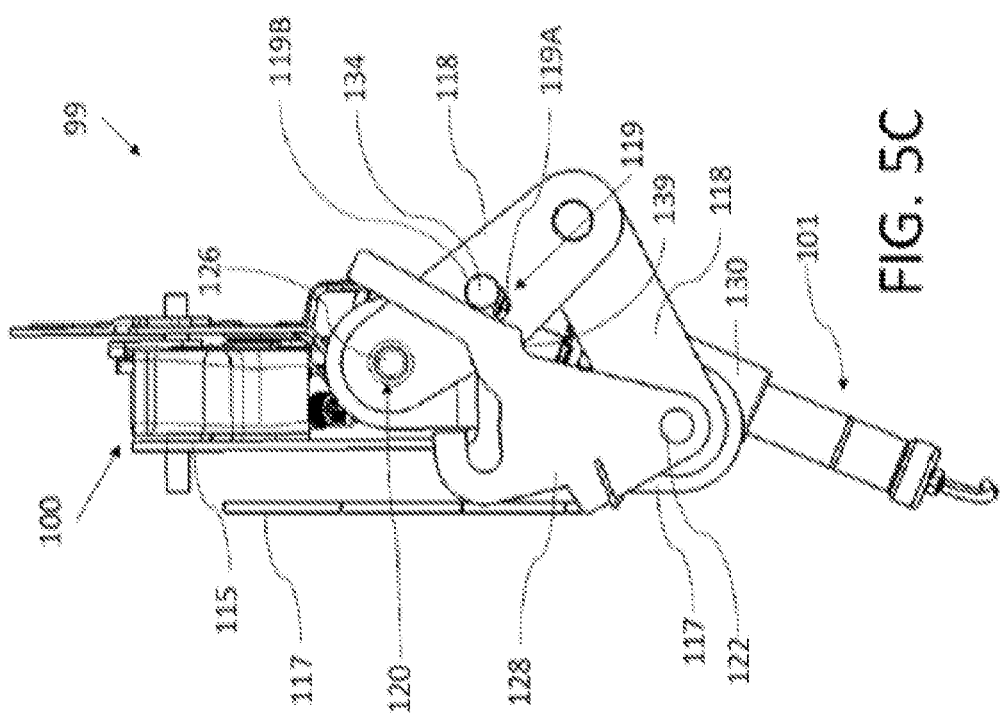

In operation, as shown in FIGS. 4a, to 6b, the latch 10 is first (in FIG. 1A) held in the home position by retention of locking member 128 with pin 126. In this state, the linkages 118 are also retracted as pivots 120,122 are adjacent to one another as the mounting plate 115 is seated adjacent to the support plate 117. Next, as shown in FIG. 5a, 5b, the locking member 128 is decoupled from the pin 126. This decoupling (e.g. the pin 126 is removed from the notch 123 is shown by example only, as a result of initial movement (i.e. deployment) of the piston 132 by the actuation mechanism 101, as the locking member 128 is rotated about pivot 122 against its bias towards the pin 126. FIG. 5c, 6d shows the latch 100 (and mounting plate 115) in the partially extended position. FIG. 6a, 6b shows the latch 100 (and mounting plate 115) in the extended position as indicated by the travel distance A vertically from the home position as well as travel distance B horizontally from the home position. For example, the travel distances A,B facilitate the extended movement of the latch 100 about the pivot position of the hood 6 via hinge 98 (see FIG. 1A). It is recognized that the latch 100 can be closed (i.e. latched such that the striker 96 is retained in by the ratchet 24—see FIG. 2) when the latch 100 is in the home (see FIG. 3,4) and/or extended (see FIG. 6a, 6b,7) positions.

As such, referring to FIG. 6,7, the latch 100 as shown has an active pop-up height, e.g. min 60 mm pop-up height during active firing of the actuator mechanism 101. After latch 100 firing (e.g. deployment of the pyrotechnic actuator) the deactivation (return to secondary position) can be done by pulling an inside release handle. For example, there can be no pressure in the actuator piston after active firing of the chemical actuator. A secondary catch can be attached to the latch or to the striker, as desired. The latch 100 of FIG. 3 can be a modular latch assembly.

Referring again to FIGS. 3 and 4, biasing member 142a, e.g. torsion spring, can be used to bias the linkage 118 positions in the home position and to otherwise maintain contact between the piston 132 and the actuator link 134 during movement thereof. As shown, the linkages 118 have a pair of links on either side of the support plate 117, however it is envisioned that other configurations of linkages 118 can be used as desired. In order to translate/rotate the latch 100 from the home to the extended position.

Figure 11B:
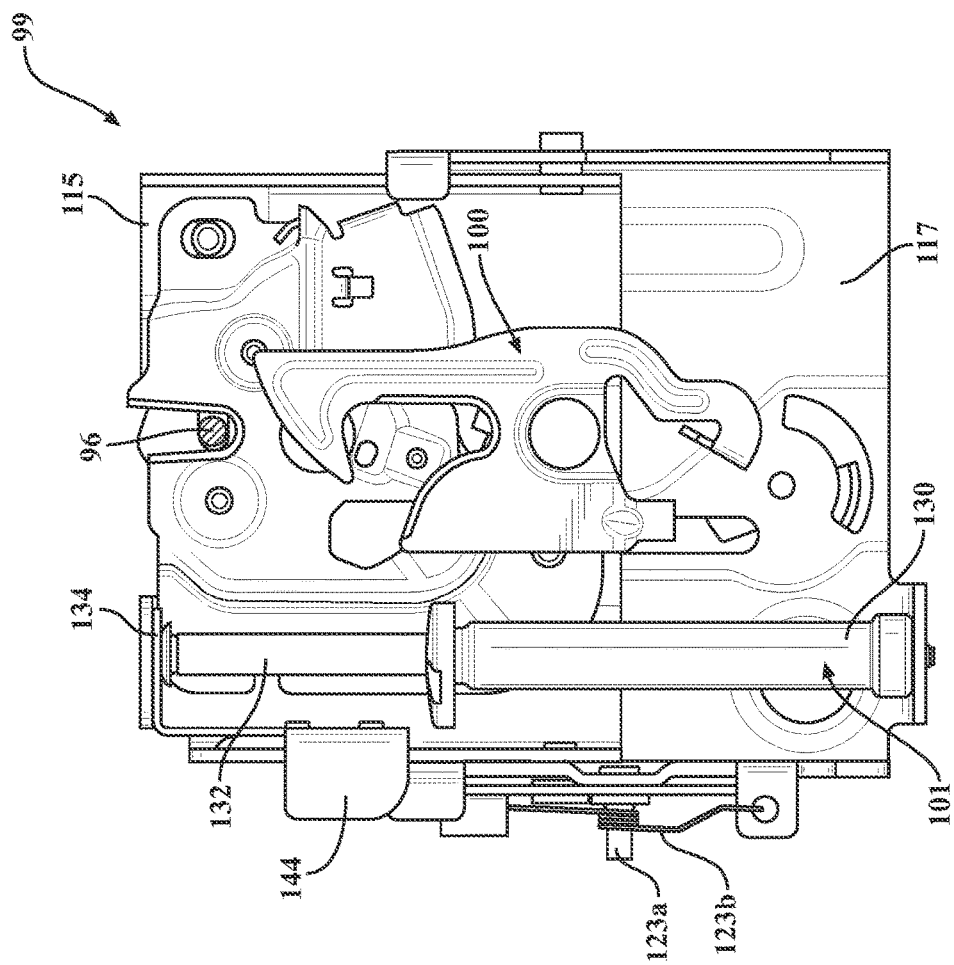
FIG. 11b is a front view of the actuation system shown in FIG. 8a in an extended position.
Figure 11A:
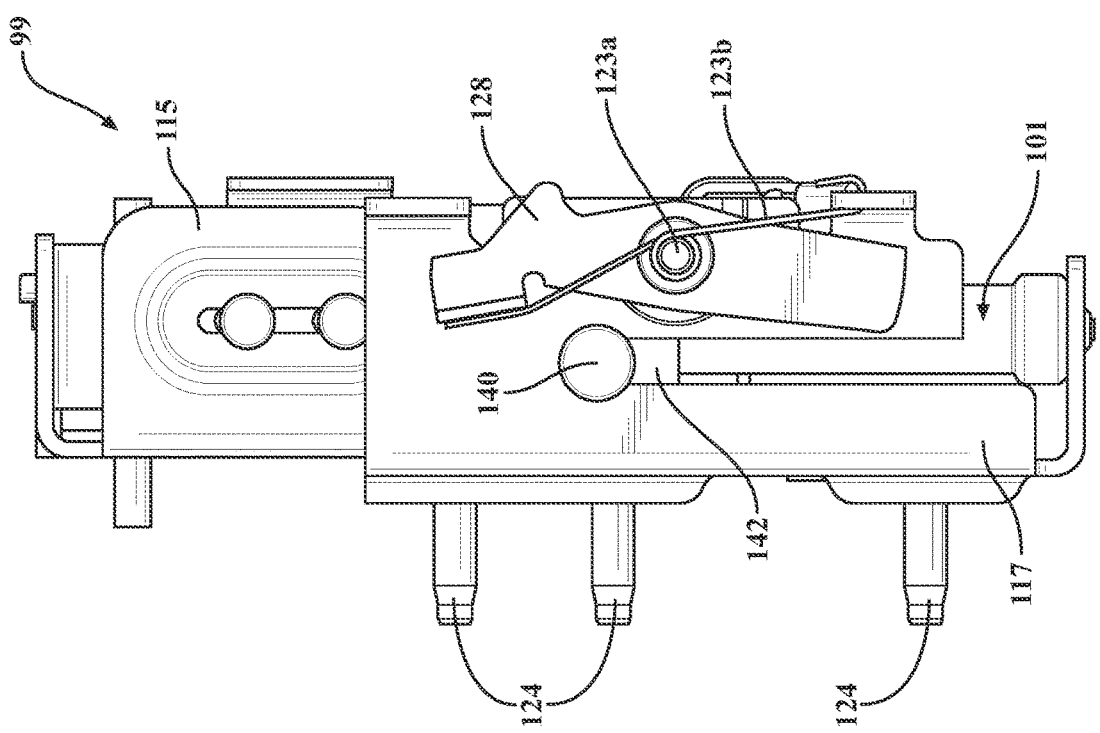
FIG. 11a is a side view of the actuation system shown in FIG. 8a in an extended position.

Referring to FIGS. 8a,b, 9a,b, 10a,b, 11a,b, a further embodiment of the latch 100 and associated actuation mechanism 101 is shown. The actuation mechanism 101 can include the support plate 117 that can connect to the mounting plate 115 of the latch 100 and thereby can form part of the latch housing, as desired. The mounting plate 115 is coupled to the support plate 117 via pins 140 and slot 142 arrangement, such that the pins 140 are connected to the mounting plate 115 and the slots 142 are formed in the support plate 117 (recognizing that the opposite configuration can also be provided). Two or more pins 140 may also be provided, and for example to prevent a tilting motion TM of mounting plate 115. During operation, the pins 140 travel along the slot 142 as the actuation mechanism 101 moves the latch 100 from the retracted to the extended position. The support plate 117 can be connected to the body 5 (see FIG. 1A) via mounting holes 124. An abutment 144 (e.g. decoupling plate) is positioned on the mounting plate 115 for coupling with the locking member 128 (e.g. locking hook—for example mounted on the support plate 117) when the latch 100 is in the home (or non-extended) position (see FIG. 8a), such that when the abutment 144 is retained by the locking member 128 (e.g. in notch as shown by example) the latch 100 is inhibited from extending (as shown in FIGS. 11a and 11b in the extended position). The locking member 128 can be configured to pivot about a pivot point (e.g. pivot 123a), such that the locking member 128 is biased about the pivot point 123a by a biasing member (e.g. spring 123b) into contact with the abutment 144 for retaining the latch 100 in the home or non-extended position (e.g. receiving of the abutment 144 in notch of the locking member 128). It is recognized that operations other than pivoting (e.g. linear extension and retraction—not shown) of the locking member 128 with respect to the abutment 144 can be envisioned as desired.

Referring again to FIG. 8a, the actuation mechanism 101 can be mounted on the body 5 (see FIG. 1a) or on the support plate 117 itself, such that operation of the actuation mechanism 101 can be used to decouple the abutment 144 from the locking member 128, thus facilitating movement of the latch 100 from the home position (see FIGS. 8a, 8b, 9a, 9b) to the extended position (see FIGS. 11a, 11b). The actuator mechanism 101 can have the housing 130 with actuation means (e.g. (pyrotechnic) for extending and retracting the piston 132 (see FIGS. 11a,11b) for facilitating movement of the latch 100 (as well as mounting plate 115) between the home and extended positions.

Figure 10A:
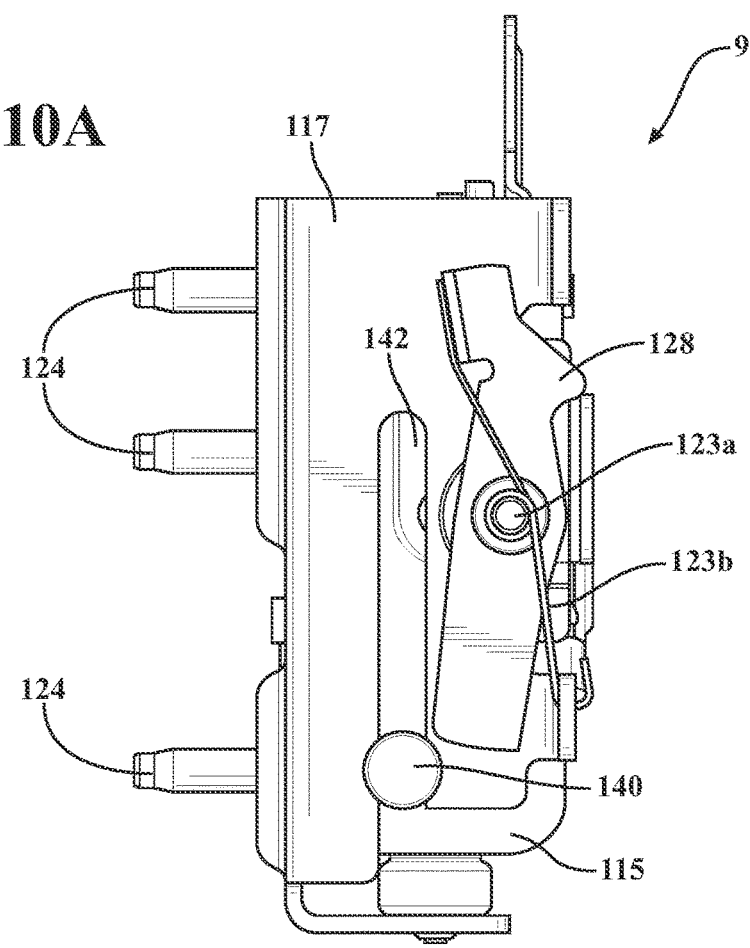
FIG. 10a is a side view of the actuation system shown in FIG. 8a in an unlocked state.
Figure 10B:
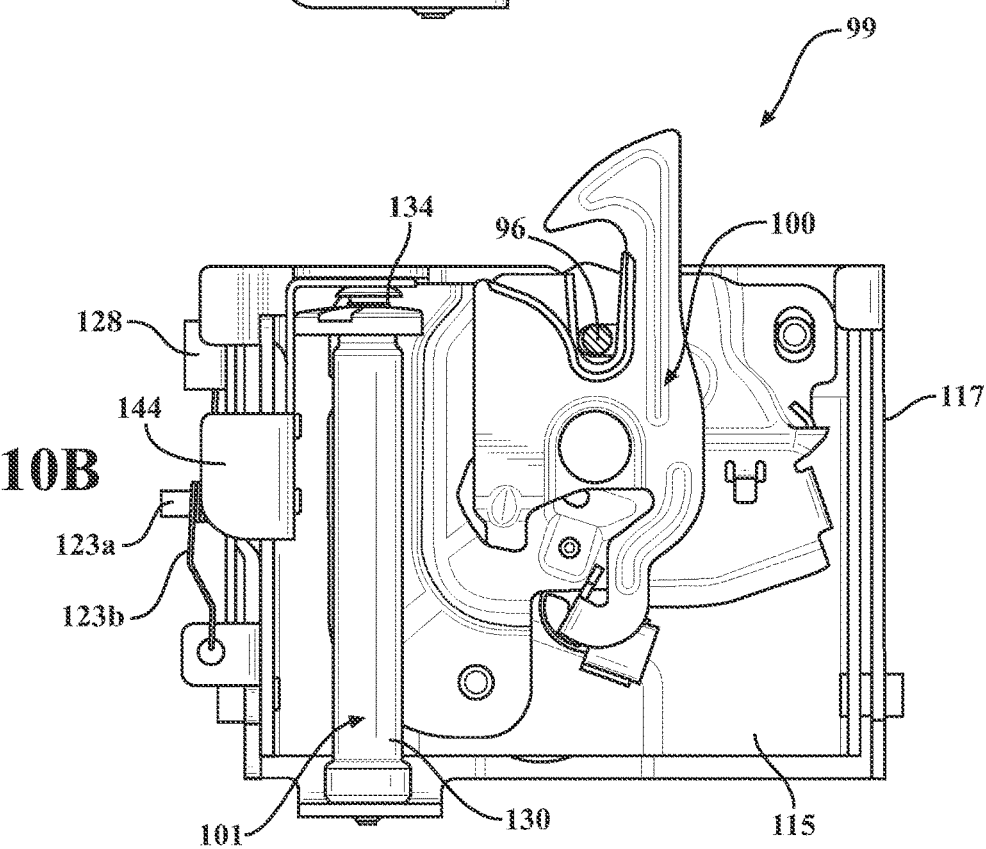
FIG. 10b is a front view of the actuation system shown in FIG. 8a in an unlocked state.

One example of the interaction of the piston 132 with the latch 100 is shown in FIG. 8a, such that an actuator link 134 (e.g. tab) is connected to the mounting plate 115, such that the force of the piston 132 on the actuator link 134 causes the mounting plate 115 to extend and thus move the latch 100 from the home position to the extended position. As shown in FIGS. 10a, 10b, initial actuation of the actuation mechanism 101 causes the abutment 144 to act on the locking member 128 (thus pivoting the locking member 128 about the pivot 123a against the bias of the biasing member 123b). Once pivoted, the locking member 128 is taken out of contact (i.e. disengaged) with the pins 140, thus freeing them to move within the slot 142. Shown in FIGS. 11a, 11b is the latch 100 with the mounting plate 115 in the extended position, for example with the pins 140 reaching their full travel extent in the slots 142, due to piston 132 acting on the actuation link 134 via extension from the housing 130 mounted on the body 5 and/or support plate 117.

Referring to FIGS. 12a, 12b, 13a, 13b, 14a, 14b a further embodiment of the latch 100 with actuation mechanism 101 is shown. The actuation mechanism 101 can include the support plate 117 that can connect to the mounting plate 115 of the latch 100 and thereby can form part of the latch housing (not shown), as desired. It is recognized that in the embodiment of the latch 100 shown, the mounting plate 115 is connected to the support plate 117 via linkages 118, e.g. on either side of the mounting plate 115, such that the linkages 118 are connected by a hinge or pivot 120 at one end to the mounting plate 115 and at the other end via a hinge or pivot 122 to the support plate 117. The support plate 117 can be connected to the body (see FIG. 1A) via mounting holes 124.

Figure 14B:
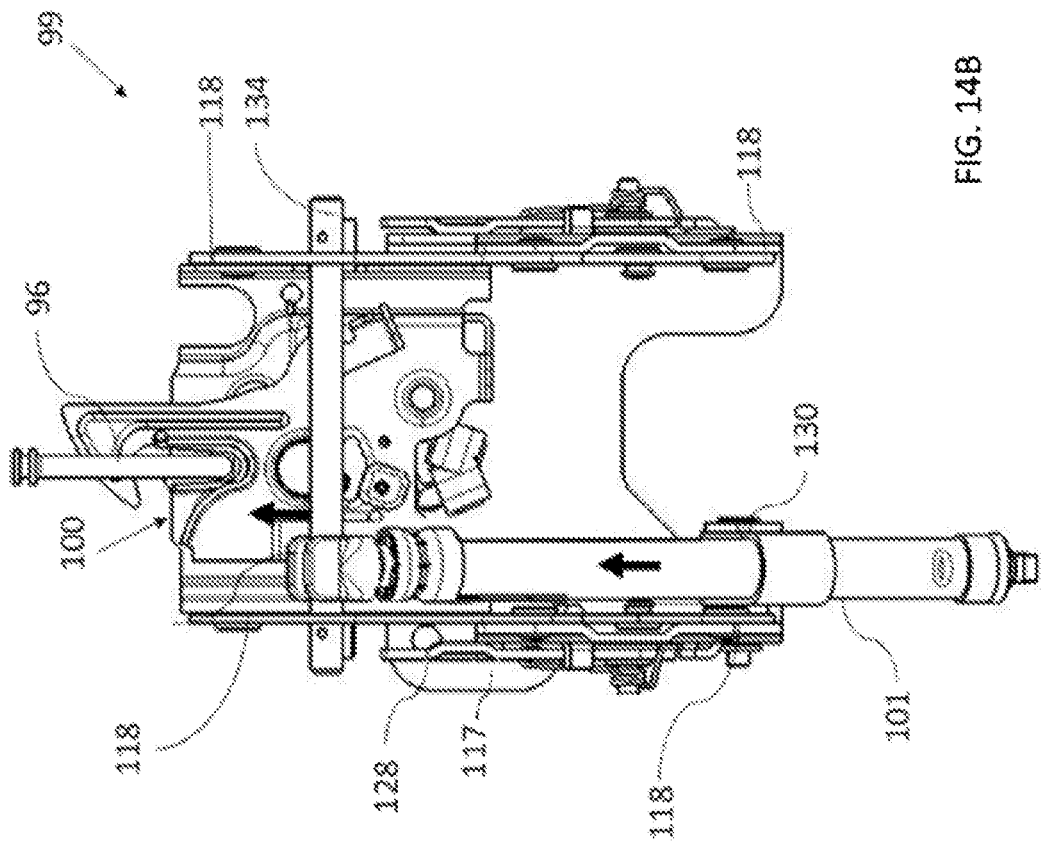
FIG. 14b is a front view of the actuation system shown in FIG. 12a in an extended position.
Figure 14A:
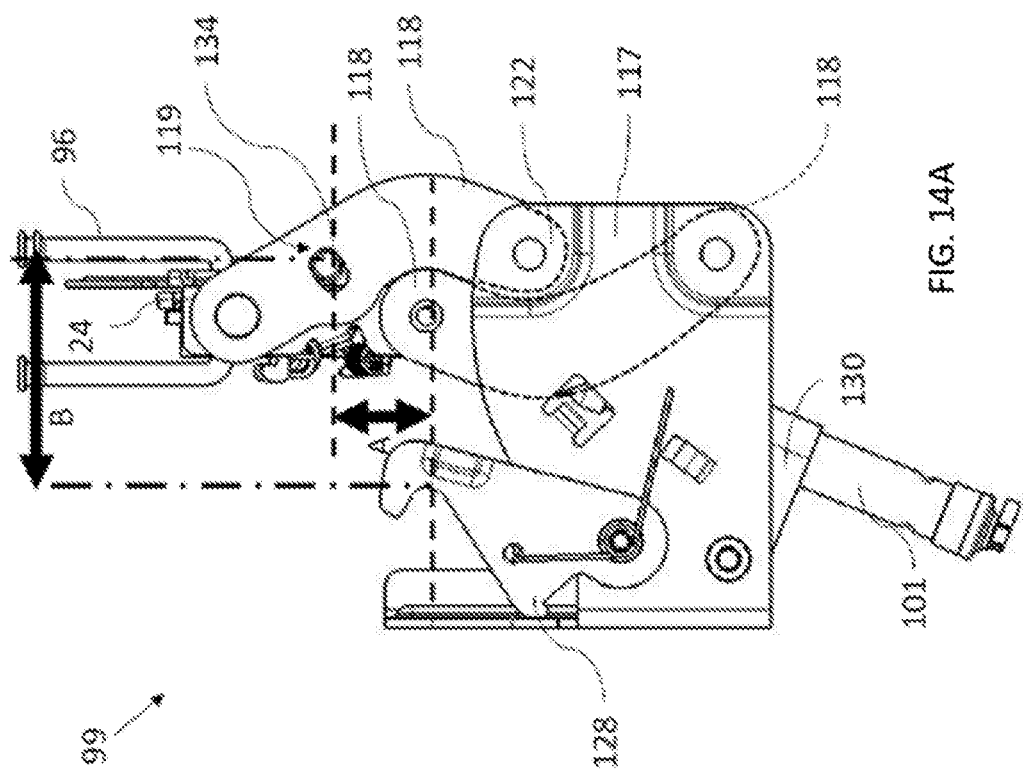
FIG. 14a is a side view of the actuation system shown in FIG. 12a in an extended position.

Referring again to FIG. 12a, the actuation mechanism 101 can be mounted on the body 5 (not shown) or on the support plate 117 itself, such that operation of the actuation mechanism 101 can be used to facilitate movement of the latch 100 from the home position (see FIG. 12a,b) to the extended position (see FIGS. 14a,b). The actuator mechanism 101 can have the housing 130 with actuation means (e.g. pyrotechnic) for extending and retracting the piston 132 (see FIG. 14b) for facilitating movement of the latch 100 (as well as mounting plate 115) between the home and extended positions.

Figure 12A:
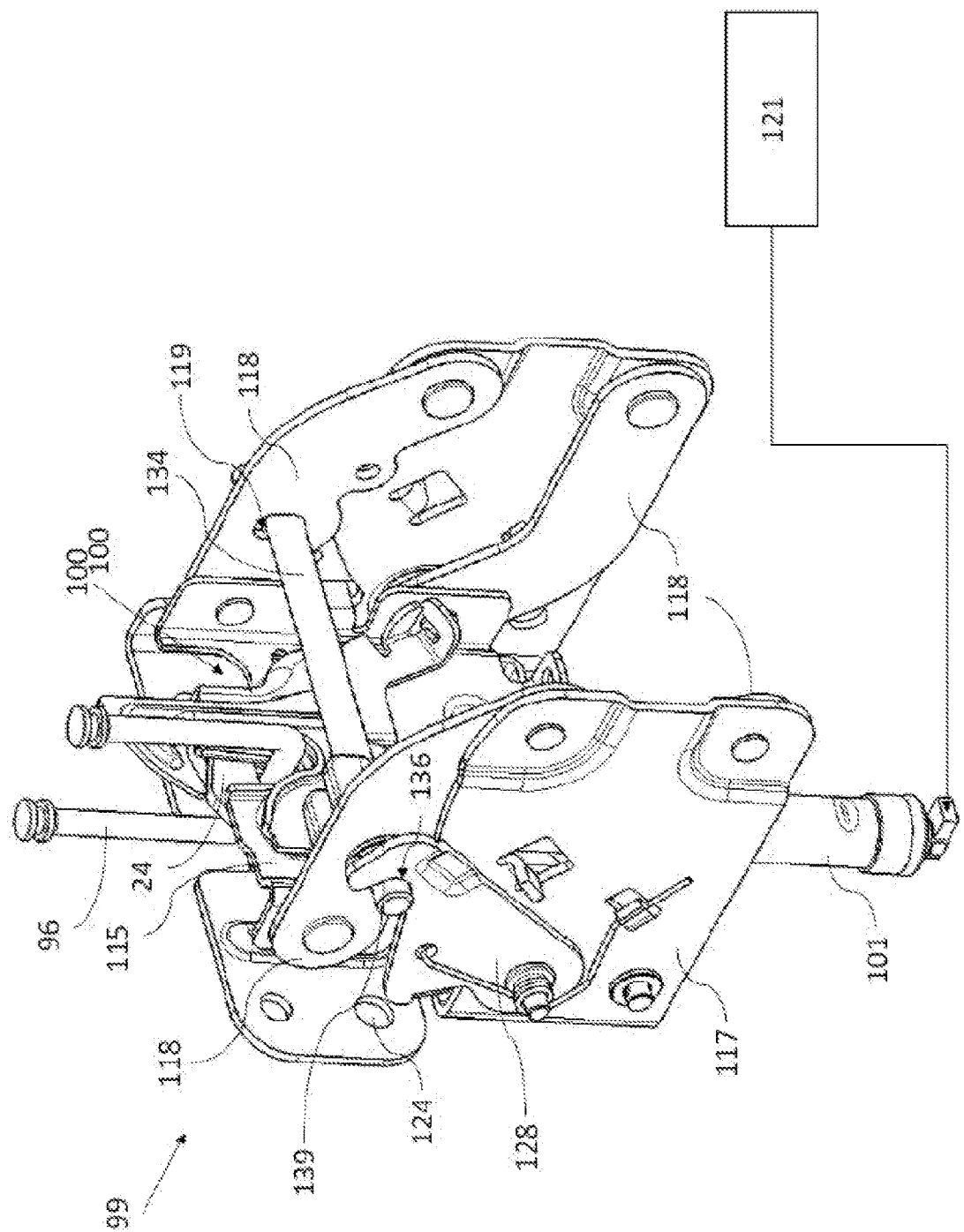
FIG. 12a is a front perspective view of a still further embodiment of the actuation system shown in FIG. 3.
Figure 13B:
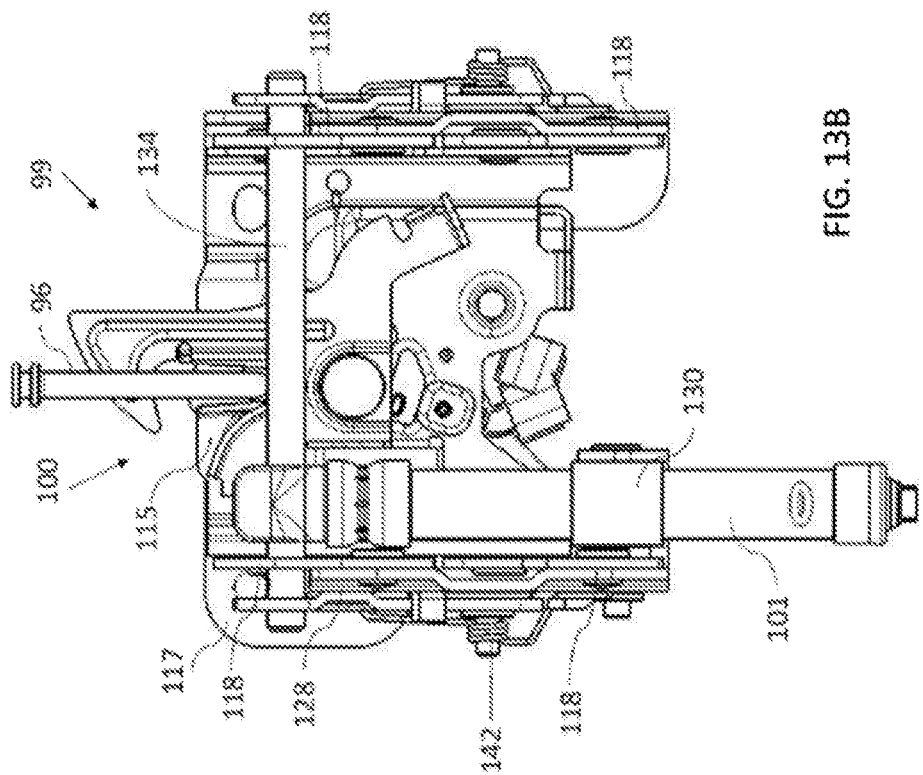
FIG. 13b is a front view of the actuation system shown in FIG. 12a in a home position.
Figure 13A:
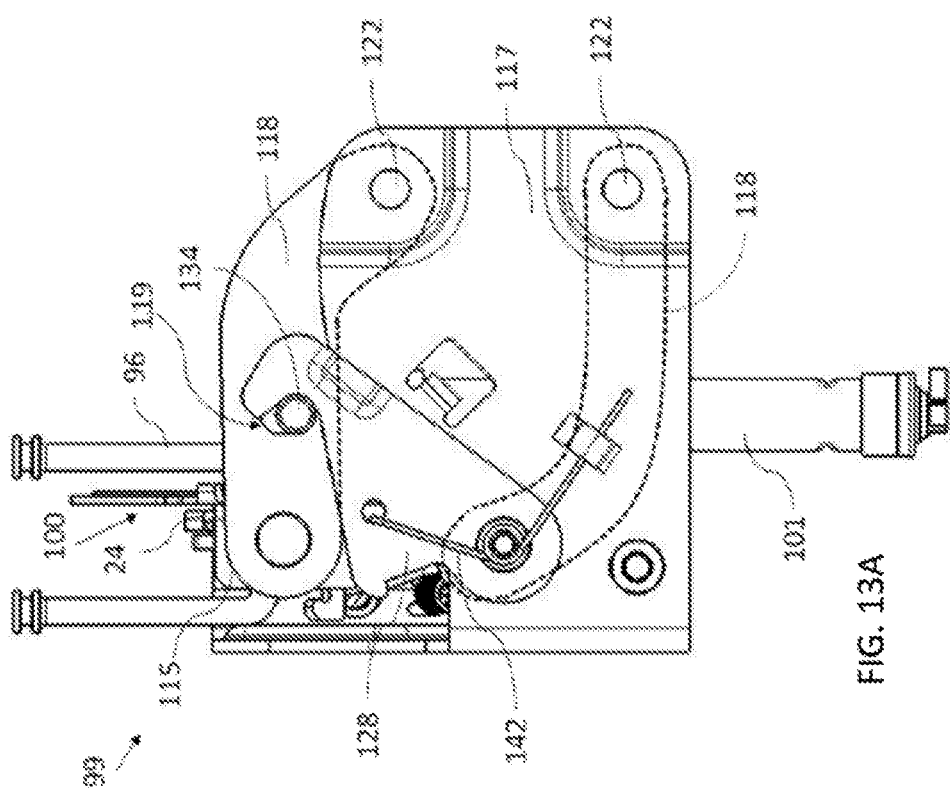
FIG. 13a is a side view of the actuation system shown in FIG. 12a in a home position.

Referring to FIGS. 12a and 14b, the piston 132 is coupled via a coupling member 148 (e.g. U-shaped member) mounted on the head of the piston 132 to the actuator link 134. As such, the piston 132 is coupled to the linkages 118, such that a force of the piston 132 on the actuator link 134 causes the linkages 118 to extend and thus move the latch 100 from the home position to the extended position. The actuator link 134 has abutting contact with the abutment member 148 to be able to therefore urge the linkages 118 into an upward motion as guided by the motion of the piston 132 during an additional travel of the actuator link 134. However, it is recognized that the actuator link 134 can be positioned on the latch 100, itself and/or the mounting plate 115 (for example) in order to provide for extension of the latch 100 when acted upon by the piston 132 (as driven by the actuator mechanism 101).

Figure 15:
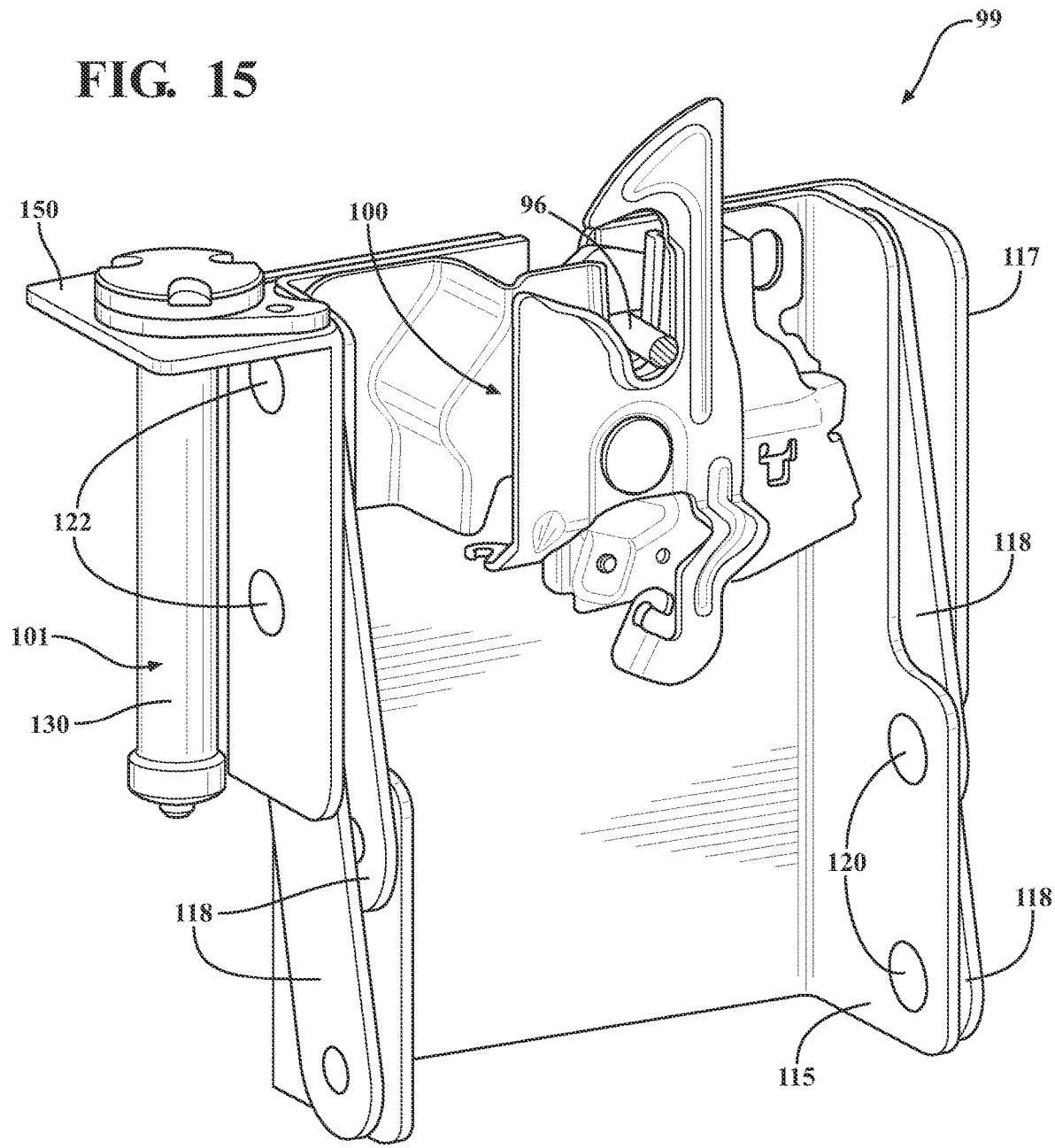
FIG. 15 is a front perspective view of a still further embodiment of the actuation system shown in FIG. 3.
Figure 16B:
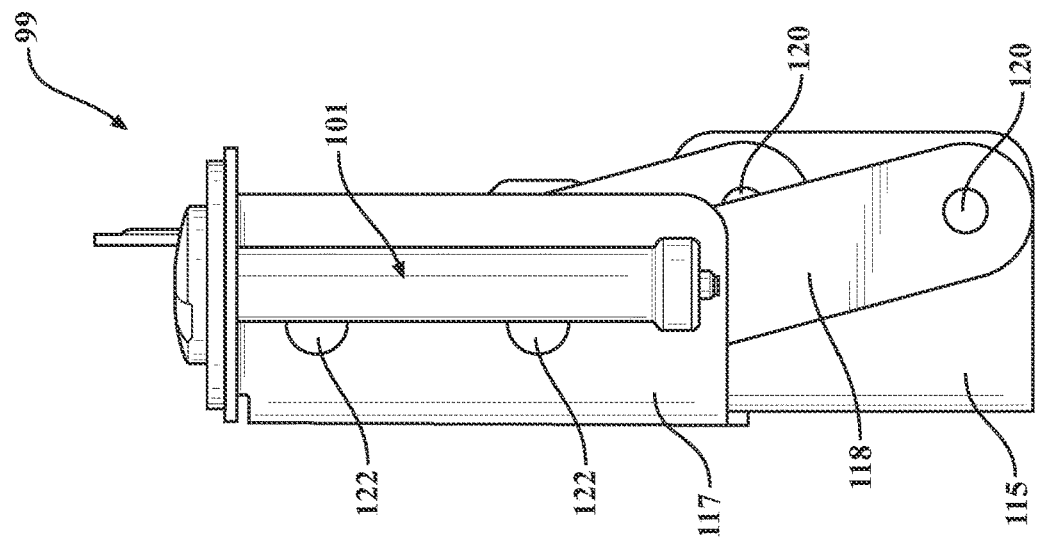
FIG. 16b is a front view of the actuation system shown in FIG. 15 in a home position.
Figure 16A:
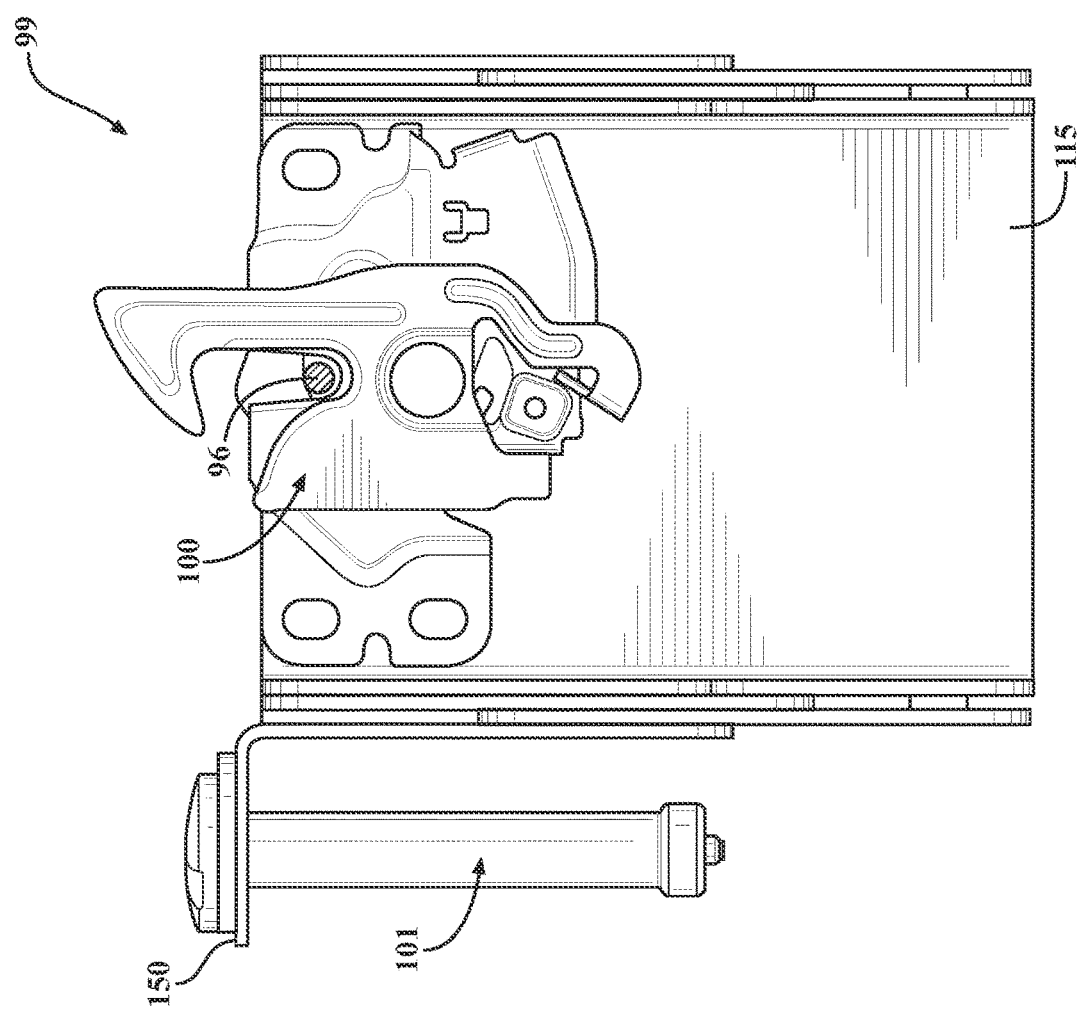
FIG. 16a is a side view of the actuation system shown in FIG. 15 in a home position.
Figure 17B:
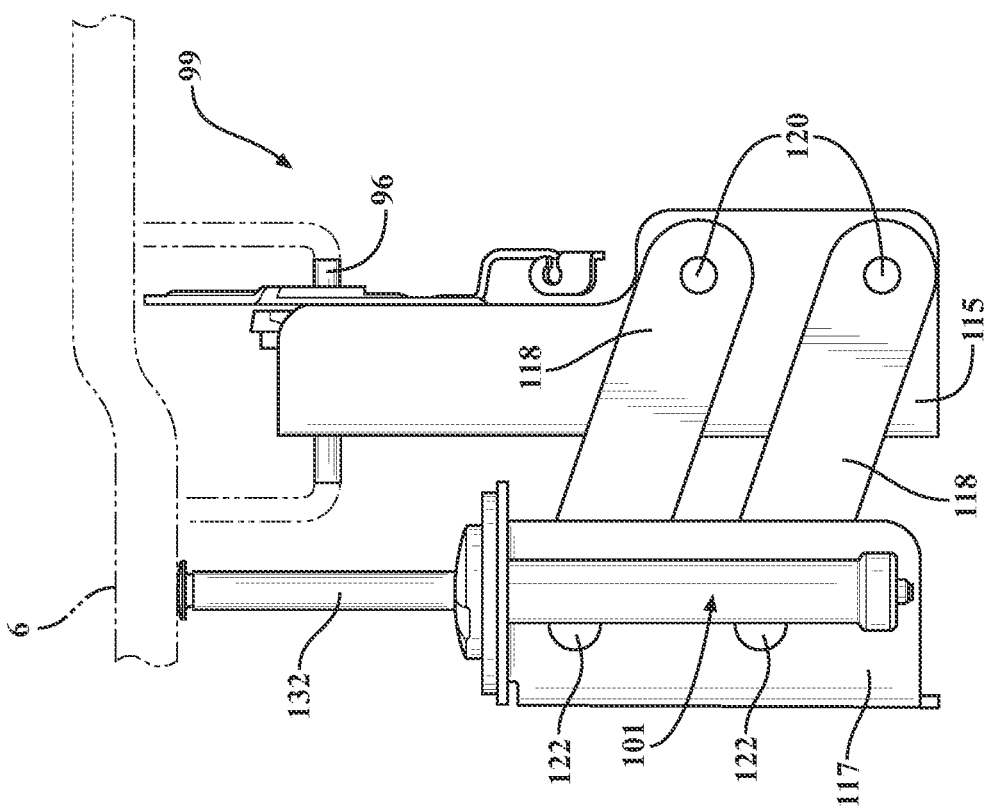
FIG. 17b is a front view of the actuation system shown in FIG. 15 in an extended position.
Figure 17A:
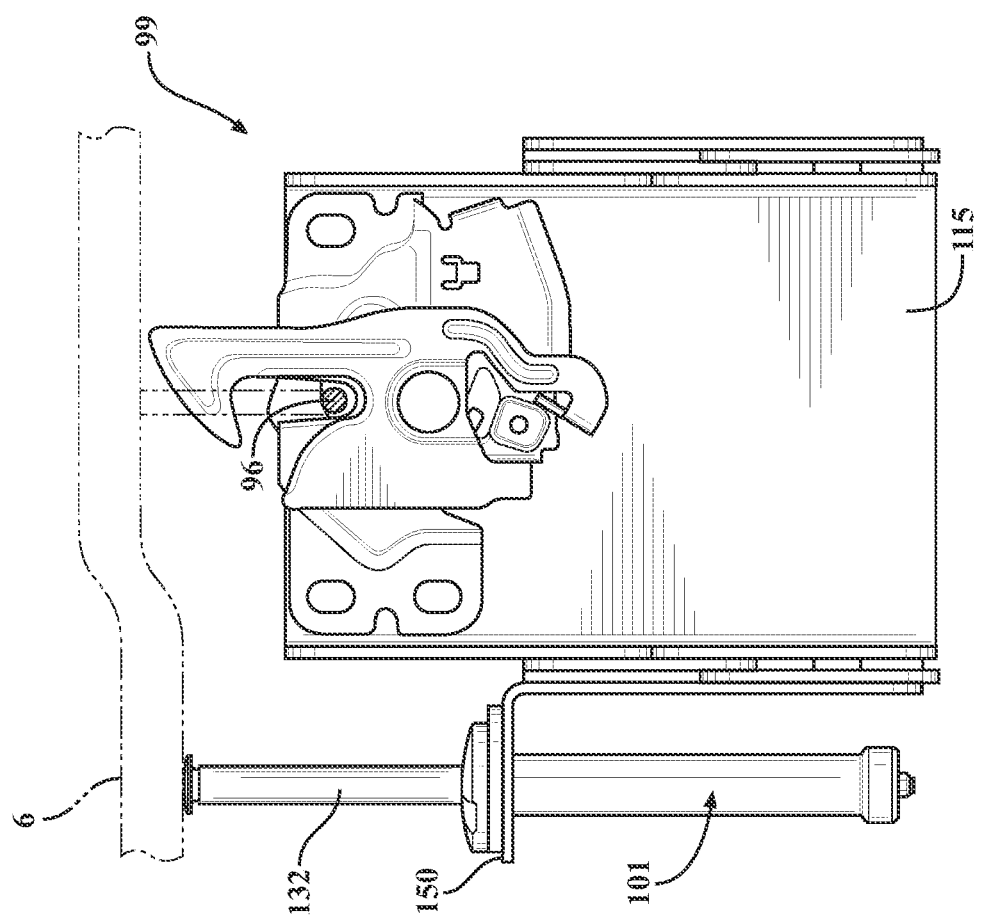
FIG. 17a is a side view of the actuation system shown in FIG. 15 in an extended position.

Referring to FIGS. 15, 16a,b, 17a,b, shown is a further embodiment of the latch 100 coupled to actuation mechanism 101. In this embodiment, it should be noted that the closure panel 6 (e.g. hood) is not shown for clarity purposes only in FIGS. 15, 16a,b, but is shown in FIGS. 17a,b in ghosted view. It should be recognized that for this embodiment, the piston 132 (see FIGS. 17a,b) acts directly on the closure panel 6, rather than on the link member 134 coupled to the mounting plate 115 (for example see FIG. 12a). The actuation mechanism 101 can include the support plate 117 that can connect to the mounting plate 115 of the latch 100 and thereby can form part of the latch housing (not shown), as desired. It is recognized that in the embodiments of the latch 100 shown in this embodiment, the mounting plate 115 is connected to the support plate 117 via linkages 118, such that the linkages 118 are connected by a hinge or pivot 120 at one end to the mounting plate 115 and at the other end via a hinge or pivot 122 to the support plate 117. The support plate 117 can be connected to the body 5 (see FIG. 1A) via mounting holes (not shown).

Referring again to FIG. 15, the actuation mechanism 101 can be mounted on the body 5 or on the support plate 117 itself, for example via support member 150 connected to the support plate 117. Operation of the actuation mechanism 101 can be used to extend and thus push the piston 132 (see FIG. 17a,b) against the closure panel 6 (e.g. inside surface of the closure panel 6), thus facilitating movement of the latch 100 from the home position (see FIG. 16a,b) to the extended position (see FIGS. 17a,b). In this embodiment, it is recognized that the piston 132 acts on the closure panel 6 itself, which then causes the striker 96 (in view of the latch 100 still being locked or otherwise engaged with the striker 96) to pull the latch 100 and associated mounting plate 115 away from the support plate 117. The travel of the latch 100 and mounting plate 115 is guided by the linkages 118 connecting the support plate 117 to the mounting plate 115. The actuator mechanism 101 can have the housing 130 with actuation means (e.g. pyrotechnic) for extending and retracting the piston 132 (see FIGS. 17a.b) for facilitating movement of the latch 100 (as well as mounting plate 115) between the home and extended positions, as the latch 100 follows (rather than drives) the movement of the closure panel 6. In FIGS. 17a,b, it is noted that the closure panel 6 is secured to the striker 96, such that the closure panel 6 and the striker 96 move simultaneously under influence of the piston 132 travel.

Figure 18:
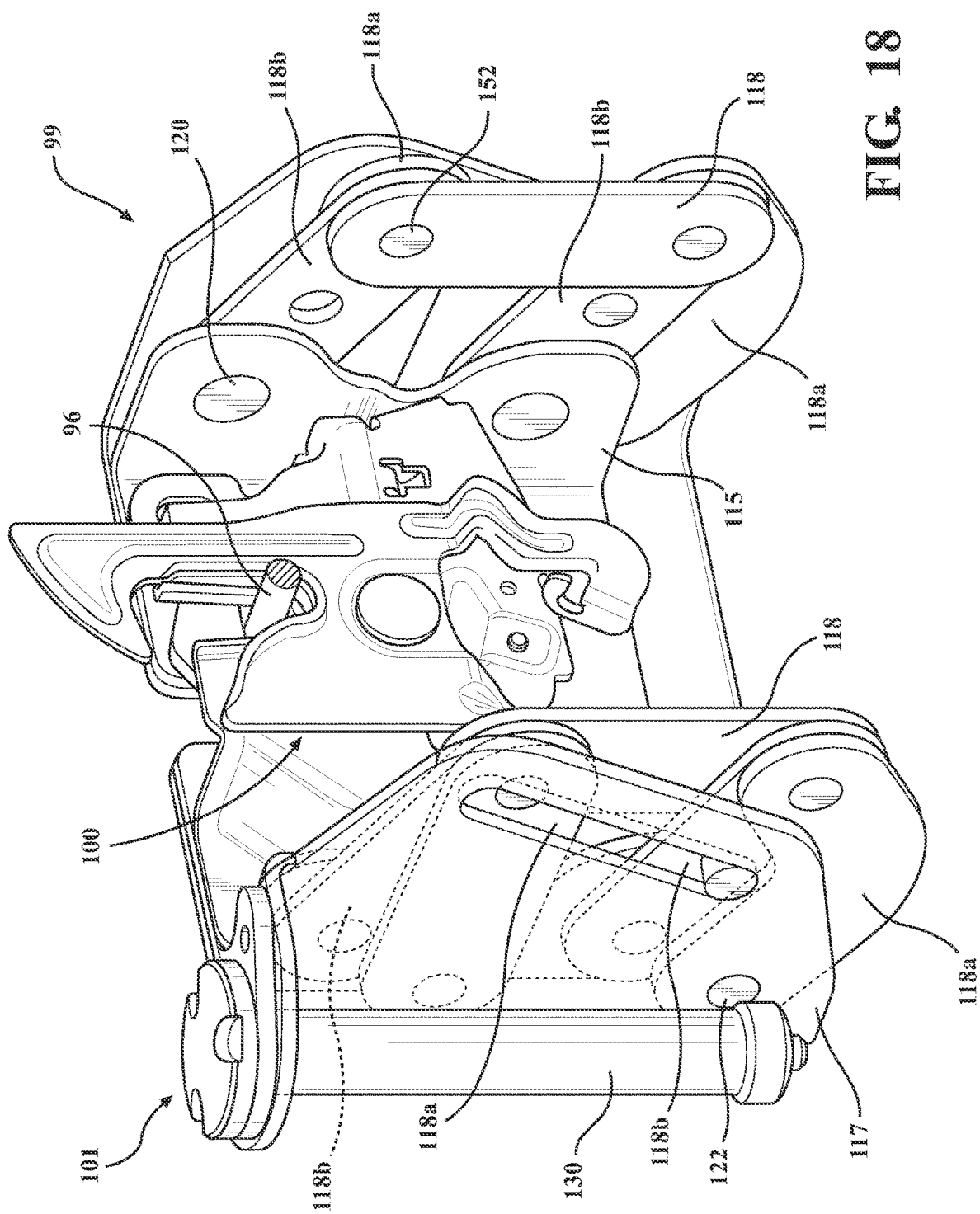
FIG. 18 is a front perspective view of a still further embodiment of the actuation system shown in FIG. 3.
Figure 19B:
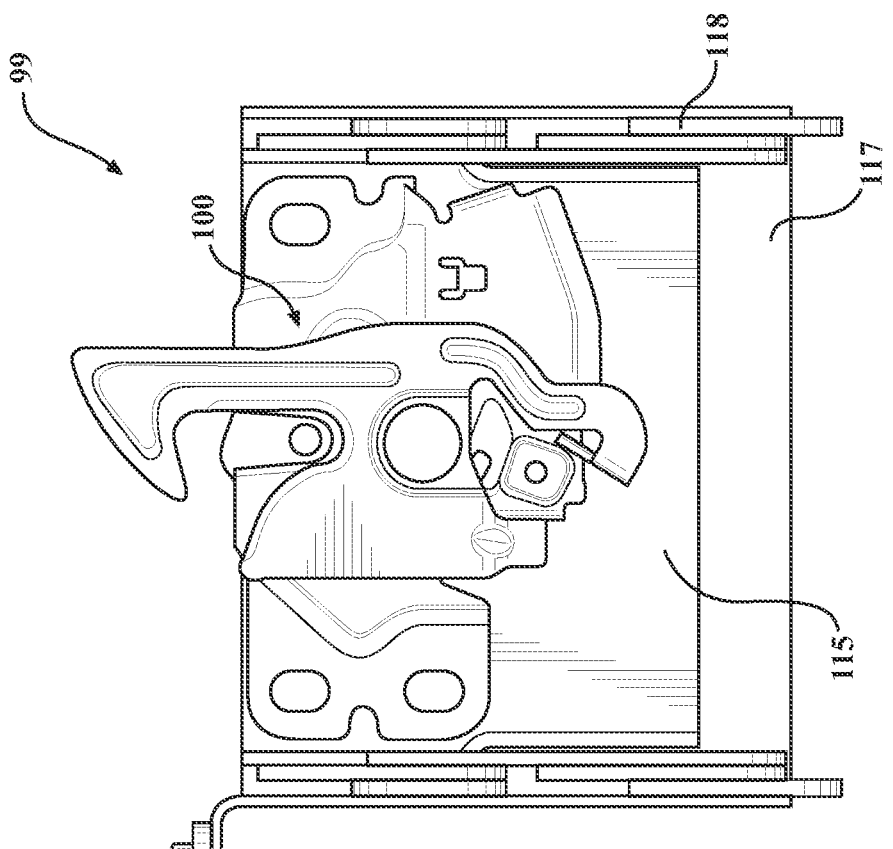
FIG. 19b is a front view of the actuation system shown in FIG. 18 in a home position.
Figure 19A:
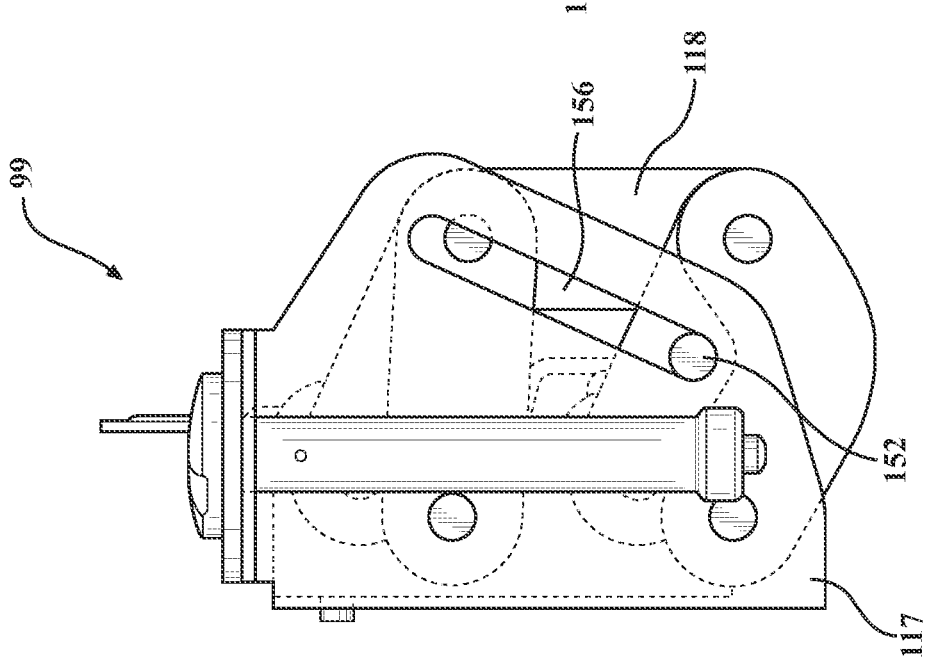
FIG. 19a is a side view of the actuation system shown in FIG. 18 in a home position.
Figure 20B:
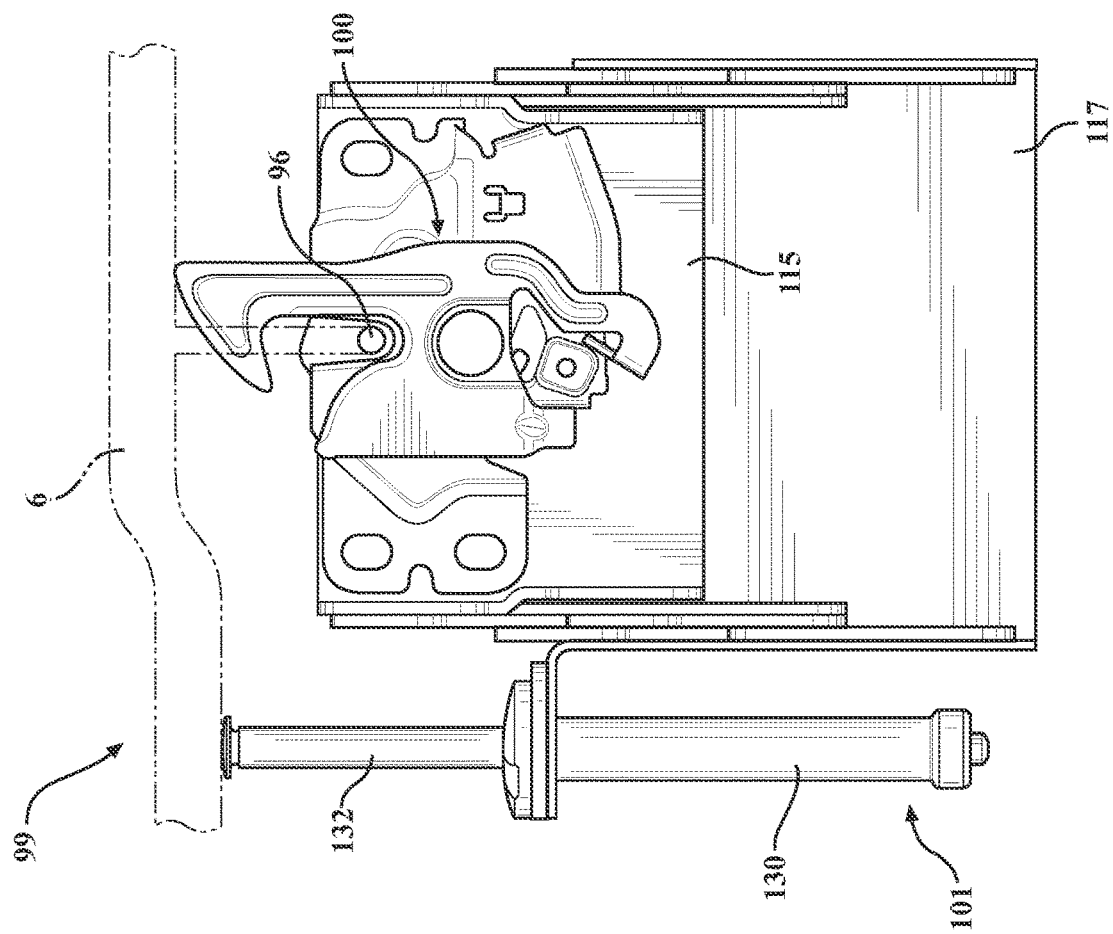
FIG. 20b is a front view of the actuation system shown in FIG. 18 in an extended position.
Figure 20A:
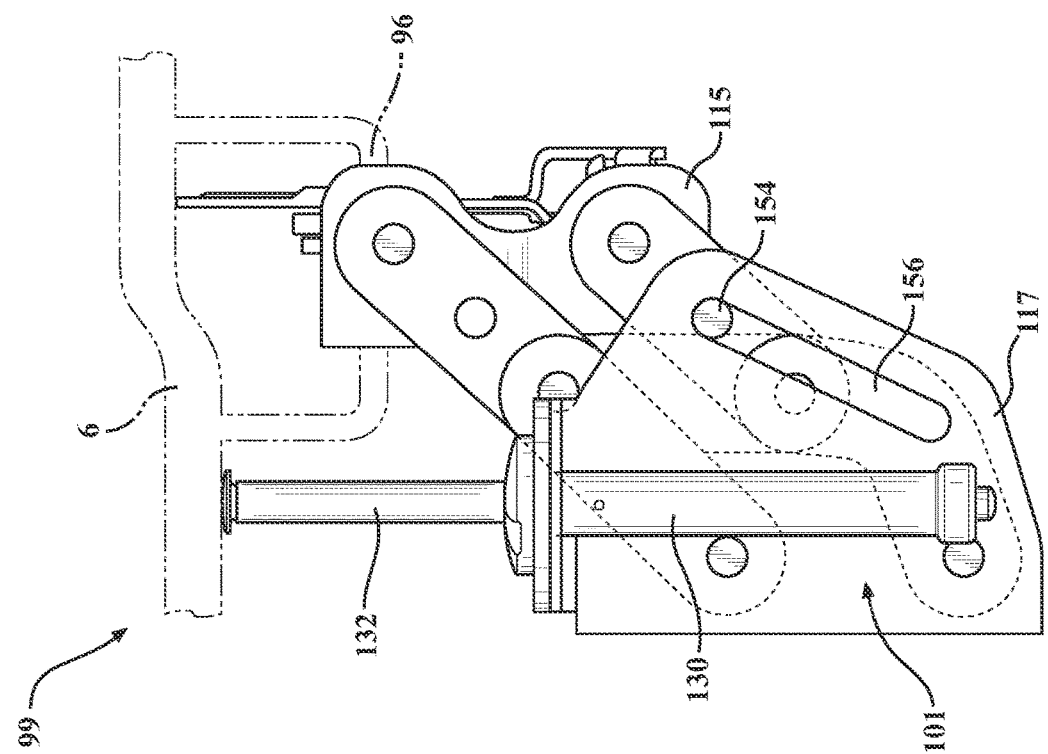
FIG. 20a is a side view of the actuation system shown in FIG. 18 in an extended position.

Referring to FIGS. 18, 19a,b, 20a,b, a further embodiment of the latch 100 coupled to actuation mechanism 101 is shown. Similar to the embodiment shown in FIG. 15, the piston 132 of the actuation mechanism 101 acts directly on the closure panel 6 (see FIGS. 20a,b). In addition to the embodiment of FIG. 15, FIG. 18 shows a first set of linkages 118a connected to a second set of linkages 118b. The first set of linkages 118a are connected to the support plate 117 by pivots 122 and the second set of linkages 118b are connected to the mounting plate 115 by pivots 120. The linkages 118a,118b can be interconnected by pivots 152. Pivots 152 have an axis 151 about which linkages 118a, 118b rotate where axis 151 is illustratively perpendicular to the planes of movement, for example an upwards movement A1 and rearwards B1 movement of mounting plate 115 relative to supporting plate 117. Linkages 118a, 118b are disposed in and move within a plane, for example plane P1 that is perpendicular to the plane of the mounting plate 115 and/or support plate 117, for example plane P2, P3, respectively. For example linkages 118a, 118b are disposed in and extend within a plane, for example plane P1 that is perpendicular to the plane P2 of the mounting plate 115 in which mounting plate 115 moves or travels, for example mounting plate 115 translates in two dimensions (for example upwardly and away from) relative to supporting plate 117 during a rotational movement, or expansion, of linkages 118a, 118b. A pin 154 and slot 156 arrangement is used to guide the motion of the mounting plate 115 with respect to the supporting plate 117. Operation of the actuation mechanism 101 can be used to extend and thus push the piston 132 (see FIG. 20a,b) against the closure panel 6 (e.g. inside surface of the closure panel 6), thus facilitating movement of the latch 100 from the home position (see FIG. 19a,b) to the extended position (see FIGS. 20a,b). In this embodiment, it is recognized that the piston 132 acts on the closure panel 6 itself, which then causes the striker 96 (in view of the latch 100 still being locked or otherwise engaged with the striker 96) to pull the latch 100 and associated mounting plate 115 away from the support plate 117.

Referring to FIGS. 21, 21a,b, 23a,b, 24a,b as a still further embodiment, the latch 100 can be coupled to actuation mechanism 101. The actuation mechanism 101 can include the support plate 117 that can connect to the mounting plate 115 of the latch 100 and thereby can form part of the latch housing (not shown), as desired. The mounting plate 115, the support plate 117 and the actuation mechanism 101 can be collectively referred to as a latch travel mechanism 99 or with inclusion with the latch 100 as a latch travel assembly 99, as desired. It is recognized that in the embodiments of the latch 100 shown, the mounting plate 115 is connected to the support plate 117 via linkages 118, such that the linkages 118 are connected by a hinge or pivot 120 at one end to the mounting plate 115 and at the other end via a hinge or pivot 122 to the support plate 117. Pivots 120, 122 illustratively have an axis 153 about which linkages 118 rotate where axis 153 is illustratively perpendicular to the planes of movement, for example an upwards A1 movement, or one dimensional movement, of mounting plate 115. Linkages 118 are disposed in and move within a plane that is parallel to the plane of the mounting plate 115 and/or support plate 117. For example plane P4 of linkages 118 is parallel to the plane of the mounting plate 115 and/or support plate 117, for example plane P2, P3, respectively. For example linkages 118 are disposed in and extend within a plane, for example plane P4 that is parallel to the plane P2 of the mounting plate 115 in which mounting plate 115 moves or travels, for example mounting plate 115 linearly translates relative to supporting plate 117 during a rotational movement or expansion of linkages 118. The support plate 117 can be connected to the body 5 (see FIG. 1A) via mounting holes 124. FIG. 21 illustrates a pair of opposed linkages 118, where each opposed linkages 118 is configured as a two-bar linkage. Other types of linkages 118 may be provided, such as a single or multiple bar linkage configuration.

The assembly 99 can have one or more pin(s) 126 (e.g. blocking rivets) for coupling with a locking member (e.g. locking hook) 128 when the latch 100 is in the home (or non-extended) position (see FIG. 22a,b), such that when the pin 126 is retained by the locking member 128 (e.g. in notch as shown by example) the latch 100 is inhibited from extending (as shown in FIGS. 24a,b in the extended position). The locking member 128 can be configured to pivot about a pivot point (e.g. pivot 127), such that the locking member 128 is biased about the pivot point by a biasing member (e.g. a spring 176 in cooperation with the decoupling plate 170) into contact with the pin 126 for retaining the latch 100 in the home or non-extended position (e.g. receiving of the pin 126 in notch 123 of the locking member 128 and/or into abutment of abutment surface 131 of the locking member 128 with the pin 126). It is recognized that operations other than pivoting (e.g. linear extension and retraction—not shown) of the locking member 128 with respect to the pin 126 can be envisioned as desired. As shown, the assembly 99 can have a pair of locking members 128, such that locking member 128 and the second locking member 128 are opposed to one another on either side of the pivot 127 (e.g. mirrored to one another). It is also recognized that one locking member 128 can be utilized in order to restrain the mounting plate in the home position, as desired.

Referring again to FIG. 21, the decoupling plate 170 is coupled to the actuation mechanism 101 at one end by a tab 172, such that force applied by the piston 132 (see FIG. 24a) of the actuation mechanism 101 on the tab 172 results in removal of an abutment 178 from abutment surface 180 of the locking member 128, thus allowing the locking member 128 to become decoupled from the pin(s) 126 upon further movement of the piston 132. For example, the decoupling plate 170 is connected to the mounting plate 115 by a pin 182 and slot 184 arrangement, such that movement of the decoupling plate 170 from a coupled to an uncoupled position is accomplished via travel of the pin(s) 182 in the slot 184. Two or more pins 182 may be provided to assist with preventing tilting TM of the mounting plate 115. Further, for example, as the pins 182 are connected to the mounting plate 115, as the pins 182 reach a travel stop 190 in the slot 184, further movement of the decoupling plate 170 by the piston 132 concurrently moves the mounting plate 115 and thus the latch 100 from the home position to the extended position (see FIG. 24b). It is recognized that the travel stop 190 could be positioned on the decoupling plate 170 other than with respect to the slot 184 (not shown), so long as once the travel of the decoupling plate 170 reaches the position shown in FIG. 23b for decoupling the stop 178 with the abutment surface 180 of the locking member 128, further travel of the decoupling plate 170 (under influence of the piston 132 travel) causes the travel stop 190 to engage with the mounting plate 115 and thus move the mounting plate 115 from the home position to the extended position. It is recognized that the movement of the linkages 118 guide the travel of the mounting plate 115 from the home position to the extended position, once the pins 126 are removed from the notches 123 of the locking member(s) 128.

Slot 124 includes inwardly protruding tabs 171 configured to engage pins 182 to restrict upward motion of mounting plate 115 below a predetermined force as applied by the pins 182 on the tabs 171 in response to upward movement of mounting plate 115. Inwardly protruding tabs 171 may be configured to be deformable, breakable, bendable, crushable or the like such that above the predetermined force applied by the pints 182 on the tabs 171, the pins 182 may bypass the tabs 171 and continue travel within slot 124 thereafter in an unrestricted upward motion of the mounting plate 115 as guided by the slot 124. Guide slot 124 and pins 140 arrangement as an example of a guide configuration provided between the mounting plate and the supporting plate 117 may also act to restrict a tilting motion TM of the mounting plate 115 during the deployment of the mounting plate 115 as a result of the extending linkages 118 to stabilize the mounting plate 115 and the linkage 118 during expansion of the linkages 118 from the collapsed state of the linkages 118, as illustratively shown in FIGS. 31G and 31H for example. FIG. 31G illustrates a tilting motion TM of the mounting plate 115 as a result of the piston 132 acting directly or indirectly on the plate, and for example off centered the mounting plate 115, while FIG. 31H illustratively shows a tilting motion TM of the mounting plate 115 as a result of the piston 132 acting directly on the closures panel 6 which urges the striker 96 to pull the mounting plate 115 upwardly, for example as a result of the striker 96 retained in by latch elements 110 (e.g. a ratchet 24). More than one guide slide 124 may be provided between mounting plate 115 and supporting plate 117, and/or between at least one of mounting plate 115 and supporting plate and linkage 118. It is recognized a guide configuration provided between one of the mounting plate 115 and the support plate 117 and the linkage 118 may also be provided.

Alternative to use of the travel stop 190, the tab 172 can come into contact with the closure panel 6 (for example see FIG. 17a), after the locking member(s) 128 are decoupled from the pin(s) 126 (see FIG. 23b), and thus as further piston 132 travel moves the closure panel 6 the latch 100 and mounting plate 115 also move therewith as the striker 96 remains retained by the latch 100.

Referring to FIG. 24b, the pin(s) 126 can travel in a travel slot 192 formed in the locking members 128 themselves. Upon reaching the end travel of the travel slot 192 (i.e. when the latch 100 is in the extended position), the pin(s) 126 can be received in a locking notch 196, thus facilitating holding of the closure panel 6 in the extended position along with the mounting plate 115 and mounted latch 100 thereon. As such, movement of the locking member(s) 128 about pivot 127 can be guided by travel of the pin 126 in the travel slot 192. Similarly, the movement of the pin 126 in the travel slot 184 can be used to guide the movement of the linkages 118, as desired. It is recognized that biasing member 174 can be used to decouple the locking members 128 from the pins 126 once the decoupling plate is initially moved by the actuation mechanism 101 (see FIG. 23*b*), as the biasing member 174 biases the pins 126 out of engagement with the notches 123. Further, the biasing member 174 can be used to bias pivot of the locking members 128 about the pivot 127, thus facilitating travel of the pins 126 in the travel slot 192 from the notch 123 to the notch 196.

Figure 29A:
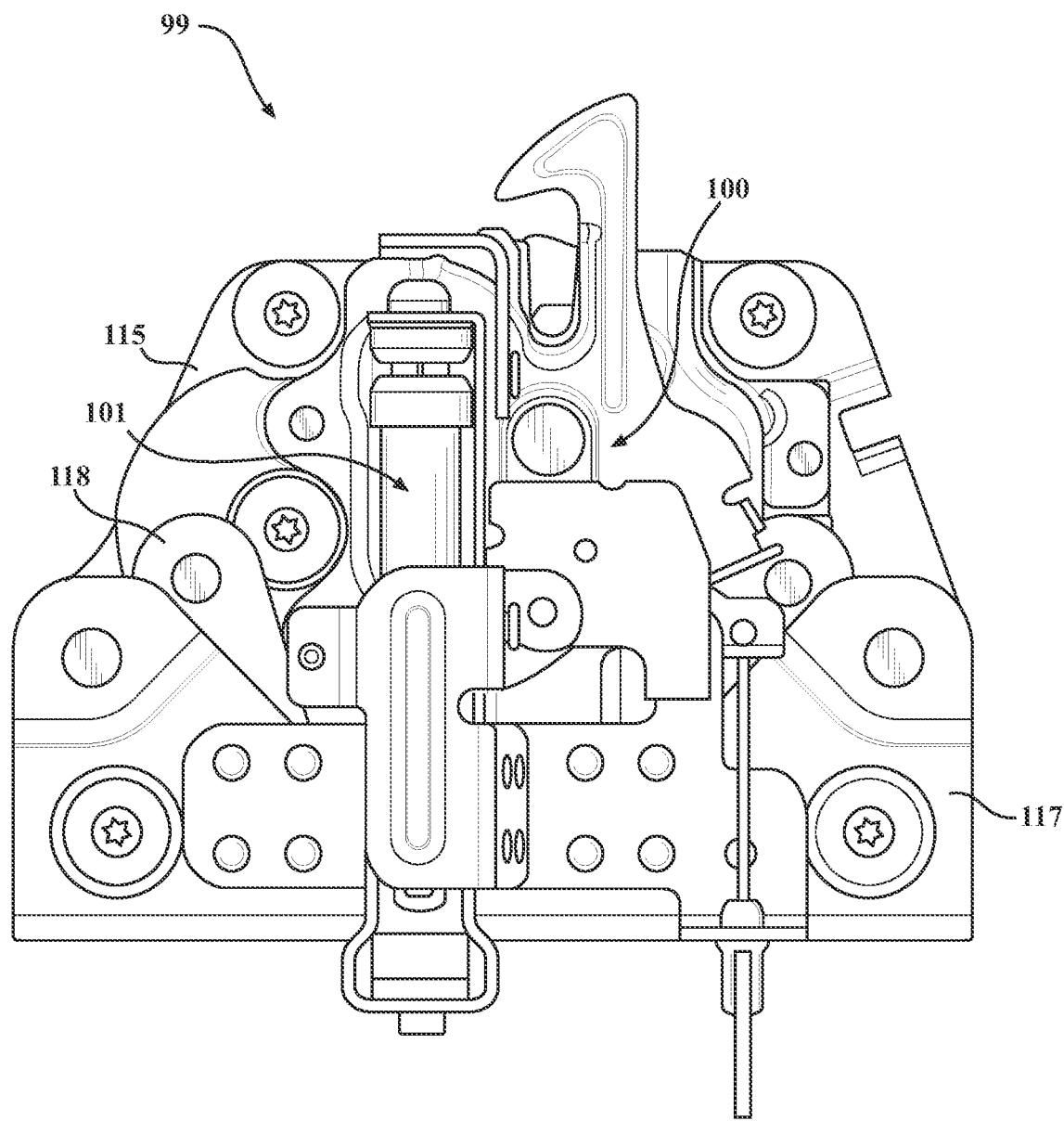
FIG. 29a is a front view of the actuation system shown in collapsed state in accordance with an illustrative embodiment.
Figure 29B:
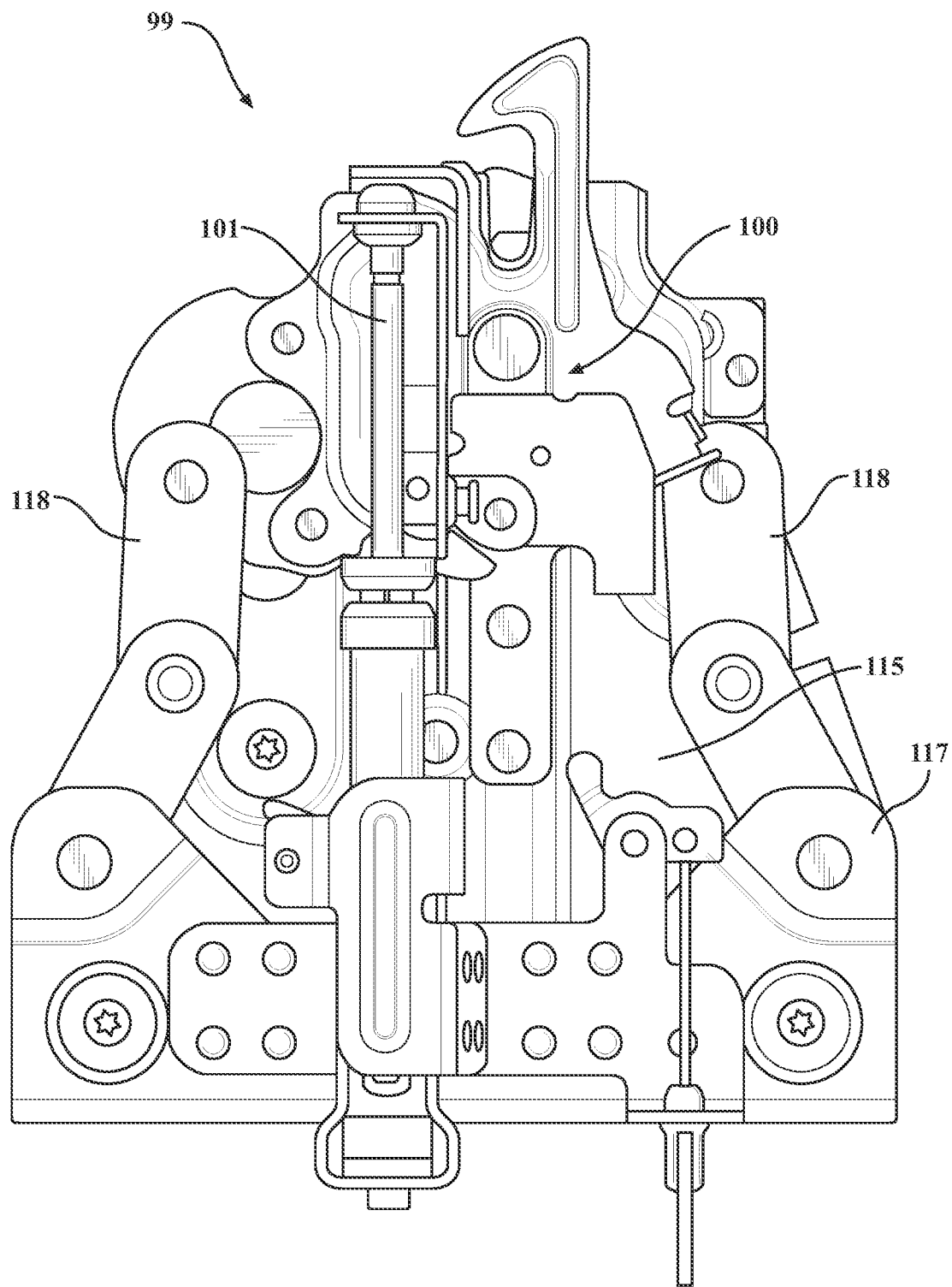
FIG. 29b is a front view of the actuation system of FIG. 29a shown in expanded state in accordance with an illustrative embodiment.
Figure 29C:
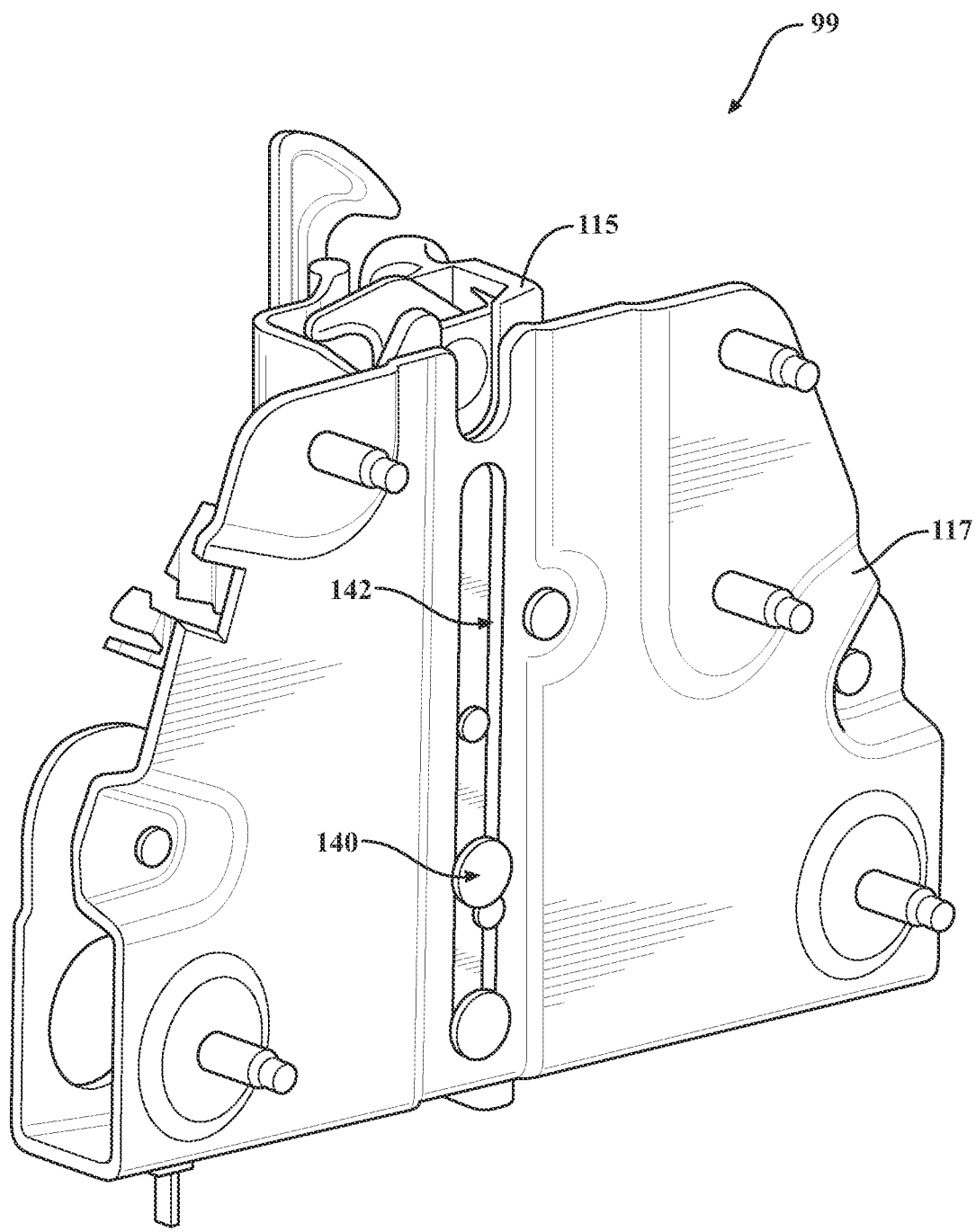
FIG. 29c is a rear perspective view of the actuation system of FIG. 29a illustrative a guide mechanism, in accordance with an illustrative embodiment.

Referring to FIGS. 8*a*, 8*b*, 9*a*, 9*b*, 10*a*, 10*b* 11*a*, 11*b*, similarly, the latch travel mechanism 99 of FIG. 21 can include the mounting plate 115 coupled to the support plate 117 via the pins 140 and slot 142 arrangement, such that the pins 140 are connected to the mounting plate 115 and the slots 142 are formed in the support plate 117 (recognizing that the opposite configuration can also be provided). During operation, the pins 140 travel along the slot 142 as the actuation mechanism 101 moves the mounting plate 115 from the home position (e.g. retracted position) to the extended position. The pin 140 and slot 142 arrangement can be used to stabilize or otherwise guide the relative movement between the support plate 117 and the mounting plate 115, as the mounting plate 115 moves from the home position to the extended position. As shown in FIG. 8*b*, the pin 140 and slot 142 arrangement can be positioned opposite the latch 100 between sides 117*a* of the support plate 117. Two or more pins 140 may be provided for one slot 142 as illustratively shown in FIG. 29C to prevent rotation or tiling TM of the mounting plate 115 relative to the support plate 117 in accordance with an illustrative example. Alternatively, as shown in FIG. 9*a*, the pin 140 and slot 142 arrangement can be positioned on the side 117*a*, as desired. Further, as shown in FIGS. 29*a,b,c*, an alternative embodiment of the travel mechanism 99 of FIG. 21, showing an example position of the pin 140 and slot 142 arrangement between the sides 117*a* of the support plate 117, Referring to FIGS. 30A to 30F, there is illustrated a sequence of views of deployment of latch 100 as a result of an active pedestrian operating mode in which a pedestrian has been detected to have contacted the vehicle 10, or is almost about to contact the vehicle 10 by a controller 121 which will in turn control the firing of actuation mechanism 101 to deploy piston 132.

Figure 30C:
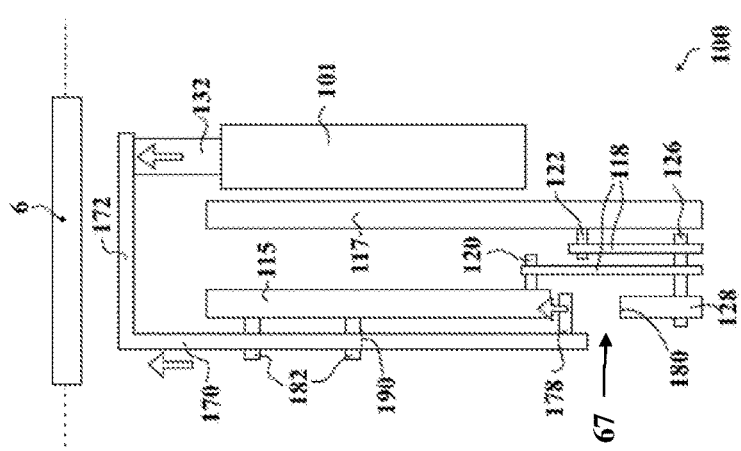
Figure 30B:
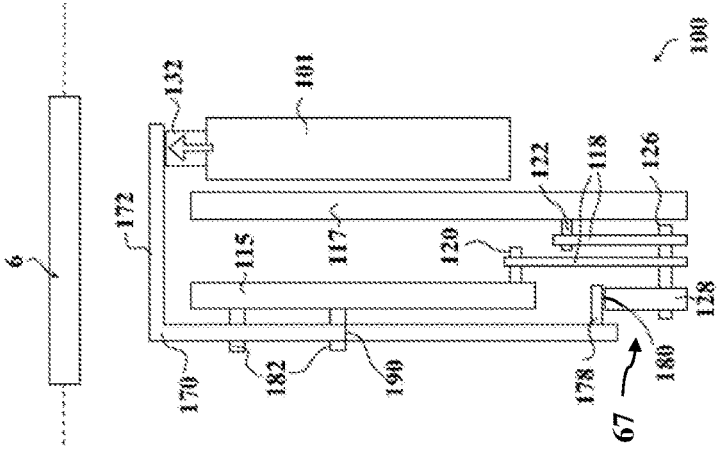
Figure 30A:
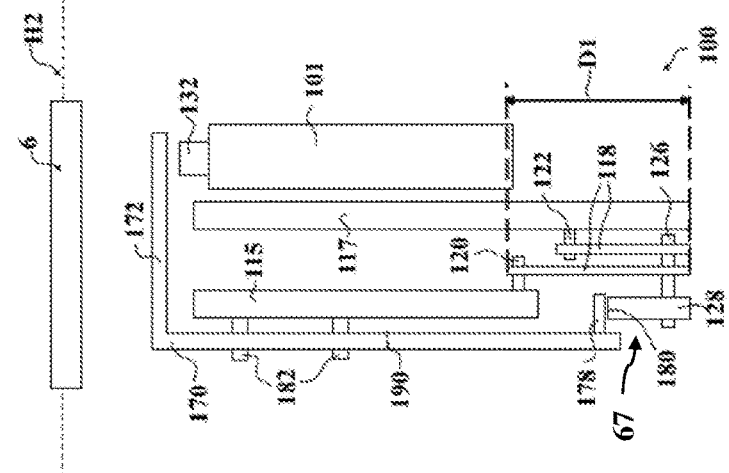

FIG. 30A illustrates the piston 132 in a rest position immediately prior to firing of actuation mechanism 101. Linkages 118 are in a non-deployed or collapsed state. Locking members 128 are in a locked state to prevent a relative movement between mounting plate 115 and support plate 117. Piston 132 is not in engagement with tab 172.

FIG. 30B illustrates the piston 132 in an initially deployed position immediately after firing of actuation mechanism 101. Linkages 118 remain in a non-deployed or collapsed state. Locking members 128 remain in a locked state to prevent a relative movement between mounting plate 115 and support plate 117. Piston 132 has entered into initial engagement with tab 172.

FIG. 30C illustrates the piston 132 in a continued deployed position after firing of actuation mechanism 101. Linkages 118 are now in an initial deployed or expanding state. Locking members 128 are now in an unlocked state to allow a relative movement between mounting plate 115 and support plate 117, for example to allow linkages 118 to transition into the initial deployed or expanding state. Piston 132 has entered into initial engagement with tab 172 to move tab 172 and pin 126 to decouple from a blocking position of pin 126 with locking member 128

FIG. 30D illustrates the piston 132 in a further continued intermediary deployed position after firing of actuation mechanism 101. Linkages 118 are now in an intermediary deployed or expanding state. Locking members 128 remain in an unlocked state to allow a relative movement between mounting plate 115 and support plate 117, for example to allow linkages 118 to continue to transition into the deployed or expanding state. Piston 132 remains in engagement with tab 172 to move tab 172 upwardly. Tab 172 has entered into contact with an underside of closure panel 6 (e.g. hood) to begin moving the closure panel 6 (e.g. hood) upwardly into an active pedestrian protection position, or partially opened position.

FIG. 30E illustrates the piston 132 in a further continued intermediary deployed position after firing of actuation mechanism 101. Linkages 118 continue to be deployed or transition towards a fully expanded state. Locking members 128 remain in an unlocked state to allow a relative movement between mounting plate 115 and support plate 117, for example to allow linkages 118 to continue to transition into the deployed or expanding state. Piston 132 has remained in engagement with tab 172 to move tab 172 upwardly and tab 172 remains entered into contact with an underside of closure panel 6 (e.g. hood) to continue to urge the closure panel 6 (e.g. hood) upwardly into an active pedestrian protection position, or partially opened position.

FIG. 30F illustrates the piston 132 in an end of travel deployed position after firing of actuation mechanism 101. Linkages 118 are in a fully deployed or expanded state to provide the final pop-up height of the closure panel 6 (e.g. hood). Locking members 128 may enter into a blocking or locked state to maintain the final deployed position between mounting plate 115 and support plate 117, for example to maintain linkages 118 in their deployed or expanded state. Piston 132 may remain in engagement with tab 172 to maintain tab 172 upwardly an in contact with an underside of closure panel 6 (e.g. hood) to hold the position of the closure panel 6 (e.g. hood) upwardly in the active pedestrian protection position, or partially opened position. Alternatively or additionally, locking members 128 in the blocking or locked state may maintain the final deployed position between mounting plate 115 and support plate 117, for example by maintaining linkages 118 in their deployed or expanded state, such that ratchet 100 urges the striker 96 and thus the closure panel 6 in the active pedestrian deployed state. Comparing FIGS. 30F and 30A, closure panel 6 is illustrated to have moved from a closed position height H1 in FIG. 30A, to a partially opened position having a pop-up height H3 as shown in FIG. 30F. Closure panel 6 is permitted to be moved to pop-up height H3 as a result of deployment or expanding of linkages 118 from a compact collapsed state as shown in FIG. 30A and having a packaging dimension D1, to an expanded state as shown in FIG. 30F and having an unpackaged dimension D2, where dimension D2 is greater than D1. As a result linkage 118 may provide a compact pre-deployed dimension advantageous for providing a small packaging size of latch 100, and a greater post-deployed dimension advantageous for providing an increase in pop-up height of the closure panel 6 relative to a size of the latch 100 housing the linkage 118.

Figure 31C:
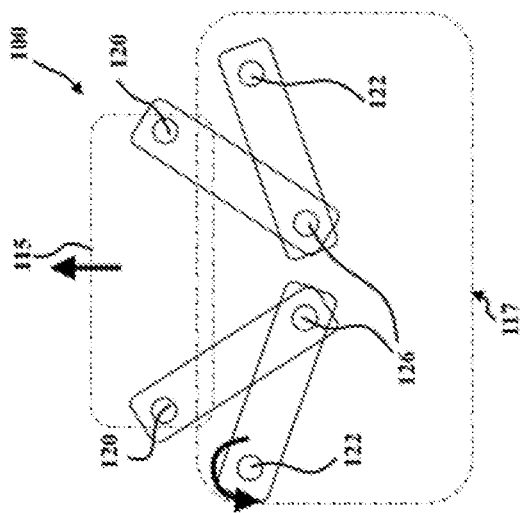
FIGS. 31A to 31F are a series of sequential views of the actuation system of FIG. 21 being moved from an initial collapsed position to an active pop-up position.
Figure 31B:
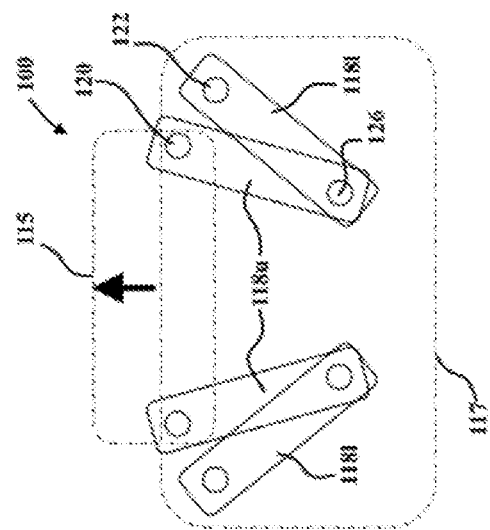
Figure 31A:
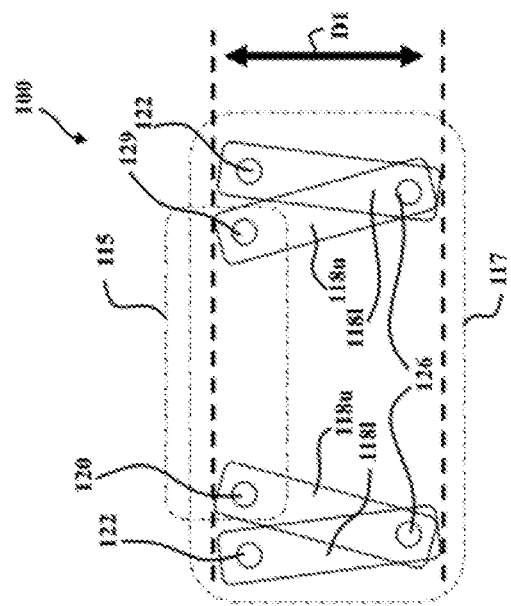
Figure 31F:
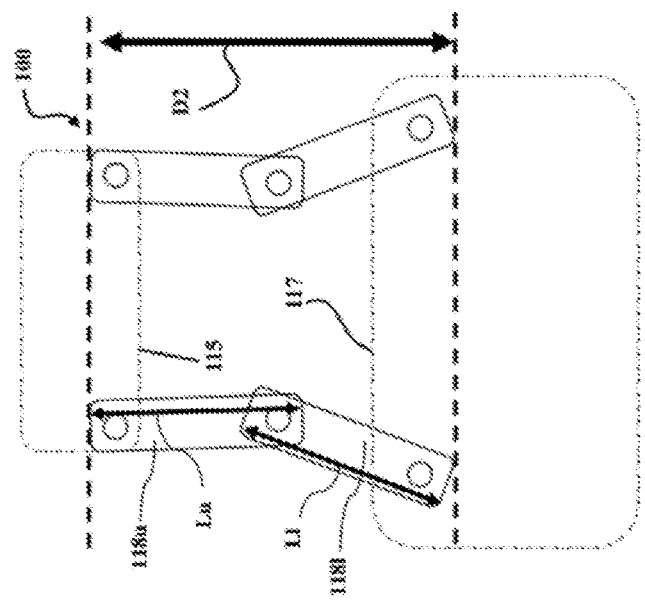
Figure 31E:
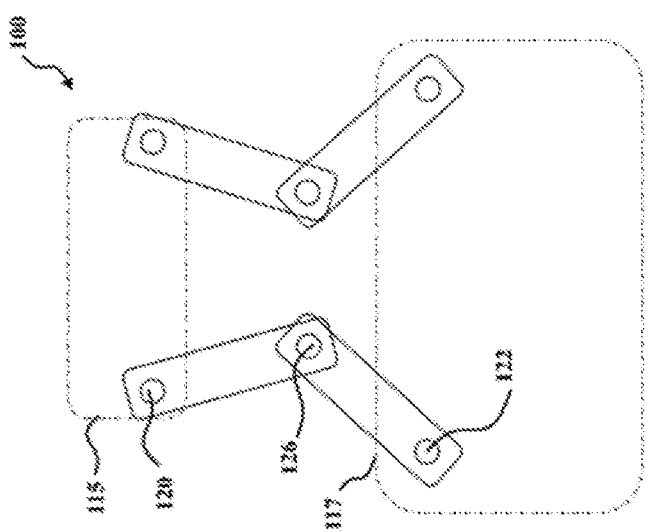
Figure 31D:
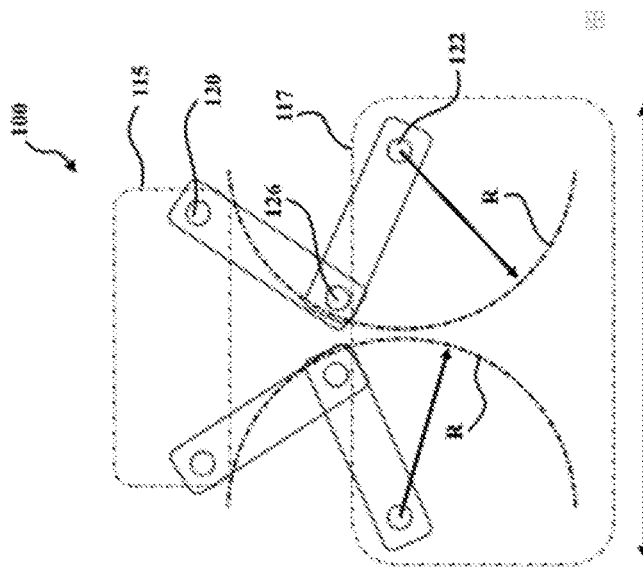
Figure 31H:
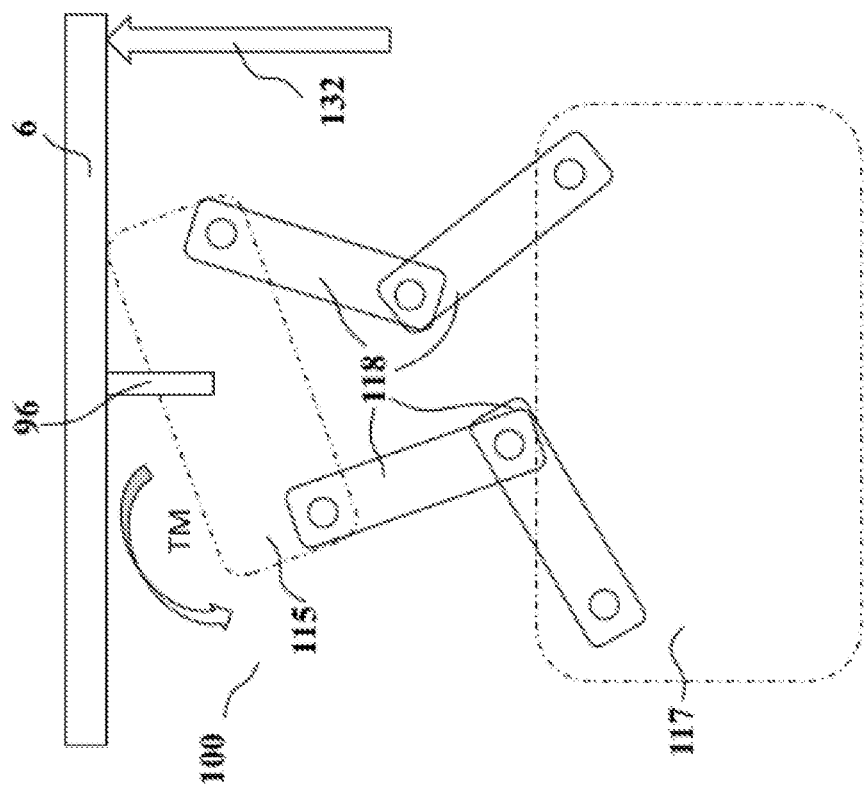
FIGS. 31G and 31H illustrates a tilting motion of mounting plate 115 of actuation system of FIG. 21 during movement from an initial collapsed position to an active pop-up position, in accordance with an illustrative embodiment.
Figure 31G:
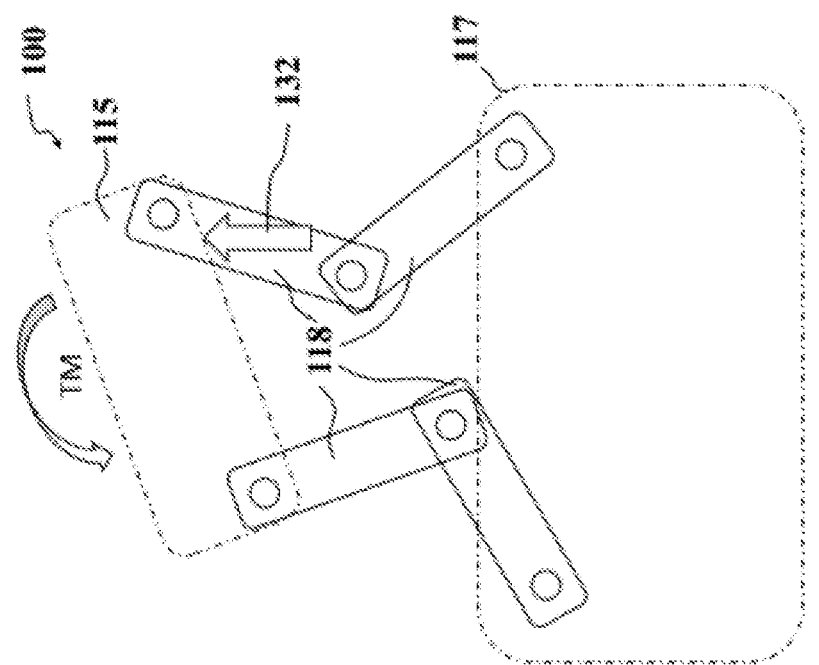

Referring to FIGS. 31A to 31F, there is illustrated a sequence of views of deployment of linkages 118 from a collapsed state of FIG. 31A to an expanded state of FIG. 31F, corresponding to FIGS. 30A to 30F respectively. FIG. 31A illustrates a compact packaging dimension D1 of linkages advantageous for reducing the packaging size of latch 100, with FIG. 31F illustrating an expanded state as shown in having an unpackaged dimension D2, where dimension D2 is greater than D1. Further illustrated in FIG. 31A to 31F is the rotational movement of the linkages 118 about pivots 120, 122. Illustratively, pins 126 provided on linkages 118 follow a path of rotation R towards and away from one another, such that linkages 118 do not interfere with one another during expansion of linkages 118. Linkages 118 may also be provided in an overlapping manner such that linkages 118 may cross one another during deployment to reduce the width W of the latch 100 while maintaining the length L of the linkages 118 to provide the desired pop-up height. Linkages 118 may be provided having equal lengths, or may be provided having different lengths, for example lower linkage 118l may be provided with a shorter length than upper linkage 118u depending on the desired packaging width W of latch 100.

Figure 25:
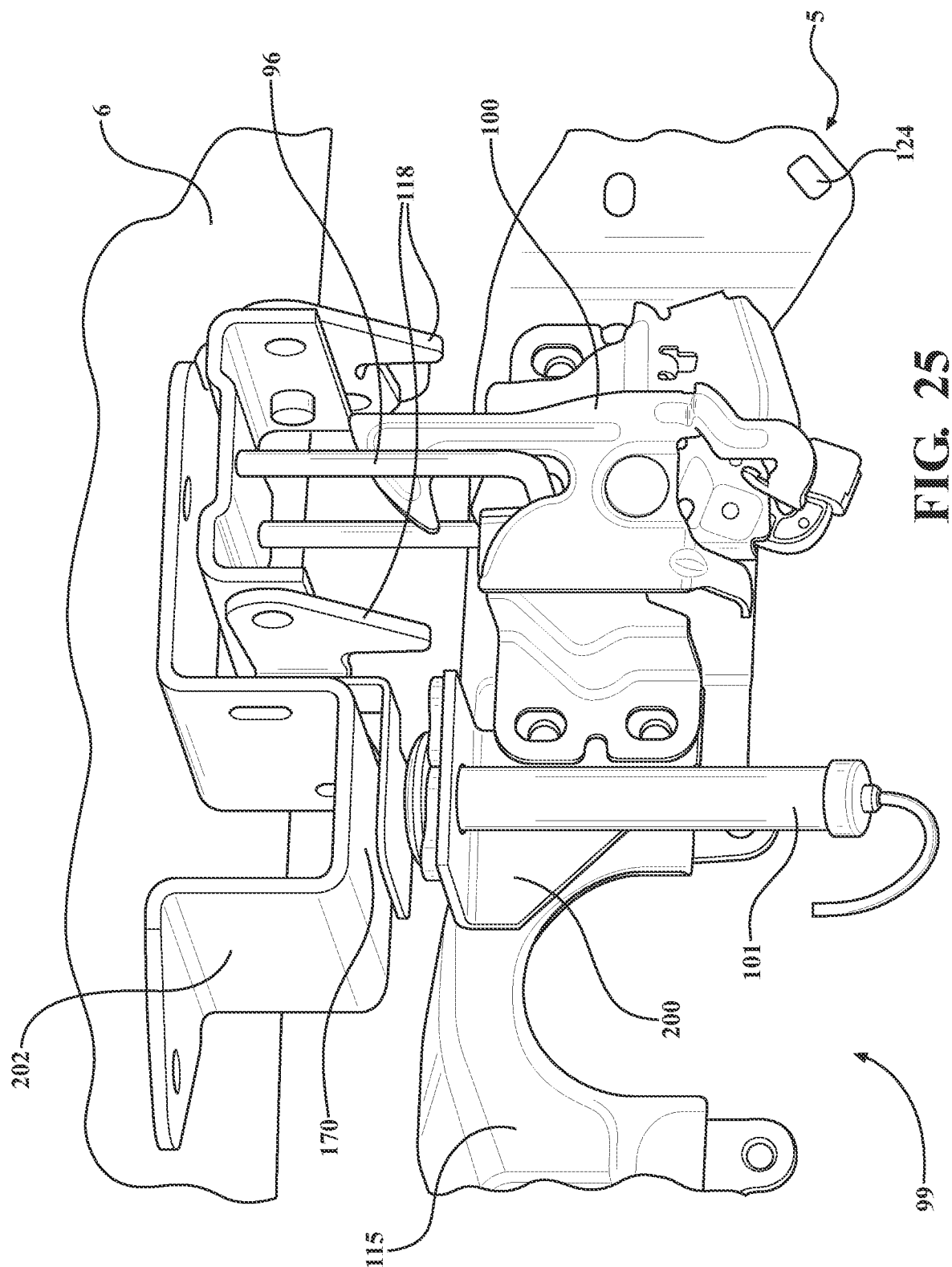
Figure 26B:
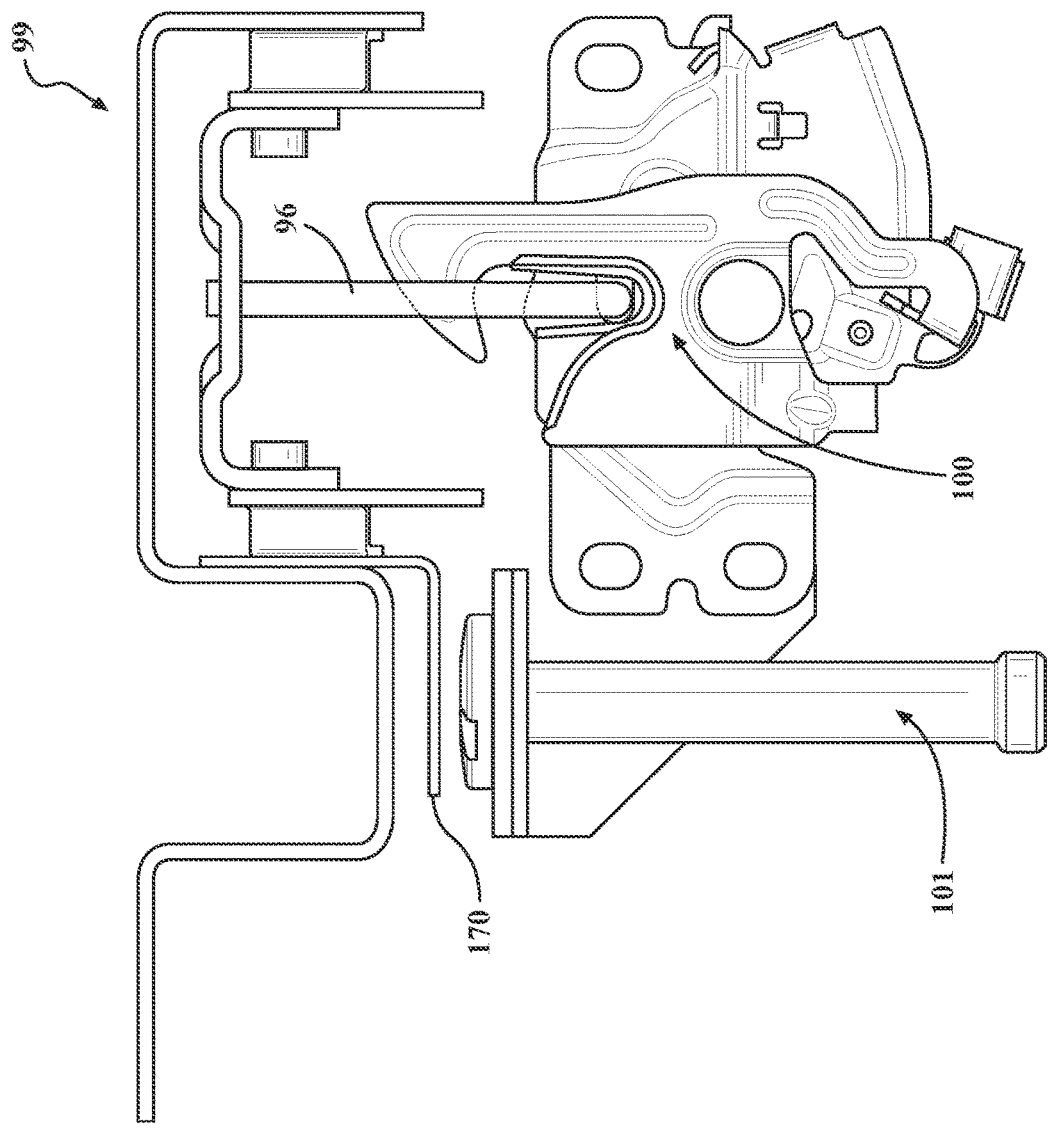
Figure 26A:
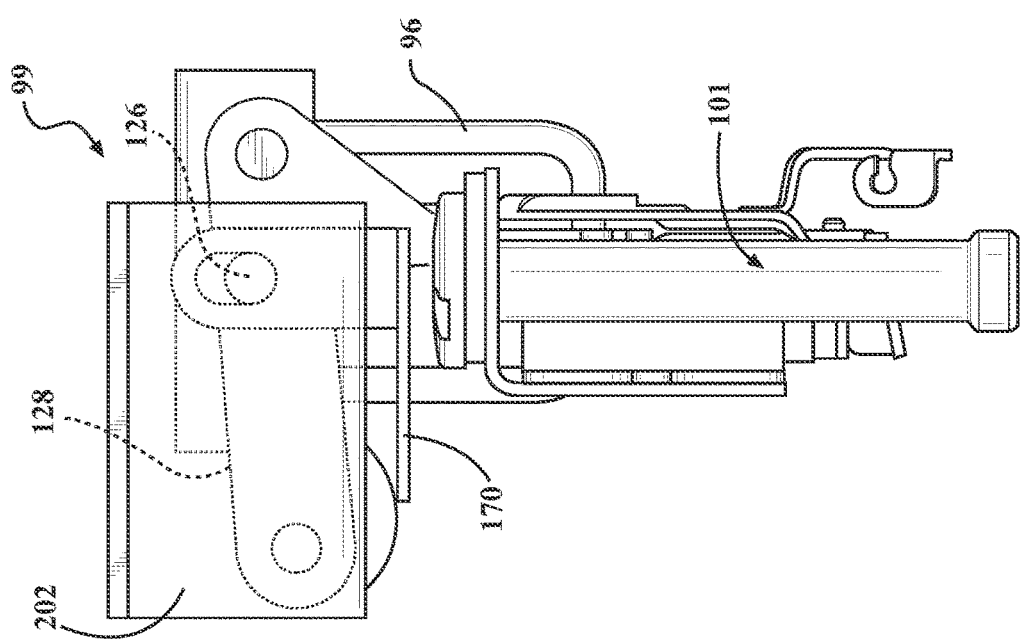

Referring to FIG. 25, shown is a further embodiment of the latch travel assembly 99, in particular whereby the latch 100 remains stationary during actuation of the actuation mechanism 101 (i.e. the position of the mounting plate 15 is fixed with respect to the body 5 as mounted thereon), while linkages 118 provide for movement of a striker plate 202 coupled to the striker 96 upon movement of the closure panel 6 (see FIG. 28b) by the actuation mechanism 101. For example, the mounting plate 115 can be mounted to the body 5 (shown in ghosted view) via mounting holes 124. Further, the actuation mechanism 101 can be mounted directly to the body 5 (not shown) and/or mounted to the mounting plate 115 via an actuator bracket 200. The decoupling plate 170 in this embodiment is coupled to pin 126 which is engaged with the locking member 128 when the actuation mechanism 101 is prior to deployment (in this case where the movable striker plate 202 is in the home position—see FIG. 26b).

Referring again to FIG. 25, the striker 96 is connected to the striker plate 202 mounted to the closure panel 6. The striker 96 is pivotally coupled (recognizing that other forms of movable coupling can be provided) to the striker plate 202 by the linkages 118. Referring to FIG. 28b, the linkages 118 can be pivotally connected at one end to the striker plate 202 by pivots 204 and at the other end to the striker 96 by pivots 206. It is also recognized that holding pins 208 can be spring loaded, in order to retain the striker plate 202 in the extended position (see FIG. 28b). For example, the holding pins 208 can be biased by biasing members (not shown) to contact an abutment surface 210 of the linkages 118 when the striker plate 202 reaches the extended position. As such, return of the striker plate 202 to the home position is blocked by the holding pins 208 when engaged with the abutment surface 210.

Figure 27B:
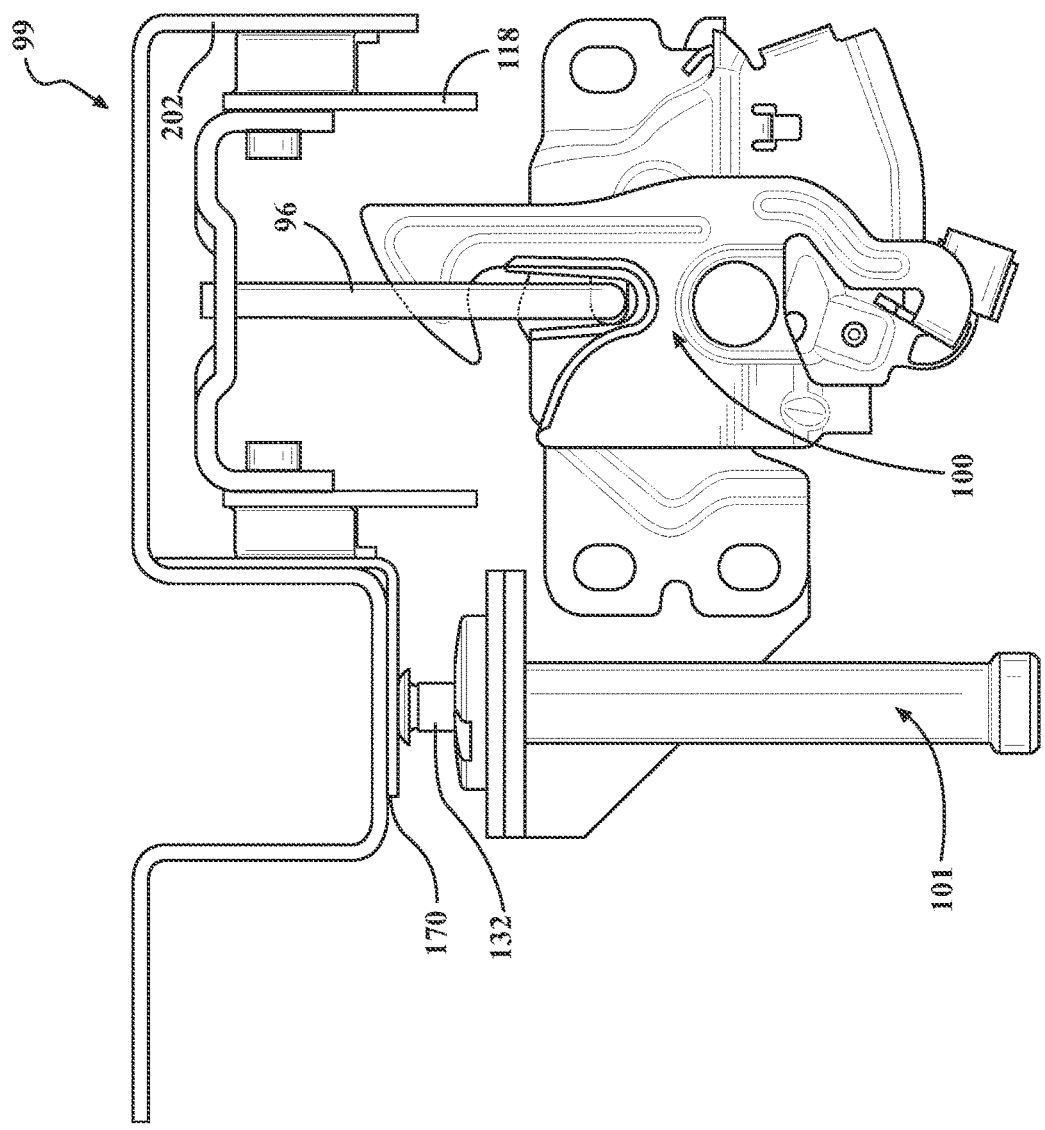
Figure 27A:
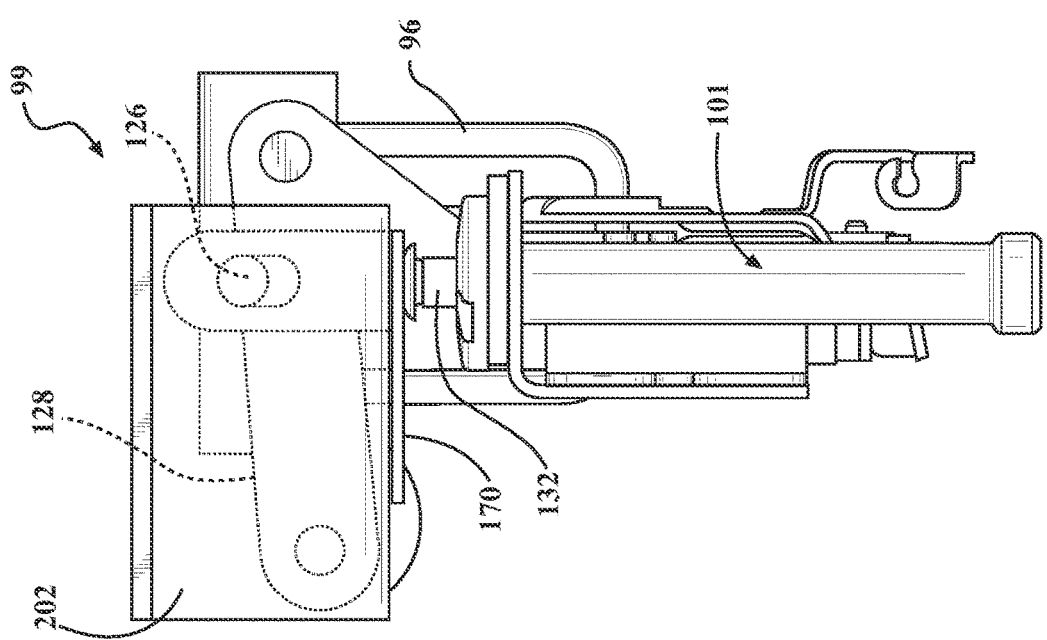

Upon operation of the embodiment shown in FIG. 25, the actuation mechanism 101 initially moves the decoupling plate 170 in order to disengage the pin 126 from the locking member 128 (i.e. the member 128 stopping movement of the linkages 118 when engaged therewith). Once the locking member 128 is freed from restricted movement by displacement of the pin 126, the locking member becomes disengaged from the linkages 118 and thus further operation of the actuation mechanism 101 cases contact of the decoupling plate 170 with the closure panel 6 (e.g. via the striker plate 202) and thus further extension of the piston 132 causes the closure panel 6 to extend from the home position to the extended position. As the striker 96 remains retained by the latch 100, movement of the closure panel 6 causes the linkages 118 to pivot about their pivots 204,206 and thus the linkages also move from their home position (see FIG. 27b) to their extended position (see FIG. 28b), thus allowing for the striker plate 202 to also move from the home position to the extended position.

Reference is made to the above figures, which show the different versions of the actuation mechanism 101. The device of the actuation mechanism can include a fluid-actuated cylinder, a control valve and a source of pressurized fluid. The cylinder can includes a cylinder housing and a piston that is movable in the cylinder housing between an unactuated position and an actuated position. A piston biasing member (not shown) can be provided and can bias the piston towards the unactuated position, so as to keep the piston in the unactuated position when the vehicle 4 is not incurring a collision event. In the closed position, the control valve prevents fluid flow to the cylinder thereby preventing actuation of the cylinder. In the open position the control valve permits fluid flow from the source of pressurized fluid to the cylinder to drive the piston to the actuated position. The source of pressurized fluid may simply be a vessel containing any suitable fluid, such as, for example, compressed Carbon Dioxide at a suitable pressure, such as, for example 2000 psi. In this embodiment, the control valve may be referred to as a release member that is controllable to expose the piston to the pressurized fluid. In another embodiment, the source of pressurized fluid may be an inflation device that is similar to an airbag inflation device, and that includes an igniter and two combustible chemicals, such as Sodium Azide and Potassium Nitrate, which, when ignited by the igniter, generate Nitrogen at high pressure which can be used to drive the piston to the actuated position. In such an embodiment, a control valve would not be needed. However, a controller controls the operation of the igniter. In such an embodiment, the igniter may be referred to as a release member that is controllable to expose the piston to the pressurized fluid.

As discussed above, the latch travel mechanism 99 for the closure panel 6 of the vehicle 4 can include: the mounting plate 115 for mounting the latch 100, the latch 100 for retaining the closure panel 6 in a locked state; the support plate 117 coupled to the mounting plate 115 by one or more linkages 118, the support plate 117 for connecting to the body 5 of the vehicle 4; the locking member 128 mounted on the support plate 117 and configured for retaining the mounting plate 115 in a home position when coupled to the mounting plate 115 and for decoupling from the mounting plate 115 when operated; and the actuation mechanism 101 for mounting on at least one of the support plate 117 or the body 5 and coupled to the linkages 118 for extending the linkages 118 once the locking member 128 is decoupled from the mounting plate 115 in order to move the mounting plate 115 relative to the support plate 117 from the home position to an extended position; wherein the latch 100 is moved from the home position to the extended position when mounted on the mounting plate 115.

As discussed above, the latch travel mechanism 99 for the closure panel 6 of the vehicle 4 can also comprise: the mounting plate 115 for mounting the latch 100, the latch 100 for retaining the closure panel 6; the support plate 117 coupled to the mounting plate 115, the support plate 117 for connecting to the body 5 of the vehicle 4; and the actuation mechanism 101 mounted on at least one of the support plate 117 or the body 5 and coupled to the mounting plate 115 for acting on the mounting plate 115 to move the mounting plate 115 relative to the support plate 117 from the home position to the extended position; wherein the latch 100 is moved from the home position to the extended position when mounted on the mounting plate 115.

As discussed above, the latch travel mechanism 99 for the closure panel 6 of the vehicle 4 can also comprise: the mounting plate 115 for mounting the latch 100, the latch 100 for retaining the closure panel 6; the support plate 117 coupled to the mounting plate 115, the support plate 117 for connecting to the body 5 of the vehicle 4; and the actuation mechanism 101 for mounting on at least one of the support plate 117 or the body 5 and for coupling to the closure panel 6 for moving the closure panel 6 from the home position to the extended position, such that the mounting plate 115 also moves relative to the support plate 117 while the closure panel 6 is retained by the latch 100; wherein the latch 100 is moved from the home position to the extended position when mounted on the mounting plate 115.

As per FIG. 21, a latch travel mechanism for a closure panel of a vehicle, the mechanism comprising: a mounting plate for mounting a latch, the latch for retaining the closure panel; a support plate coupled to the mounting plate by one or more linkages, the support plate for connecting to a body of the vehicle; a locking member mounted on the support plate and configured for retaining the mounting plate in a home position when engaged with the one or more linkages and for disengaging from the one or more linkages when operated; and an actuation mechanism for mounting on at least one of the support plate or the body and coupled to the locking member for extending the linkages once the locking member is disengaged from the one or more linkages in order to move the mounting plate relative to the support plate from the home position to an extended position; wherein the latch is moved from the home position to the extended position with the mounting plate while the closure panel remains retained by the latch. The latch travel mechanism, wherein a decoupling plate is used to retain the locking member in the engaged position with the one or more linkages.

As per FIG. 21, a latch travel assembly for a closure panel of a vehicle, the assembly comprising: a latch for retaining the closure panel; a mounting plate having the latch mounted thereon; a support plate coupled to the mounting plate by one or more linkages, the support plate for connecting to a body of the vehicle; a locking member mounted on the support plate and configured for retaining the mounting plate in a home position when engaged with the one or more linkages and for disengaging from the one or more linkages when operated; and an actuation mechanism for mounting on at least one of the support plate or the body and coupled to the locking member for extending the linkages once the locking member is disengaged from the one or more linkages in order to move the mounting plate relative to the support plate from the home position to an extended position; wherein the latch is moved from the home position to the extended position with the mounting plate while the closure panel remains retained by the latch. The latch travel mechanism, wherein a decoupling plate is used to retain the locking member in the engaged position with the one or more linkages.

As per FIG. 25, a latch travel assembly for a closure panel of a vehicle, the assembly comprising: a latch for retaining the closure panel via a striker; a striker plate mounting the striker, the striker for engaging with the latch for retaining the closure panel, the striker plate mounting the striker to the closure panel; a support plate coupling to a body of the vehicle, the support plate mounting the latch to the body; one or more linkages coupling the striker to the striker plate; a locking member mounted on the striker plate and configured for retaining the one or more linkages in a home position when engaged with the one or more linkages and for disengaging from the one or more linkages when operated; and an actuation mechanism mounted on at least one of the support plate or the body and coupled to the striker plate for extending the one or more linkages once the locking member is disengaged from the one or more linkages in order to move the striker plate relative to the support plate from the home position to an extended position; wherein the striker plate is moved from the home position to the extended position while the striker is retained by the latch.

Now referring to FIGS. 32A to 32C, there is illustrated an active hood system 200 including latch 100, closure panel 6, and hinges 98. In operation, FIG. 32A shows the mating latch component 96 at an initial height H1 and engaged with the ratchet 24, the ratchet 24 being held by the pawl 40 in the primary latched position. Locking member 128 is coupled with the pin 126, and in this state, the linkages 118 are retracted and in a collapsed state with pivots 120,122 adjacent to one another as the mounting plate 115 is seated adjacent to the support plate 117. Upon detection of an active pedestrian event (e.g. an imminent collision or detected collision of the vehicle 4 with a pedestrian using sensors), the active pedestrian control system 121, or the vehicle Body Control Module, being in electrical communication with actuation mechanism 101, commands actuation mechanism 101 to fire to deploy the piston 132.

As shown in FIG. 32B, the ratchet 24 remains engaged by the pawl 40, locking member 128 is decoupled with the pin 126 to allow the linkages 118 to expand, and mounting plate 115 and support plate 117 have moved apart from one another, and for example the mounting plate 115 has moved upwardly in a linear manner within a plane P2, for example a distance A1, to urge at least one of the mating latch component 96 and the closure panel 6, as a result of pivoting at hinge 98, to be moved upwardly without for example any aftward movement, At the end of travel of the movement of piston 132 as shown in FIG. 32C, the linkages 118 are fully extended and mounting plate 115 and support plate 117 are distanced from one another such that the mating latch component 96 has been moved away from its initial position H1 to a height H3 greater than H2. The closure panel 6 is now shown in its active pedestrian deployed position. In another embodiment or in combination, mating latch component 96 may be configured to slide relative to ratchet 24 within slot 114 such that the movement of mounting plate 115 is unhindered by the mating latch component 96, for example as would be caused by the type of hinge 98, such as hinge 98 providing a pivoting connection between the closure panel 6 and the vehicle body 5. Latch component 96 embodied as a striker formed from a bent rod may include a horizontally extending portion 199 which may be adapted to be extended in length to accommodate such a horizontal portion within the slot 114 such that vertically extending portions 197 do not contact with ratchet 24 to hinder the aftwards movement of mounting plate 115.

Figure 33:
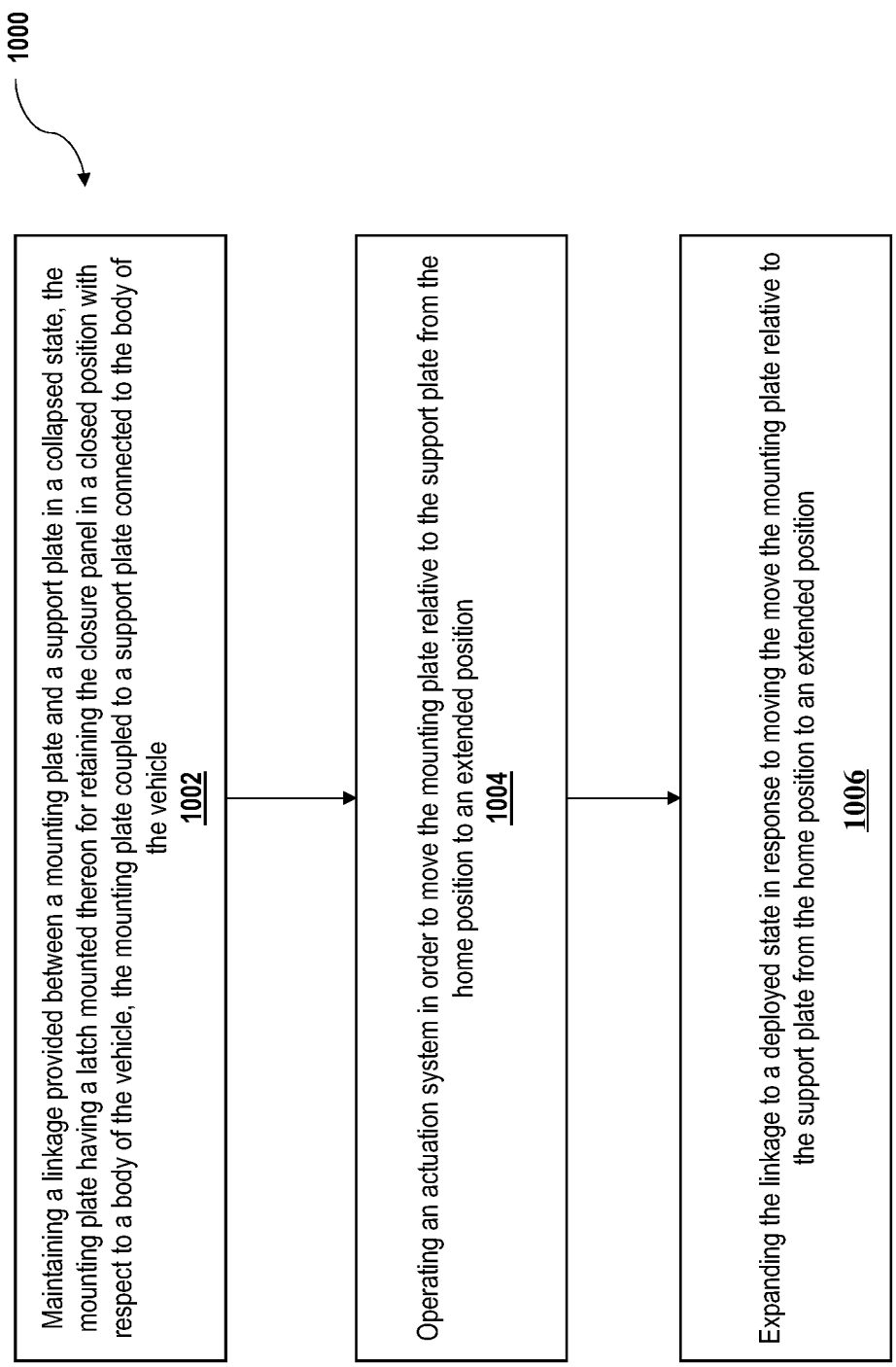
FIG. 33 is a method of operating a hood latch with a safety actuation system in accordance with an illustrative embodiment.

Now referring to FIG. 33, there is illustrated a method 1000 for operating a latch travel mechanism coupled to a closure panel of a vehicle, the method illustratively including the steps of maintaining a linkage provided between a mounting plate and a support plate in a collapsed state, the mounting plate having a latch mounted thereon for retaining the closure panel in a closed position with respect to a body of the vehicle, the mounting plate coupled to a support plate connected to the body of the vehicle 1002, operating an actuation system in order to move the mounting plate relative to the support plate from the home position to an extended position 1004, and expanding the linkage to a deployed state in response to moving the mounting plate relative to the support plate from the home position to an extended position 1006, such that the latch is also moved from the home position to the extended position as mounted on the mounting plate. The step of expanding the linkage to a deployed state in response to moving the mounting plate relative to the support plate from the home position to an extended position 1006 may include expanding the linkage from a collapsed state having collapsed dimension to an expanded state having an expanded dimension, wherein the expanded dimension is greater than the collapsed dimension. The step of expanding the linkage to a deployed state in response to moving the mounting plate relative to the support plate from the home position to an extended position 1006 may include expanding the linkage in a plane parallel to the plane of one of the support plate and the mounting plate. The method may further include the step of guiding the support plate relative to the mounting plate during expansion of the linkage so as to prevent the support plate and the mounting plate to pivot relative one another. The method may further include the step of guiding one of the support plate and the mounting plate relative to the linkage during expansion of the linkage so as to prevent the support plate and the mounting plate to pivot relative one another. The step of operating an actuation system 1004 may include moving the closure panel relative to the support plate, for example operating the actuation system to act directly or indirectly on the closure panel.

Referring to FIG. 35, shown is an example of operation of the actuation mechanism 101 in operation, such that tilting of the closure panel 6 and latch 100 can occur. As such, during the active deployment of the actuation mechanism 101, it is recognized that unequal or unbalanced operation of the linkages 118 (e.g. one side LH extends further than the other side RH). In order to address this tilting, one embodiment is a pair of meshed gears 300 (see FIG. 36*a*, 36*b*) used to inhibit unbalanced extension between the sides RH, LH. Demonstration of the effect of balancing of the sides RH, LH is shown in FIGS. 38*a*, 38*b*, 38*c*, 38*d* during deployment of the actuation mechanism 101. As such, the inclusion of the pair of meshed gears 300 in the linkages 118 can be used to inhibit misalignment between the sides LH, RH during deployment of the actuation mechanism 101, as further described below. For example, no guide mechanism is required to avoid a tilting motion TM of mounting plate 115, such as slot 142 and pin 140 configured as described herein above.

Figure 37B:
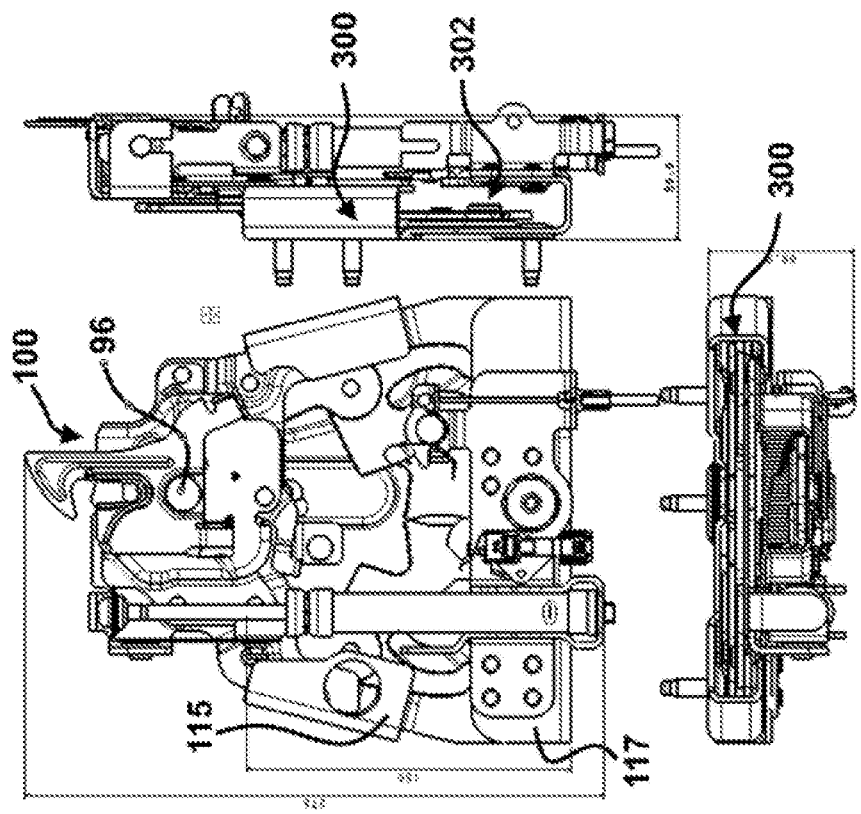
FIGS. 37a, 37b show various planar views of the travel latch mechanism of FIGS. 36a, 36b.
Figure 37A:
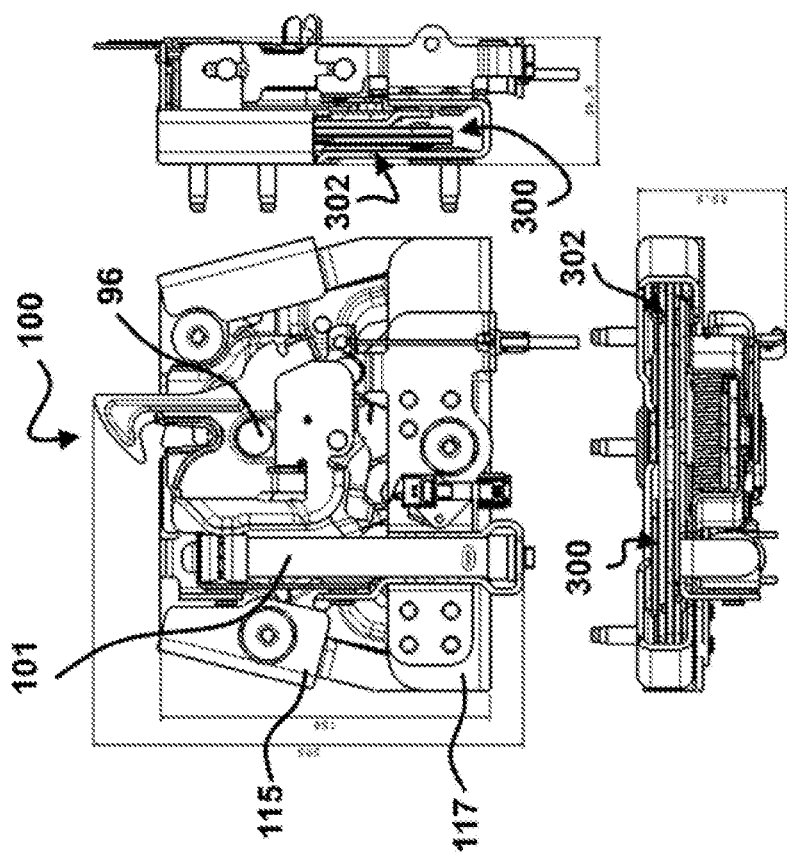

Referring to FIGS. 36*a*, 36*b*, showing the kinematics of an embodiment with a pair of meshed gears 300, like in the previous embodiments discussed above, the latch 100 can be associated with the actuation mechanism 101 that can include the support plate 117 that can connect to the mounting plate 115 of the latch 100 and thereby can form part of the latch housing (not shown), as desired. The mounting plate 115, the support plate 117 and the actuation mechanism 101 can be collectively referred to as a latch travel mechanism 99 or with inclusion with the latch as a latch travel assembly 99, as desired. FIGS. 37*a*,*v*37*b* show various planar views of the latch travel mechanism 99 in assembled form, in the home position and extended position respectively.

It is recognized that like in the embodiments of the latch 100 shown in FIGS. 3-7, the mounting plate 115 is connected to the support plate 117 via linkages 118, see FIGS. 38*a* to 38*d*, such that the linkages 118 are connected by a hinge or pivot 120 at one end to the mounting plate 115 and at the other end via a hinge or pivot 122 to the support plate 117. It is recognized that the support plate 117 is connected to the body 5 of the vehicle 4. As shown, the linkages 118 also include the pair of meshed gears 300 (e.g. sector gears) as well as one or more arms 302. For example, the linkages 118 can include arm(s) 302 connected at pivot(s) 122 to the support plate 117, a pair of meshed gears 300 coupled to the mounting plate 115 at pivots 120, and corresponding pivots 304 coupling the arms 302 to the meshed gears 300.

Referring again to FIGS. 38*a* to 38*d*, FIG. 38*a* shows the latch travel mechanism 99 at an unactuated stage, such that the actuation mechanism 101 (see FIG. 36*a*, is in a non-extended position (i.e. the actuation mechanism 101 has not been actuated). It is recognized that in FIGS. 38*a* to 38*d*, the latch 100 is shown in concept only, i.e. in ghosted view for ease of explanation only, recognizing the latch 100 is mounted to the mounting plate 115 as for the other embodiments described above. Further, similarly as shown in FIG. 32*a*, the closure panel 6 would be in the closed position (also referred to as the home position shown pictorially as position H1).

Figure 38A:
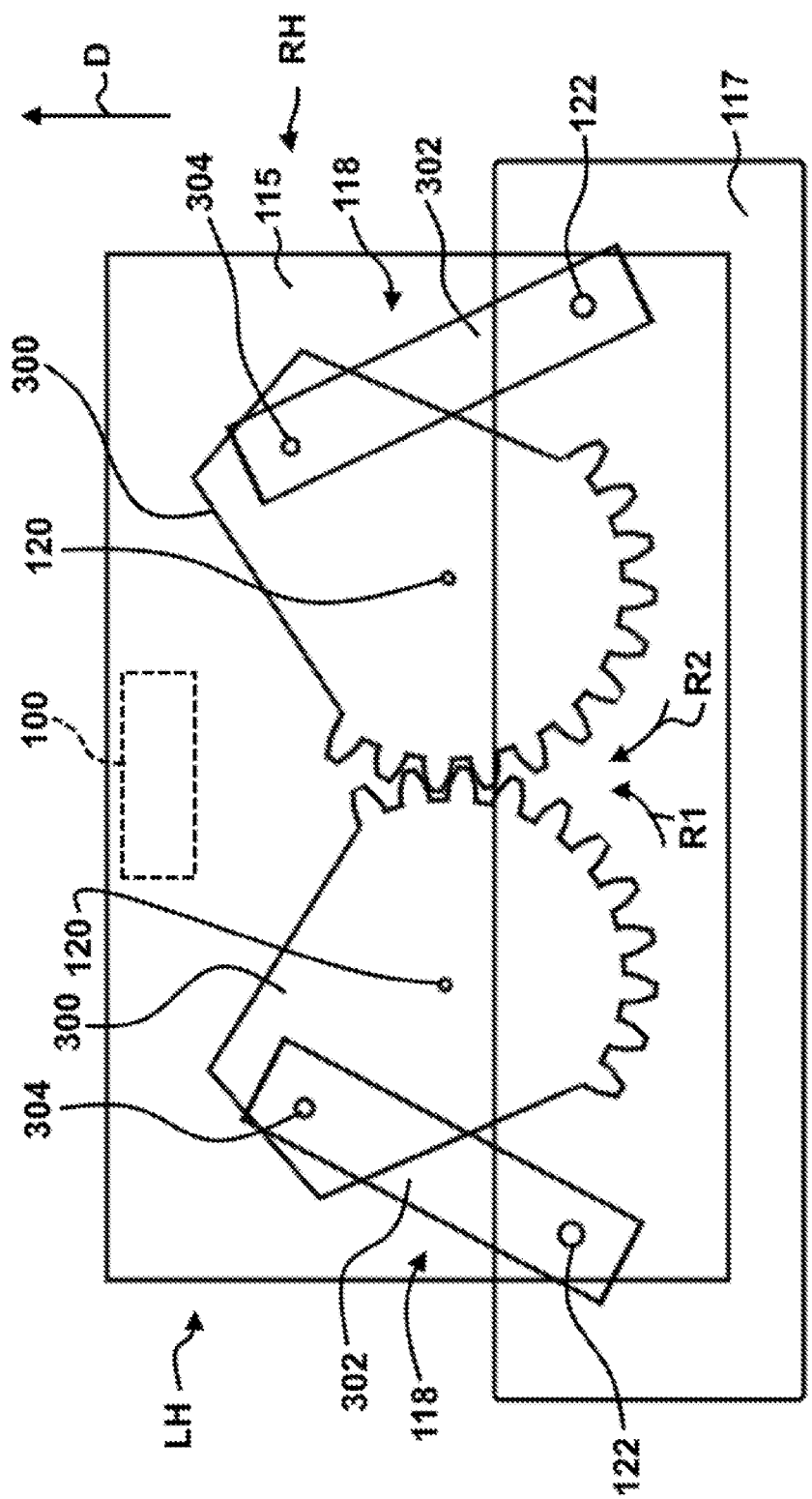
Figure 38B:
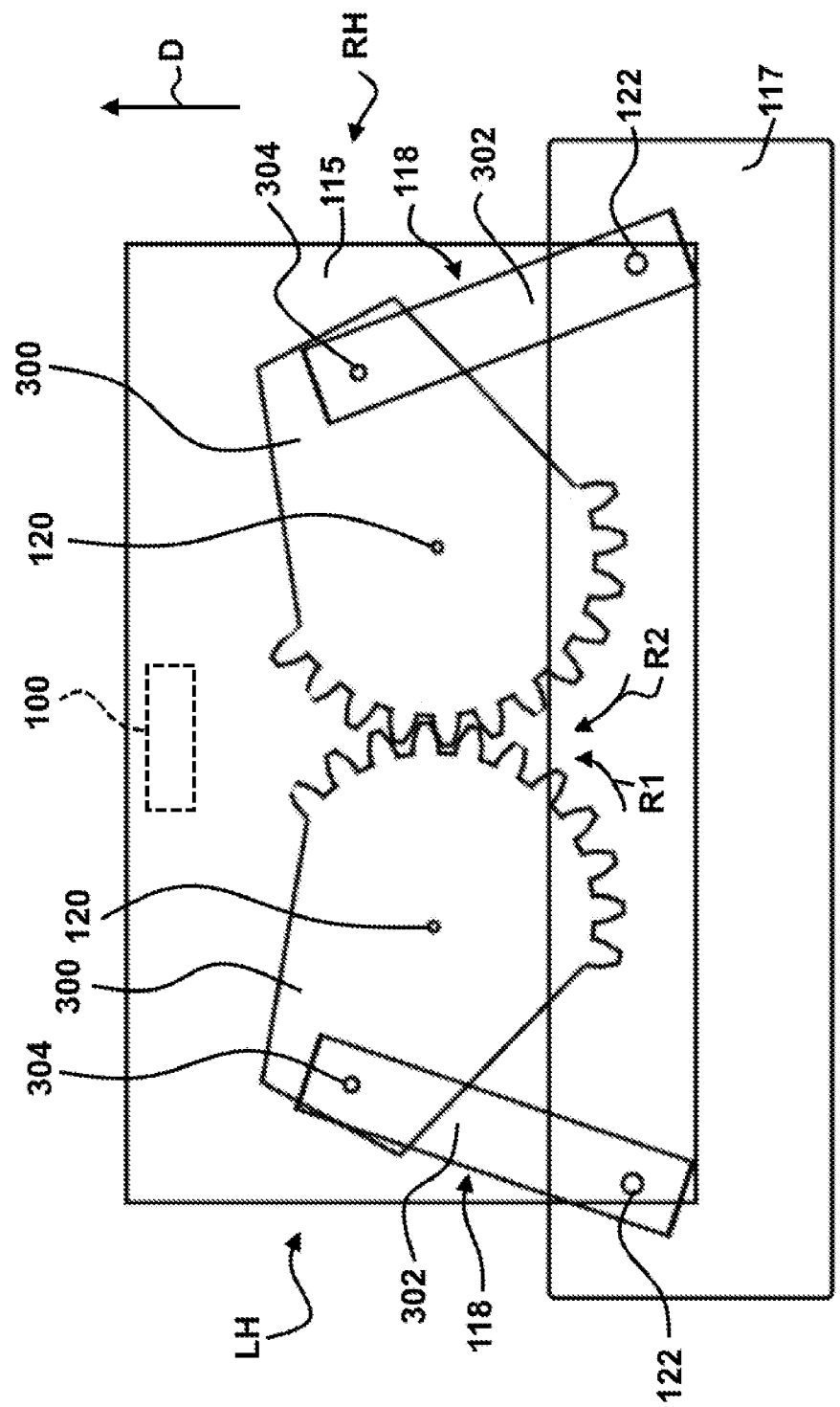

FIGS. 38*b*, 38*c* show the latch travel mechanism 99 under the influence of a deployed actuation mechanism 101 (i.e. the actuation mechanism 101 is operated and thus in the process of extending—see also FIG. 32*b*), such that the latch travel mechanism 99 in FIG. 38*c* is further along in extension from the home position (H1—see FIG. 32*a*) than the latch travel mechanism 99 in FIG. 38*b*. Shown is the rotation R1, R2 of the pair of meshed gears 300 about the pivots 304, as the mounting plate 115 is extended in a deployment direction D (i.e. in travelling from position H1 to position H3—see FIGS. 32*a*,32*b*,32*c*).

Figure 38D:
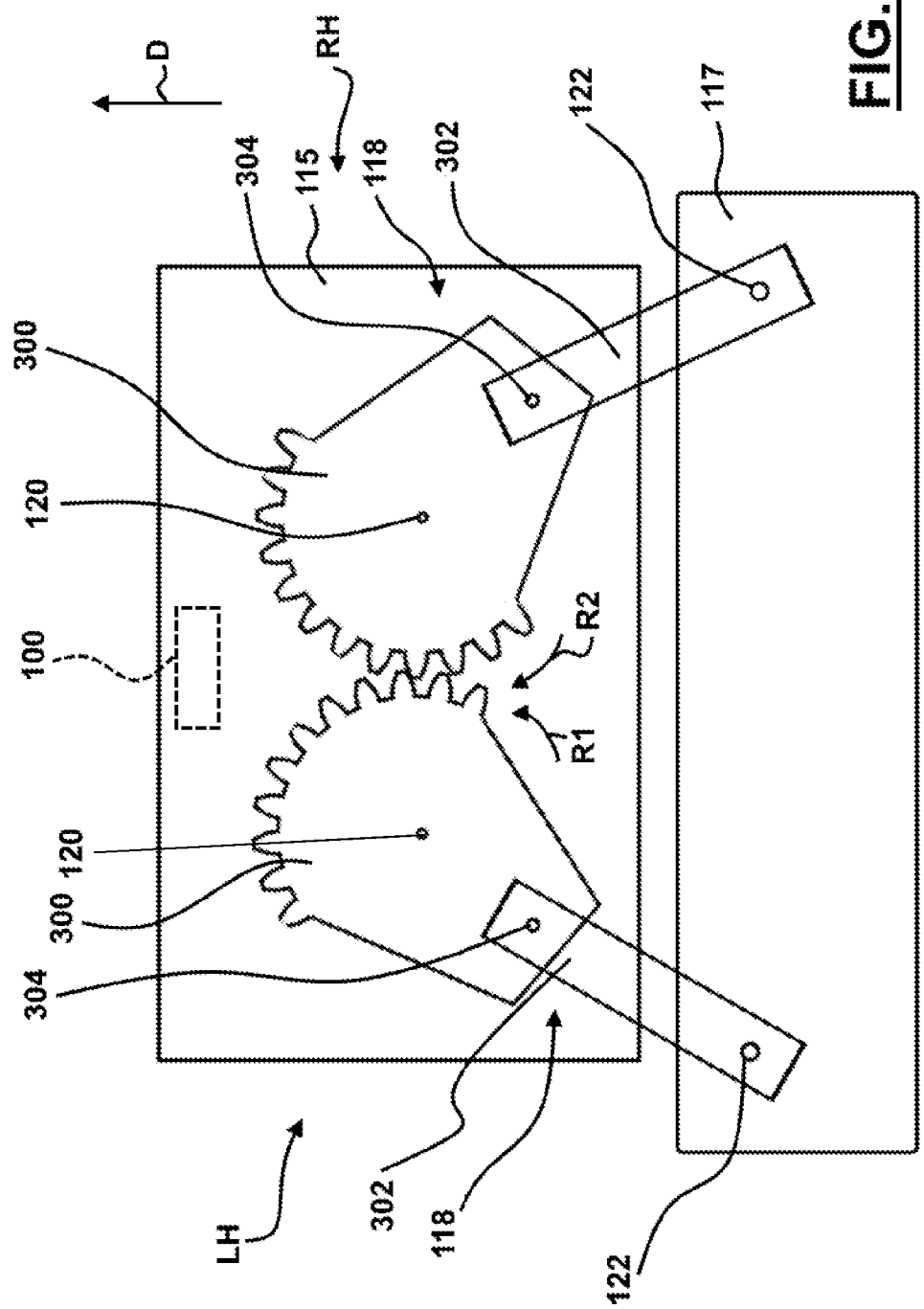

FIG. 38*d* shows the latch travel mechanism 99 in the extended position, similar to that of position H3 shown in FIG. 32*c*. Further, it is recognized that similar to the other described embodiments of FIGS. 3 to 34B inclusive, the latch travel mechanism 99 of FIGS. 36*a* to 39*b* can optionally include any of the various configurations for locking members, stops, and other associated structures, as desired, Further, contrary as shown, it is recognized that the pair of arms 302 could be coupled to the mounting plate 115 and the pair of meshed gears 300 could be coupled to the support plate 117, as desired.

Figure 39A:
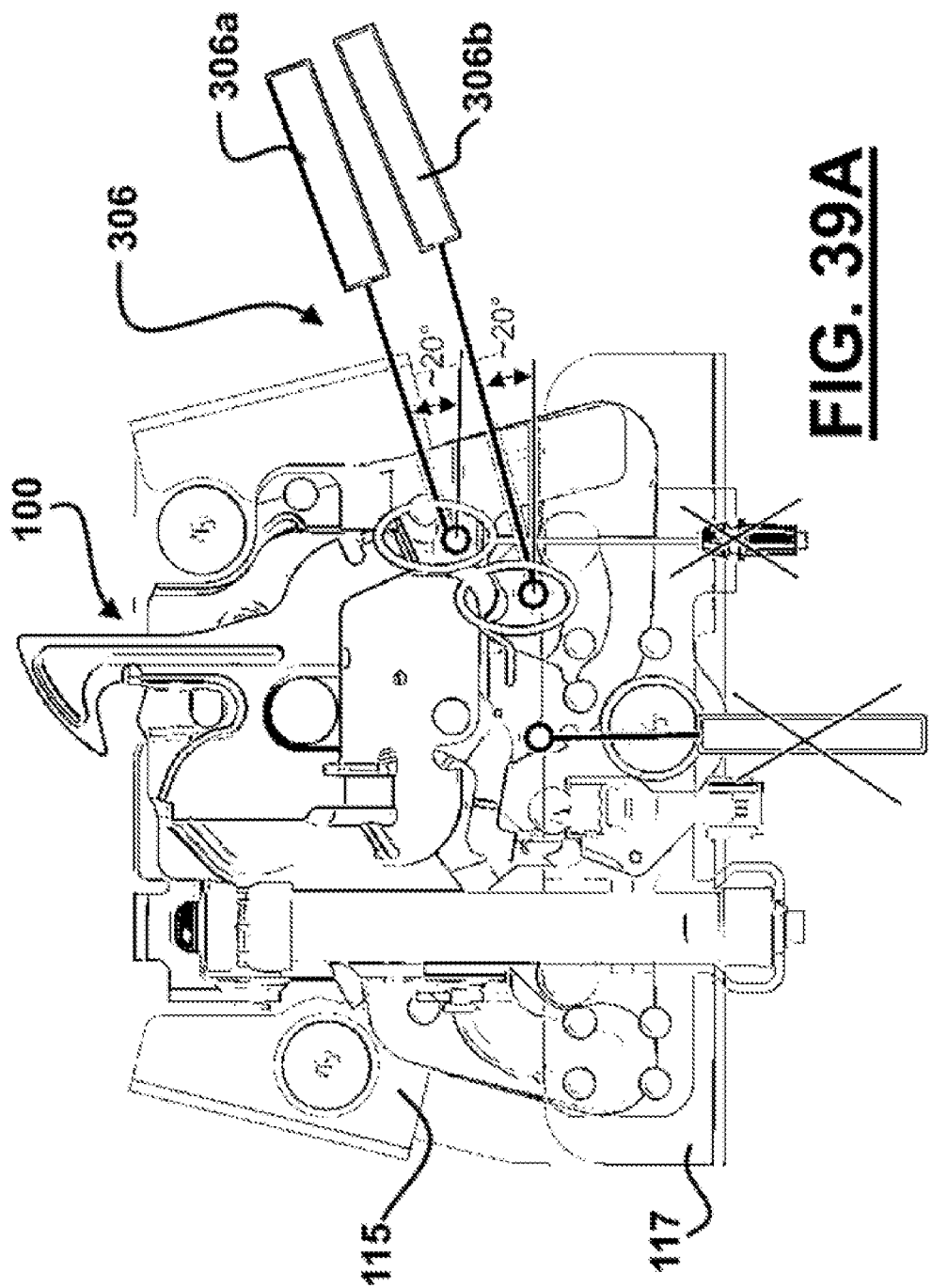
FIGS. 39a, 39b show further embodiments concerning cable deployment of the travel latch mechanism of FIGS. 36a, 36b.
Figure 39B:
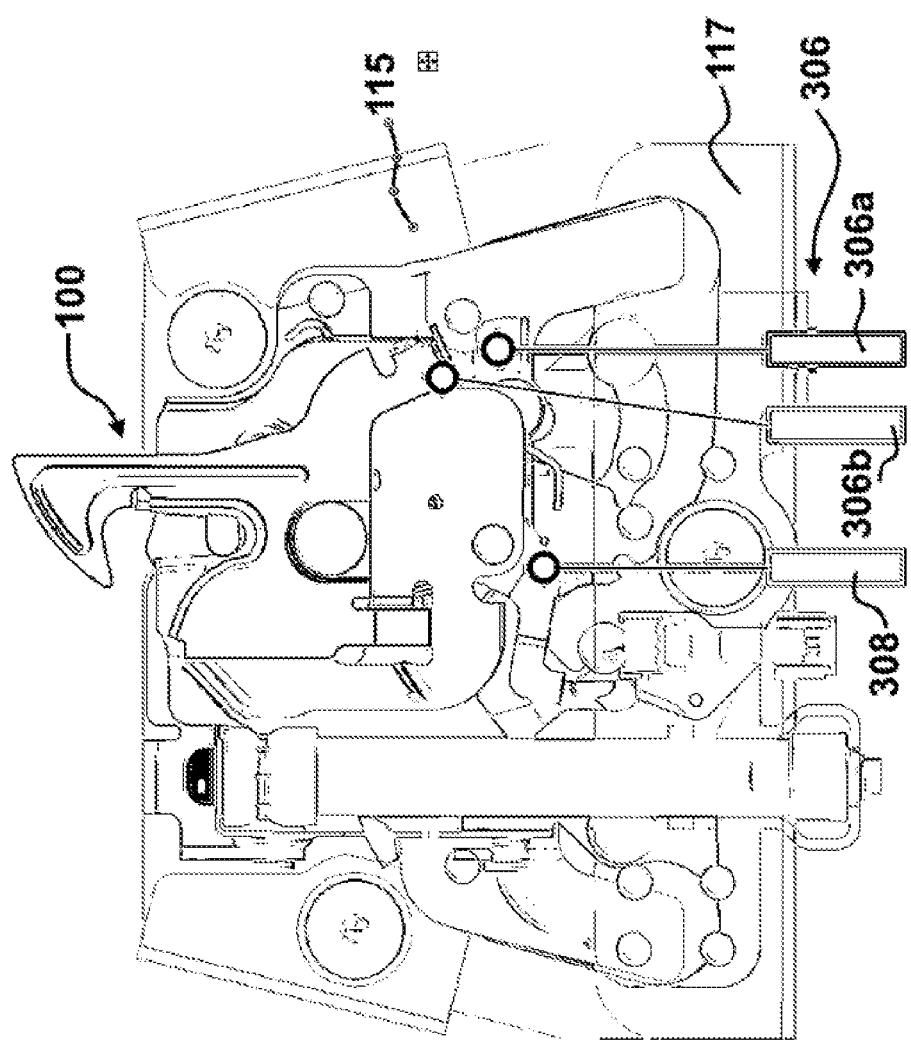

Referring to FIGS. 39*a*, 39*b*, shown is an embodiment such that release cables 306 (e.g. primary pawl release cable 306*a* and secondary lever release cable 306*b*), recognizing that cable hook shapes can be utilized. Also included can be a hood support release cable 308, as desired.

Figure 40:
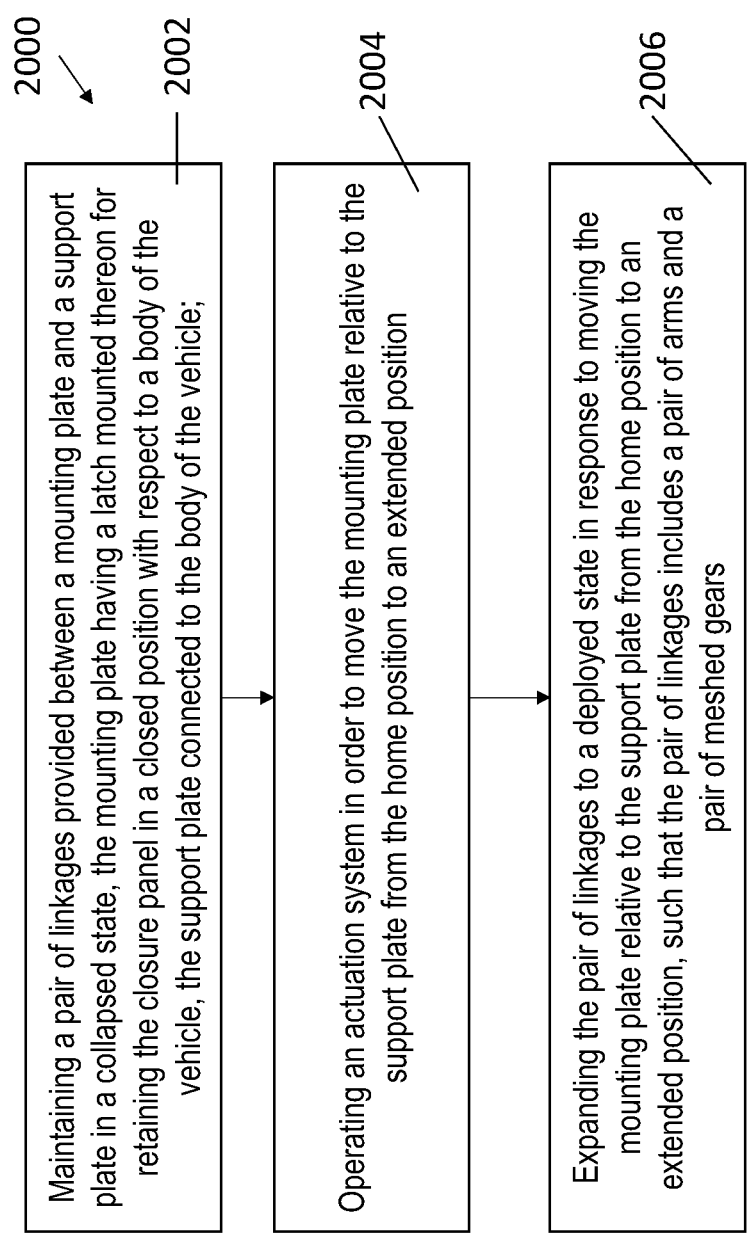
FIG. 40 shows a method of operating a latch travel mechanism, in accordance with an illustrative embodiment.

Now referring to FIG. 40 in addition to the other Figures, there is shown a method 2000 for operating a latch travel mechanism coupled to a closure panel of a vehicle, the method including maintaining a pair of linkages provided between a mounting plate and a support plate in a collapsed state, the mounting plate having a latch mounted thereon for retaining the closure panel in a closed position with respect to a body of the vehicle, the support plate connected to the body of the vehicle 2002; operating an actuation system in order to move the mounting plate relative to the support plate from the home position to an extended position 2004, and expanding the pair of linkages to a deployed state in response to moving the mounting plate relative to the support plate from the home position to an extended position, such that the pair of linkages includes a pair of arms and a pair of meshed gears 2006, such that the latch is also moved from the home position to the extended position as mounted on the mounting plate.

We claim:

1. A latch travel mechanism (99) for a closure panel (6) of a vehicle (4), the mechanism comprising:
   a mounting plate (115) for mounting a latch (100), the latch for retaining the closure panel in a closed position, the latch having a ratchet for retaining a striker mounted on the closure panel in order to latch the closure panel in the closed position, the ratchet held in position by a pawl when the ratchet is retaining the striker;
   a support plate (117) coupled to the mounting plate by a pair of linkages (118), the support plate for connecting to a body (5) of the vehicle, the pair of linkages including a pair of arms (302) and a pair of meshed gears (300) coupled to one another; and
   an actuation mechanism (101) for mounting on at least one of the support plate or the body for extending the pair of linkages in order to move the mounting plate relative to the support plate from a home position to an extended position;
   wherein the mounting plate is moved from the home position to the extended position during operation of the actuation mechanism.

2. The latch travel mechanism of claim 1, further comprising the latch mounted on the mounting plate in order to provide a latch travel assembly (99), wherein the latch moves with the mounting plate while the closure panel remains retained by the latch.

3. The latch travel mechanism of claim 1, wherein the pair of linkages are coupled by first pivots (120) to the mounting plate and coupled by second pivots (122) to the support plate.

4. The latch travel mechanism of claim 3, wherein each of the pair of arms is coupled to the support plate by a respective one of the second pivots and each of the pair of meshed gears is coupled to the mounting plate by a respective one of the first pivots.

5. The latch travel mechanism of claim 4, wherein said each of the pair of arms is coupled to a respective one of the pair of meshed gears by a third pivot.

6. The latch travel mechanism of claim 1, wherein the linkages extend in a plane parallel to at least one of the support plate and the mounting plate.

7. The latch travel mechanism of claim 1, wherein operation of the pair of meshed gears inhibits misalignment of sides (RH,LH) of the mounting plate with respect to the support plate during said operation of the actuation mechanism.

8. The latch travel mechanism of claim 1, wherein the pair of meshed gears are sector gears.

9. The latch travel mechanism of claim 1, wherein the pair of meshed gears are coupled by first pivots to the mounting plate.

10. A method for operating a latch travel mechanism coupled to a closure panel of a vehicle, the method comprising the steps of:
    maintaining a pair of linkages provided between a mounting plate and a support plate in a collapsed state, the mounting plate having a latch mounted thereon for retaining the closure panel in a closed position with respect to a body of the vehicle, the support plate connected to the body of the vehicle, the latch having a ratchet for retaining a striker mounted on the closure panel in order to latch the closure panel in the closed position, the ratchet held in position by a pawl when the ratchet is retaining the striker;
    operating an actuation system in order to move the mounting plate relative to the support plate from the home position to an extended position; and
    expanding the pair of linkages to a deployed state in response to moving the mounting plate relative to the support plate from the home position to an extended position, such that the pair of linkages includes a pair of arms and a pair of meshed gears;
    wherein the latch is also moved from the home position to the extended position as mounted on the mounting plate.

* * * * *